(12) United States Patent
Zhao et al.

(10) Patent No.: US 11,388,399 B2
(45) Date of Patent: Jul. 12, 2022

(54) IMAGE PREDICTION METHOD, APPARATUS, AND SYSTEM, DEVICE, AND STORAGE MEDIUM

(71) Applicant: HUAWEI TECHNOLOGIES CO., LTD., Guangdong (CN)

(72) Inventors: Yin Zhao, Hangzhou (CN); Haitao Yang, Shenzhen (CN); Jianle Chen, San Diego, CA (US); Lian Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/369,350

(22) Filed: Jul. 7, 2021

(65) Prior Publication Data

US 2021/0344910 A1 Nov. 4, 2021

Related U.S. Application Data

(63) Continuation of application No. PCT/CN2020/070976, filed on Jan. 8, 2020.

(30) Foreign Application Priority Data

Jan. 8, 2019 (CN) .......................... 201910016466.3
Mar. 7, 2019 (CN) .......................... 201910173454.1
(Continued)

(51) Int. Cl.
*H04N 19/107* (2014.01)
*H04N 19/157* (2014.01)
(Continued)

(52) U.S. Cl.
CPC ......... *H04N 19/107* (2014.11); *H04N 19/157* (2014.11); *H04N 19/176* (2014.11); *H04N 19/186* (2014.11); *H04N 19/593* (2014.11)

(58) Field of Classification Search
CPC .. H04N 19/107; H04N 19/157; H04N 19/176; H04N 19/186; H04N 19/593
(Continued)

(56) References Cited

U.S. PATENT DOCUMENTS

2012/0230421 A1 9/2012 Chen et al.
2015/0208094 A1 7/2015 Lee et al.
(Continued)

FOREIGN PATENT DOCUMENTS

AU 2018233042 A1 * 4/2020 ........... H04N 19/117
CN 1750658 A 3/2006
(Continued)

OTHER PUBLICATIONS

JVET-L0184, Jicheng An et al., CE1-related: Flexible Luma and Chroma Block Partitioning Trees Separation, Joint Video Experts Team (JVET) of ITU-T SG 16 WP 3 and ISO/IEC JTC 1/SC 29/WG 11, 12th Meeting: Macao, CN, Oct. 3-12, 2018, total 8 pages.
(Continued)

*Primary Examiner* — Kathleen M Walsh
(74) *Attorney, Agent, or Firm* — Womble Bond Dickinson (US) LLP

(57) ABSTRACT

An image prediction method, apparatus, and system, a device, and a storage medium are provided. The method includes: (401) obtaining a split mode of a current node, where the current node is an image block in a coding tree unit in a current image; (402) determining, based on the split mode of the current node and a size of the current node, whether the current node satisfies a first condition; and (403) when it is determined that the current node satisfies the first condition, performing intra prediction on all coding blocks belonging to the current node, to obtain predictors of all the coding blocks belonging to the current node.

9 Claims, 15 Drawing Sheets

(30) Foreign Application Priority Data

Mar. 21, 2019 (CN) .......................... 201910219440.9
Jul. 30, 2019 (CN) .......................... 201910696741.0

(51) Int. Cl.
H04N 19/176 (2014.01)
H04N 19/186 (2014.01)
H04N 19/593 (2014.01)

(58) Field of Classification Search
USPC ................................................ 375/240.13
See application file for complete search history.

(56) References Cited

U.S. PATENT DOCUMENTS

| | | | |
|---|---|---|---|
| 2017/0347095 A1 | 11/2017 | Panusopone et al. | |
| 2018/0270509 A1* | 9/2018 | Chuang | H04N 19/176 |
| 2018/0367818 A1 | 12/2018 | Liu et al. | |
| 2019/0182498 A1* | 6/2019 | Yamamoto | H04N 19/157 |
| 2019/0246128 A1* | 8/2019 | Xu | H04N 19/14 |
| 2019/0246143 A1* | 8/2019 | Zhang | H04N 19/503 |
| 2019/0379914 A1* | 12/2019 | Misra | H04N 19/132 |
| 2021/0076034 A1* | 3/2021 | Misra | H04N 19/167 |
| 2021/0112248 A1 | 4/2021 | Zhang et al. | |
| 2021/0112262 A1* | 4/2021 | Jang | H04N 19/436 |
| 2021/0235079 A1 | 7/2021 | Chuang et al. | |
| 2021/0289221 A1* | 9/2021 | Misra | H04N 19/157 |

FOREIGN PATENT DOCUMENTS

| | | | |
|---|---|---|---|
| CN | 101394565 A | 3/2009 | |
| CN | 103237216 A | 8/2013 | |
| CN | 103347187 A | 10/2013 | |
| CN | 103444177 A | 12/2013 | |
| CN | 103914527 A | 7/2014 | |
| CN | 104081777 A | 10/2014 | |
| CN | 104202602 A | 12/2014 | |
| CN | 105850131 A | 8/2016 | |
| CN | 106716999 A | 5/2017 | |
| CN | 107079160 A | 8/2017 | |
| CN | 107637081 A | 1/2018 | |
| CN | 108632608 A | 10/2018 | |
| CN | 108668136 A | 10/2018 | |
| CN | 108781289 A | 11/2018 | |
| CN | 109151468 A | 1/2019 | |
| CN | 109151477 A | 1/2019 | |
| JP | 4921239 B2 | 4/2012 | |
| WO | 2016074147 A1 | 5/2016 | |
| WO | 2017030260 A1 | 2/2017 | |
| WO | 2017222331 A1 | 12/2017 | |
| WO | 2018047952 A1 | 3/2018 | |
| WO | 2018088805 A1 | 5/2018 | |
| WO | 2018177254 A1 | 10/2018 | |
| WO | WO-2020035022 A1 * | 2/2020 | H04N 19/96 |
| WO | WO-2020056452 A1 * | 3/2020 | H04N 19/117 |
| WO | WO-2020056757 A1 * | 3/2020 | H04N 19/12 |

OTHER PUBLICATIONS

"Series H: Audiovisual and Multimedia Systems, Infrastructure of audiovisual services—Coding of moving idea, High efficiency video coding," Recommendation of ITU-T H.265, ITU-T Telecommunication Standardization Sector of ITU, pp. 1-692, International Telecommunication Union, Geneva, Switzerland (Feb. 2018).

Bross et al.,"Versatile Video Coding (Draft 2)," Joint Video Experts Team (JVET) of ITU-T SG 16 WP 3 and ISO/IEC JTC 1/SC29 /WG 11, Document: JVET-K1001-v4, 11th Meeting: Ljubljana, SI, Total 84 pages (Jul. 10-18, 2018).

Jackie Ma et al.,"Description of Core Experiment: Partitioning",Joint Video Exploration Team (JVET) of ITU-T SG 16 WP 3 and ISO/IEC JTC 1/SC 29/WG 11,10th Meeting: San Diego, US, Apr. 10-20, 2018,Document: JVET-J1021,total 30 pages.

Kei Kawamura et al.,"AHG7: Chroma coding structure/tools in HEVC fidelity range extension",Joint Collaborative Team on Video Coding (JCT-VC) of ITU-T SG 16 WP 3 and ISO/IEC JTC 1/SC 29/WG 11,11th Meeting: Shanghai, CN, Oct. 10-19, 2012,Document: JCTVC-K0192, total 3 pages.

C. Rosewame, et al.,"CE1-related: Chroma block coding and size restriction" joint Video Experts Team (JVET) of Itu-T Sg 16 WP 3 and Iso/Iec Jtc 1/SC 29/WG 11,12th Meeting: Macao, CN, Oct. 3-12, 2018, Document: JVET-L0129_r1, total 3 pages.

Y. Zhao et al.,"CE1-related: Constrained chroma block partitioning",Joint Video Experts Team (JVET) of ITU-T SG 16 WP 3 and ISO/IEC JTC 1/SC 29/WG 11.12th Meeting: Macao, CN, Oct. 3-12, 2018,Document: JVET-L0372-v1, total 3 pages.

Il-Koo Kim et al.,"Block Partitioning Structure in the HEVC Standard",IEEE Transactions on Circuits and Systems for Video Technology, vol. 22, No. 12, Dec. 2012, total 10 pages.

Document: JVET-L0548-v1, Chia-Ming Tsai et al, CE1-related: On maximum/minimum allowed QT/BT/TT sizes for chroma, Joint Video Experts Team (JVET) of ITU-T SG 16 WP 3 and ISO/IEC JTC 1/SC 29/WG 11, 12th Meeting Macao, CN, Oct. 3-12, 2018, total 6 pages.

ITU-T H.261 (Mar. 1993), Line Transmission of Non-Telephone Signals, Video Codec for Audiovisual Services at p x 64 kbits, total 29 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Jun. 2019) , Series H: Audiovisual and Multimedia Systems, Infrastructure of audiovisual services—Coding of moving video , Advanced video coding for generic audiovisual services, total 836 pages.

ITU-T H.265(Feb. 2018), Series H: Audiovisual and Multimedia Systems Infrastructure of audiovisual services—Coding of moving video, High efficiency video coding, total 692 pages.

Shan Nana, Research on Low Complexity Algorithm in High Effciency Video Coding, A Dissertation Submitted to Northwestern Polytechnical University In partial fulfillment of the requirement For the degree of Doctor of Electronic Science and Technology Xi'an P.R. China, Sep. 2016, with an English Abstract, total 130 pages.

Chapter 6 "H.264 Prediction", In: Iain E. Richardson, The H.264 Advanced Video Compression Standard, 2nd Edition, Apr. 20, 2010, John Wiley and Sons, XP030001637, total 41 pages.

Document: JVET-O0359, Teruhiko Suzuki et al, AHG17: On identification of reference and non-reference picture, Joint Video Experts Team (JVET) of ITU-T SG 16 WP 3 and ISO/IEC JTC 1/SC 29/WG 11, 15th Meeting: Gothenburg, SE, Jul. 3-12, 2019, total 2 pages.

Document: JVET-L0184, Jicheng An et al, CEl-related, Flexible Luma and Chroma Block Partitioning Trees Separation, Joint Video Experts Team (JVET) of ITU-T SG 16 WG 3 and ISO/IEC JTC 1/SC 29/WG11, 12th Meeting: Macao, CN, Oct. 3-12, 2018, total 5 pages. XP030193936.

Document: JVET-L1001-v8, Benjamin Bross et al, Verstile Video Coding (Draft 3), Joint Video Experts Team (JVET) of ITU-T SG 16 WP 3 and 1S0/IEC JTC 1/SC 29/WG 11, 12th Meeting: Macao, CN, Oct. 3-12, 2018, total 227 pages. XP030215993.

* cited by examiner

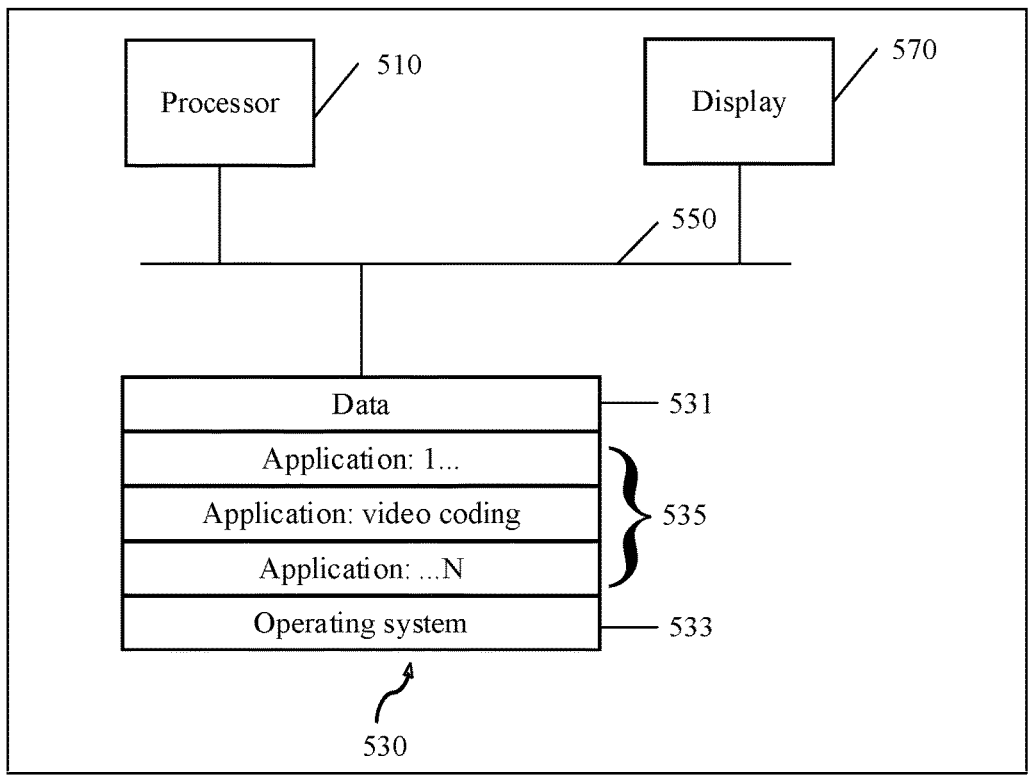
FIG. 5
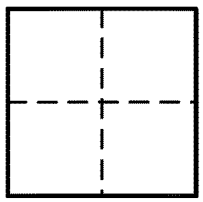 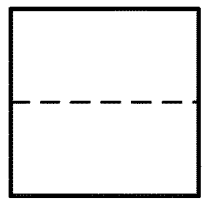 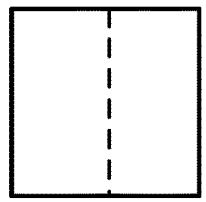 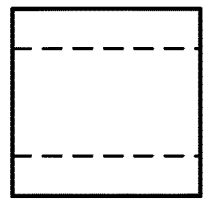 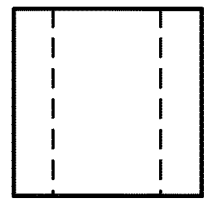
FIG. 6(a)   FIG. 6(b)   FIG. 6(c)   FIG. 6(d)   FIG. 6(e)
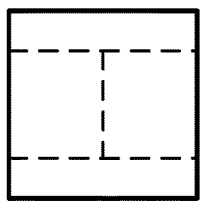 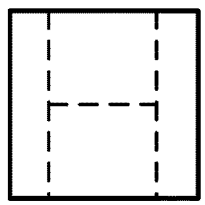
FIG. 6(f)   FIG. 6(g)

IMAGE PREDICTION METHOD, APPARATUS, AND SYSTEM, DEVICE, AND STORAGE MEDIUM

CROSS-REFERENCE TO RELATED APPLICATIONS

This application is a continuation of International Application No. PCT/CN2020/070976, filed on Jan. 8, 2020, which claims priority to Chinese Patent Application No. 201910016466.3, filed on Jan. 8, 2019 and Chinese Patent Application No. 201910173454.1, filed on Mar. 7, 2019 and Chinese Patent Application No. 201910219440.9, filed on Mar. 21, 2019 and Chinese Patent Application No. 201910696741.0, filed on Jul. 30, 2019. All of the aforementioned patent applications are hereby incorporated by reference in their entireties.

TECHNICAL FIELD

Embodiments of this disclosure relate to the field of video coding technologies, and in particular, to an image prediction method, apparatus, and system, a device, and a storage medium.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 part 10 advanced video coding (AVC), the video coding standard H.265/high efficiency video coding (HEVC) standard, and extensions of such standards. The video apparatuses can transmit, receive, encode, decode, and/or store digital video information more efficiently by implementing the video compression technologies.

With development of information technologies, video services such as high definition television, web conferencing, IPTV, and 3D television rapidly develop. Video signals, by virtue of advantages such as intuitiveness and high efficiency, become a most important manner of obtaining information in people's daily life. The video signals contain a large amount of data, and therefore occupy large transmission bandwidth and storage space. To effectively transmit and store the video signals, the video signals should be compressed and encoded. A video compression technology has increasingly become an indispensable key technology in the field of video application.

An encoding process mainly includes the following stages: intra prediction, inter prediction, transform, quantization, entropy encoding, in-loop filtering (which is mainly de-blocking filtering, de-blocking filtering), and the like. Intra prediction or inter prediction is performed after an image is split into coding blocks. Then, transform and quantization are performed after a residual is obtained. Finally, entropy encoding is performed to output a bitstream. Herein, a coding block is an array with a size of M×N pixels (where M may be equal or unequal to N). In addition, a value of a pixel at each pixel location is known. Video decoding is an inverse process of video encoding. For example, entropy decoding, dequantization, and inverse transform are first performed to obtain residual information; and whether intra prediction or inter prediction is performed on a current block is determined by decoding a bitstream. If intra encoding is performed, a prediction block is constructed based on a pixel value of a pixel in a reconstructed region around a current image by using an intra prediction method. If inter encoding is performed, motion information should be obtained through parsing, a reference block is determined in a reconstructed image based on the motion information obtained through parsing, and a pixel value of a pixel in the reference block is used as a prediction block (such a process is referred to as motion compensation (MC)). The prediction block and residual information are added, and a filtering operation is performed, to obtain reconstructed information.

Currently, two child nodes each with a size of 4×M (or M×4) are generated by splitting a node with a size of 8×M (or M×8) through vertical binary tree split (or horizontal binary tree split). Similarly, two child nodes each with a size of 4×M (or M×4) and one child node with a size of 8×M (or MX 8) are generated by splitting a node with a size of 16×M (or M×16) through vertical ternary tree split (or horizontal ternary tree split). For a data format of YUV 4:2:0, a resolution of a chroma component is ½ of a resolution of a luma component. In other words, one 4×M node includes one 4×M luma block and two 2×(M/2) chroma blocks. Therefore, a small chroma block with a size such as 2×2, 2×4, or 4×2 may be generated by splitting a current node in a preset split mode. It is relatively complex for a hardware decoder to process the small chroma block. The complexity is specifically reflected in the following three areas.

(1) Intra prediction: To increase a processing speed, hardware is designed to generally process 16 pixels at a time during intra prediction. However, the small chroma block with the size such as 2×2, 2×4, or 4×2 includes fewer than 16 pixels. As a result, processing performance of intra prediction deteriorates.

(2) Coefficient coding: In HEVC, transform coefficient coding is performed based on a coefficient group (CG) including 16 coefficients. However, the small chroma block with the size such as 2×2, 2×4, or 4×2 includes four or eight transform coefficients. As a result, a coefficient group including four coefficients or eight coefficients should be added to support coefficient coding for these small blocks. As a result, implementation complexity is increased.

(3) Inter prediction: Inter prediction for the small chroma blocks has a relatively high requirement on data bandwidth. As a result, a decoding processing speed is affected.

SUMMARY

This disclosure provides an image prediction method, apparatus, and system, a device, and a storage medium, to improve processing performance of image prediction and increase a coding processing speed.

An embodiment of this disclosure provides an image prediction method. The method includes:

obtaining a split mode of a current node; and determining whether an image block with a preset size is obtained by splitting the current node in the split mode of the current node, where the image block includes a luma block or a chroma block; and when it is determined that the image block with the preset size is obtained by splitting the current node in the split mode of the current node, performing intra prediction or inter prediction on all coding blocks covered by the current node.

Optionally, the image block with the preset size may be a luma block with a size less than a threshold. The threshold may be a quantity of luma samples, such as 128, 64, or 32, or a quantity of chroma samples, such as 32, 16, or 8. A size of the current node may be greater than or equal to the threshold.

Optionally, the performing intra prediction may be performing prediction by using a common intra prediction mode (intra mode) or an intra block copy (IBC) mode.

Optionally, all the coding blocks covered by the current node are all coding blocks located in a region corresponding to the current node. The coding block may be alternatively a coding unit.

Optionally, when a type (slice type) of a slice in which the current node is located is an intra type, intra prediction, instead of inter prediction, is performed on all the coding blocks covered by the current node.

Beneficial effects of embodiments of this disclosure are as follows: In this disclosure, it is considered that a luma block or a chroma block with the preset size is obtained by splitting the image block corresponding to the current node. If the foregoing case exists, an encoder side or a decoder side performs intra prediction or inter prediction on all coding blocks that are obtained by splitting or not splitting the current node serving as a root node, to implement parallel processing for luma blocks or chroma blocks with the preset size. This improves processing performance of image prediction, and further improves coding performance.

Optionally, the following two cases relate to the image block with the preset size: a luma block with a first preset size and a chroma block with a second preset size. The performing intra prediction or inter prediction on all coding blocks covered by the current node includes: determining whether the luma block with the first preset size is obtained by splitting the current node in the split mode; and when it is determined that the luma block with the first preset size is obtained by splitting the current node in the split mode, performing intra prediction on all the coding blocks covered by the current node; or when it is determined that the luma block with the first preset size is not obtained by splitting the current node in the split mode, performing intra prediction or inter prediction on all the coding blocks covered by the current node.

Optionally, when it is determined that the luma block with the first preset size is not obtained by splitting the current node in the split mode, the performing intra prediction or inter prediction on all the coding blocks covered by the current node may include: when it is determined that the luma block with the first preset size is not obtained by splitting the current node in the split mode, parsing a prediction mode status flag of the current node; and when a value of the prediction mode status flag is a first value, performing inter prediction on all the coding blocks covered by the current node; or when a value of the prediction mode status flag is a second value, performing intra prediction on all the coding blocks covered by the current node.

In an embodiment, the image block with the preset size includes the luma block with the first preset size, and the determining whether an image block with a preset size is obtained by splitting the current node in the split mode includes: determining, based on a size of the current node and the split mode of the current node, whether the luma block with the first preset size is obtained by splitting the current node in the split mode.

Optionally, the luma block with the first preset size may be a luma block with a pixel size of 4×4 or 8×8 or a luma block with an area of 16 pixels or 32 pixels.

Optionally, when the luma block with the first preset size is the luma block with the pixel size of 4×4 or the area of 16 pixels, the determining, based on a size of the current node and the split mode of the current node, whether the luma block with the first preset size is obtained by splitting the current node in the split mode may be performed based on one of the following conditions:

a quantity of samples of the luma block of the current node is 64, and the split mode is quadtree split;

a quantity of samples of the luma block of the current node is 64, and the split mode is ternary tree split; or a quantity of samples of the luma block of the current node is 32, and the split mode is binary tree split.

In an embodiment, optionally, when it is determined that the image block with the preset size is obtained by splitting the current node in the split mode of the current node, the performing intra prediction or inter prediction on all the coding blocks covered by the current node includes: when it is determined that the luma block with the first preset size is obtained by splitting the current node in the split mode, performing intra prediction on all the coding blocks covered by the current node.

In an embodiment, optionally, when it is determined that the luma block with the first preset size is not obtained by splitting the current node in the split mode, the method further includes: determining whether the chroma block with the second preset size is obtained by splitting the current node in the split mode; and when it is determined that the chroma block with the second preset size is obtained by splitting the current node in the split mode, performing intra prediction or inter prediction on all the coding blocks covered by the current node.

In an embodiment, it is determined that intra prediction or inter prediction is performed on all the coding blocks that are obtained by splitting or not splitting the current node serving as a root node, so that parallel processing for luma blocks or chroma blocks with the preset size can be implemented. This improves processing performance of image prediction, and further improves coding performance.

Optionally, the luma block with the first preset size may be a 4×4 luma block or a luma block with an area of 16 pixels. When the luma block with the first preset size is the 4×4 luma block, the chroma block with the second preset size may be a chroma block with a pixel size of 2×4 or 4×2 or a chroma block with an area of 8 pixels, excluding a chroma block with a pixel size of 2×2 or with an area of 4 pixels.

Optionally, the luma block with the first preset size may be a 4×4 luma block or a luma block with an area of 16 pixels. When the luma block with the first preset size is the 4×4 luma block, the chroma block with the second preset size may be a luma block with a pixel size of 4×8 or 8×4 or a luma block with an area of 32 pixels, excluding a luma block with a pixel size of 4×4 or with an area of 16 pixels.

Optionally, when the chroma block with the second preset size is a chroma block with a pixel size of 2×4 or 4×2 or a chroma block with an area of 8 pixels, or a chroma block with a pixel size of 4×8 or 8×4 or a luma block with an area of 32 pixels, the determining whether the chroma block with the second preset size is obtained by splitting the current node in the split mode may be performed based on one of the following conditions:

(1) a quantity of samples of the luma block of the current node is 64, and the split mode is binary tree split; or (2) a quantity of samples of the luma block of the current node is 128, and the split mode is ternary tree split.

In an embodiment, the image block with the preset size includes the chroma block with the second preset size, and the determining whether an image block with a preset size is obtained by splitting the current node in the split mode includes: determining, based on the size of the current node and the split mode of the current node, whether the chroma block with the second preset size is obtained by splitting the current node in the split mode.

Optionally, the chroma block with the second preset size may be a chroma block with a pixel size of 2×2, 2×4, or 4×2, or a chroma block with an area of 4 pixels or 8 pixels.

Optionally, the determining, based on the size of the current node and the split mode of the current node, whether the chroma block with the second preset size is obtained by splitting the current node in the split mode may include: determining, based on the size of the current node and the split mode of the current node, whether a luma block with a third preset size is obtained by splitting the current node in the split mode.

Optionally, the luma block with the third preset size may be a luma block with a pixel size of 4×4, 4×8, or 8×4 or a luma block with an area of 16 pixels or 32 pixels.

Optionally, the determining whether the chroma block with the second preset size is obtained by splitting the current node in the split mode may be performed based on one of the following conditions:

(1) a quantity of samples of the luma block of the current node is 64, and the split mode is quadtree split;

(2) a quantity of samples of the luma block of the current node is 64, and the split mode is ternary tree split;

(3) a quantity of samples of the luma block of the current node is 32, and the split mode is binary tree split;

(4) a quantity of samples of the luma block of the current node is 64, and the split mode is binary tree split; or (5) a quantity of samples of the luma block of the current node is 128, and the split mode is ternary tree split.

Optionally, the chroma block with the second preset size may be a chroma block with a pixel size of 2×4 or 4×2 or a chroma block with an area of 8 pixels, excluding a chroma block with a pixel size of 2×2 or a chroma block with an area of 4 pixels. Similarly, the luma block with the third preset size may be a luma block with a pixel size of 4×8 or 8×4 or a luma block with an area of 32 pixels, excluding a luma block with a pixel size of 4×4 or a luma block with an area of 16 pixels. Correspondingly, the determining whether the chroma block with the second preset size is obtained by splitting the current node in the split mode may be performed based on one of the following conditions:

(1) a quantity of samples of the luma block of the current node is 64, and the split mode is binary tree split; or (2) a quantity of samples of the luma block of the current node is 128, and the split mode is ternary tree split.

In an embodiment, when it is determined that the chroma block with the second preset size is obtained by splitting the current node in the split mode, the performing intra prediction or inter prediction on all the coding blocks covered by the current node includes: parsing a prediction mode status flag of the current node; and when a value of the prediction mode status flag is a first value, performing inter prediction on all the coding blocks covered by the current node; or when a value of the prediction mode status flag is a second value, performing intra prediction on all the coding blocks covered by the current node. This implementation is used for a video decoder. A prediction mode used for all the coding blocks obtained by splitting or not splitting the current node serving as a root node is determined by parsing the prediction mode status flag from a bitstream. In comparison with the conventional technology, parsing only needs to be performed once, so that a processing speed of video decoding is increased.

Optionally, the type (slice type) of the slice in which the current node is located is not the intra type.

In an embodiment, when it is determined that the chroma block with the second preset size is obtained by splitting the current node in the split mode, the performing intra prediction or inter prediction on all the coding blocks covered by the current node includes: when a prediction mode used for any coding block covered by the current node is inter prediction, performing inter prediction on all the coding blocks covered by the current node; or when a prediction mode used for any coding block covered by the current node is intra prediction, performing intra prediction on all the coding blocks covered by the current node. Optionally, the any coding block is a $1^{st}$ coding block of all the coding blocks covered by the current node in a decoding order. This implementation is used for the video decoder. The prediction mode used for any coding block of the current node is parsed from the bitstream, and the prediction mode obtained through parsing is used for prediction of all the coding blocks obtained by splitting or not splitting the current node serving as a root node. In comparison with the conventional technology, parsing only needs to be performed once, so that the processing speed of video decoding is increased.

In an embodiment, optionally, when it is determined that the chroma block with the second preset size is obtained by splitting the current node in the split mode, the performing intra prediction or inter prediction on all the coding blocks covered by the current node includes: determining whether the luma block with the first preset size is obtained by splitting the current node in the split mode; and when it is determined that the luma block with the first preset size is obtained by splitting the current node in the split mode, performing intra prediction on all the coding blocks covered by the current node. In this implementation, it is determined that intra prediction is performed on all the coding blocks that are obtained by splitting or not splitting the current node serving as a root node, so that parallel processing for the luma block with the first preset size and the chroma block with the second preset size can be implemented. This improves processing performance of image prediction, and further improves coding performance.

Optionally, when it is determined that the luma block with the first preset size is not obtained by splitting the current node in the split mode, the performing intra prediction or inter prediction on all the coding blocks covered by the current node includes: parsing a prediction mode status flag of the current node; and when a value of the prediction mode status flag is a first value, performing inter prediction on all the coding blocks covered by the current node; or when a value of the prediction mode status flag is a second value, performing intra prediction on all the coding blocks covered by the current node. This implementation is used for the video decoder. A prediction mode used for all the coding blocks obtained by splitting or not splitting the current node serving as a root node is determined by parsing the prediction mode status flag from the bitstream. In comparison with the conventional technology, parsing only needs to be performed once, so that the processing speed of video decoding is increased.

Optionally, when it is determined that the luma block with the first preset size is not obtained by splitting the current node in the split mode, the performing intra prediction or inter prediction on all the coding blocks covered by the current node includes: when a prediction mode used for any coding block covered by the current node is inter prediction, performing inter prediction on all the coding blocks covered by the current node; or when a prediction mode used for any coding block covered by the current node is intra prediction, performing intra prediction on all the coding blocks covered by the current node. This implementation is used for the video decoder. The prediction mode used for any coding block of the current node is parsed from the bitstream, and the prediction mode obtained through parsing is used for prediction of all the coding blocks obtained by splitting or not splitting the current node serving as a root node. In comparison with the conventional technology, parsing should be performed once, so that the processing speed of video decoding is increased.

Optionally, the any coding block is a $1^{st}$ coding block of all the coding blocks covered by the current node in a decoding order.

In an embodiment, the performing intra prediction or inter prediction on all the coding blocks covered by the current node includes: splitting, in the split mode, the luma block included in the current node, to obtain luma blocks obtained through splitting, performing intra prediction on the luma blocks obtained through splitting, using the chroma block included in the current node as a chroma coding block, and performing intra prediction on the chroma coding block; or splitting, in the split mode, the luma block included in the current node, to obtain luma blocks obtained through splitting, performing inter prediction on the luma blocks obtained through splitting, splitting, in the split mode, the chroma block included in the current node, to obtain chroma blocks obtained through splitting, and performing inter prediction on the chroma blocks obtained through splitting. In this implementation, regardless of whether intra prediction or inter prediction is performed on all the coding blocks covered by the current node, the luma block of the current node is always split; and the chroma block of the current node may be split in the case of the inter prediction mode, but the chroma block of the current node is not split in the case of the intra prediction mode. In this implementation, the chroma block, with the second preset size, on which intra prediction is performed is not generated, and therefore a case in which intra prediction is performed on a small chroma block is avoided. This increases a processing speed of video coding.

In an embodiment, the performing intra prediction or inter prediction on all the coding blocks covered by the current node includes: splitting, in the split mode, the luma block included in the current node, to obtain luma blocks obtained through splitting, performing intra prediction on the luma blocks obtained through splitting, using the chroma block included in the current node as a chroma coding block, and performing intra prediction on the chroma coding block; or splitting, in the split mode, the luma block included in the current node, to obtain luma blocks obtained through splitting, performing inter prediction on the luma blocks obtained through splitting, using the chroma block included in the current node as a chroma coding block, and performing inter prediction on the chroma coding block. In this implementation, regardless of whether intra prediction or inter prediction is performed on all the coding blocks covered by the current node, the chroma block of the current node is not split, and the luma block is split in the split mode of the luma block. In this implementation, the chroma block, with the second preset size, on which intra prediction is performed is not generated, and therefore a case in which intra prediction is performed on the small chroma block is avoided. This increases the processing speed of video coding.

In an embodiment, when inter prediction is performed on all the coding blocks covered by the current node, the performing inter prediction on all the coding blocks covered by the current node includes:

splitting the current node in the split mode of the current node, to obtain a child node of the current node; determining, based on a size of the child node of the current node, a split mode that is not allowed for the child node of the current node; determining a block split policy of the child node of the current node based on the split mode that is not allowed for the child node of the current node; and obtaining, according to the block split policy of the child node of the current node, a coding block corresponding to the child node of the current node, and performing inter prediction on the corresponding coding block. In this implementation, the luma block with the first preset size is not generated in the case of inter prediction.

The child node may be obtained by splitting the current node once, or may be obtained by splitting the current node for N times, where N is an integer greater than 1.

The split policy may include: performing no splitting, or performing splitting once, or performing splitting for N times, where N is an integer greater than 1.

An embodiment of this disclosure provides an image prediction apparatus. The apparatus includes:

an obtaining module, configured to obtain a split mode of a current node;

a judging module, configured to determine whether an image block with a preset size is obtained by splitting the current node in the split mode, where the image block includes a luma block or a chroma block; and an execution module, configured to: when it is determined that the image block with the preset size is obtained by splitting the current node in the split mode, perform intra prediction or inter prediction on all coding blocks covered by the current node.

An embodiment of this disclosure provides a video encoding device, including a processor and a memory that is configured to store an executable instruction of the processor. The processor performs the method according to the first aspect of this disclosure.

An embodiment of this disclosure provides a video decoding device, including a processor and a memory that is configured to store an executable instruction of the processor. The processor performs the method according to the first aspect of this disclosure.

An embodiment of this disclosure provides an image prediction system, including a video collection device, the video encoding device according to the third aspect of this disclosure, the video decoding device according to the fourth aspect of this disclosure, and a display device. The video encoding device is connected to both the video collection device and the video decoding device. The video decoding device is connected to the display device.

An embodiment of this disclosure provides a computer-readable storage medium. The computer-readable storage medium stores a computer program, and the computer program is executed by a processor to implement the method according to the first aspect of this disclosure.

An embodiment of this disclosure provides an image prediction method. The method includes:

obtaining a split mode of a current node, where the current node is an image block in a coding tree unit in a current image; determining, based on the split mode of the current node and a size of the current node, whether the current node satisfies a first condition; and when it is determined that the current node satisfies the first condition, performing intra prediction on all coding blocks belonging to the current node, to obtain predictors of all the coding blocks belonging to the current node.

The size of the current node is determined based on a size of a coding tree node corresponding to the current node and the split mode that is used to obtain the current node.

A type of a slice in which the current node is located is a B type or a P type. It should be understood that when the type of the slice in which the current node is located is an I type, intra prediction should be performed, by default, on all the coding blocks covered by the current node.

Optionally, the determining, based on the split mode of the current node and a size of the current node, whether the current node satisfies a first condition may be performed when the size of the current node is less than or equal to an upper limit of a preset size. The upper limit of the preset size may be 256, 128, or 64.

The first condition may include:
(1) a quantity of samples of a luma block of the current node is 64, and the split mode is quadtree split;
(2) a quantity of samples of a luma block of the current node is 64, and the split mode is ternary tree split; or
(3) a quantity of samples of a luma block of the current node is 32, and the split mode is binary tree split.

In an embodiment, when it is determined that the current node does not satisfy the first condition, the method further includes: determining, based on the split mode of the current node and the size of the current node, whether the current node satisfies a second condition; and when it is determined that the current node satisfies the second condition, performing, by using a same prediction mode, prediction on all the coding blocks belonging to the current node, to obtain predictors of all the coding blocks belonging to the current node, where the prediction mode is intra prediction or inter prediction.

The determining, based on the split mode of the current node and the size of the current node, whether the current node satisfies a second condition may include: determining, based on the split mode of the current node, the size of the current node, and a current chroma format, whether the current node satisfies the second condition.

The second condition may include:
(1) the quantity of samples of the luma block of the current node is 64, and the split mode is binary tree split;
(2) the quantity of samples of the luma block of the current node is 128, and the split mode is ternary tree split;
(3) the quantity of samples of the luma block of the current node is 64, the split mode is binary tree split, and the chroma format is 4:2:0;
(4) the quantity of samples of the luma block of the current node is 128, the split mode is ternary tree split, and the chroma format is 4:2:0; or
(5) the width of a chroma block of a child node of the current node is 2.

In an embodiment, the performing, by using a same prediction mode, prediction on all the coding blocks belonging to the current node includes: parsing a prediction mode status flag of the current node; and when a value of the prediction mode status flag is a first value, performing inter prediction on all the coding blocks belonging to the current node; or when a value of the prediction mode status flag is a second value, performing intra prediction on all the coding blocks belonging to the current node.

The prediction mode status flag may be a syntax element parsed during block splitting, that is, a syntax element parsed during splitting of a coding tree. When the syntax element is parsed, a coding unit prediction mode status flag (cu_pred_mode) of a coding unit in a coverage region of the current node may not be parsed, and a value of the coding unit prediction mode status flag is a default value corresponding to the value of the prediction mode status flag.

In an embodiment, the performing inter prediction on all the coding blocks belonging to the current node includes: splitting the current node in the split mode of the current node, to obtain a child node of the current node; determining, based on a size of the child node of the current node, a split mode that is not allowed for the child node of the current node; determining a block split policy of the child node of the current node based on the split mode that is not allowed for the child node of the current node; and obtaining, according to the block split policy of the child node of the current node, a coding block corresponding to the child node of the current node, and performing inter prediction on the corresponding coding block.

If it is restricted that only inter prediction is performed on the child node, and a quantity of luma samples of the child node is 32 (or a product of the width and the height of the node is 32), binary tree split (including horizontal binary tree split or vertical binary tree split) is not allowed for the child node. If it is restricted that only inter prediction is performed on the child node, and a quantity of luma samples of the child node is 64 (or a product of the width and the height of the node is 64), ternary tree split (including horizontal ternary tree split or vertical ternary tree split) is not allowed for the child node. Such a determining method is applicable to both video data formats of YUV 4:2:0 and YUV 4:2:2.

For example, if the size of the current node is 8×8 and two 8×4 (or 4×8) nodes are generated through horizontal binary tree split (or vertical binary tree split), 4×4 blocks are generated if the 8×4 (or 4×8) node is further split. In this case, vertical binary tree split (or horizontal binary tree split) is not allowed for the 8×4 (or 4×8) node or the 8×4 (or 4×8) node is not allowed to be further split. For another example, if the quantity of samples of the luma block of the current node is 128, and the split mode is horizontal ternary tree split or vertical ternary tree split, it may be obtained that the quantity of samples of the luma block is 64. However, if horizontal ternary tree split or vertical ternary tree split for a child node is used for the luma node with the quantity of samples of 64, 4×4 luma blocks are obtained. Therefore, when it is restricted that only inter prediction is performed, horizontal ternary tree split or vertical ternary tree split is not allowed for the node with the quantity of samples of 64 or the node with the quantity of samples of 64 is not allowed to be further split.

In an embodiment, the performing intra prediction on all the coding blocks belonging to the current node includes: splitting a luma block included in the current node in the split mode, to obtain luma blocks obtained through splitting, and performing intra prediction on the luma blocks obtained through splitting; and using a chroma block included in the current node as a chroma coding block, and performing intra prediction on the chroma coding block.

An embodiment of this disclosure provides an image prediction method. The method includes: obtaining a split mode of a current node, where the current node is an image block in a coding tree unit in a current image; determining, based on the split mode of the current node and a size of the current node, whether the current node satisfies a preset condition; and when it is determined that the current node satisfies the preset condition, performing, by using a same prediction mode, prediction on all coding blocks belonging to the current node, to obtain predictors of all the coding blocks belonging to the current node, where the prediction mode is intra prediction or inter prediction.

The size of the current node may be determined based on a size of a coding tree node corresponding to the current node and the split mode that is used to obtain the current node.

The determining, based on the split mode of the current node and a size of the current node, whether the current node satisfies a preset condition may include: determining, based on the split mode of the current node, the size of the current node, and a current chrome format, whether the current node satisfies the preset condition.

The preset condition may include:

(1) a quantity of samples of a luma block of the current node is 64, and the split mode is binary tree split; or (2) a quantity of samples of a luma block of the current node is 128, and the split mode is ternary tree split.

In an embodiment, the performing, by using a same prediction mode, prediction on all coding blocks belonging to the current node includes: parsing a prediction mode status flag of the current node; and when a value of the prediction mode status flag is a first value, performing inter prediction on all the coding blocks belonging to the current node; or when a value of the prediction mode status flag is a second value, performing intra prediction on all the coding blocks belonging to the current node.

In an embodiment, the performing inter prediction on all the coding blocks belonging to the current node includes: splitting the current node in the split mode of the current node, to obtain a child node of the current node; determining, based on a size of the child node of the current node, a split mode that is not allowed for the child node of the current node; determining a block split policy of the child node of the current node based on the split mode that is not allowed for the child node of the current node; and obtaining, according to the block split policy of the child node of the current node, a coding block corresponding to the child node of the current node, and performing inter prediction on the corresponding coding block.

If it is restricted that only inter prediction is performed on the child node, and a quantity of luma samples of the child node is 32 (or a product of the width and the height of the node is 32), binary tree split (including horizontal binary tree split or vertical binary tree split) is not allowed for the child node. If it is restricted that only inter prediction is performed on the child node, and a quantity of luma samples of the child node is 64 (or a product of the width and the height of the node is 64), ternary tree split (including horizontal ternary tree split or vertical ternary tree split) is not allowed for the child node. Such a determining method is applicable to both video data formats of YUV 4:2:0 and YUV 4:2:2.

For example, if the size of the current node is 8×8 and two 8×4 (or 4×8) nodes are generated through horizontal binary tree split (or vertical binary tree split), 4×4 blocks are generated if the 8×4 (or 4×8) node is further split. In this case, vertical binary tree split (or horizontal binary tree split) is not allowed for the 8×4 (or 4×8) node or the 8×4 (or 4×8) node is not allowed to be further split. For another example, if the quantity of samples of the luma block of the current node is 128, and the split mode is horizontal ternary tree split or vertical ternary tree split, it may be obtained that the quantity of samples of the luma block is 64. However, if horizontal ternary tree split or vertical ternary tree split for a child node is used for the luma node with the quantity of samples of 64, 4×4 luma blocks are obtained. Therefore, when it is restricted that only inter prediction is performed, horizontal ternary tree split or vertical ternary tree split is not allowed for the node with the quantity of samples of 64 or the node with the quantity of samples of 64 is not allowed to be further split.

An embodiment of this disclosure provides an image prediction method. The method includes: determining, based on a size of a current node and a prediction mode of the current node, a split mode that is not allowed for the current node, where the current node is an image block in a coding tree unit in a current image; determining a block split policy of the current node based on the split mode that is not allowed for the current node; and obtaining, according to the block split policy of the current node, a coding block corresponding to the current node, and performing inter prediction on the corresponding coding block.

The size of the current node may be determined based on a size of a coding tree node corresponding to the current node and the split mode that is used to obtain the current node.

In an embodiment, the determining, based on a size of a current node and a prediction mode of the current node, the split mode that is not allowed for the current node includes: determining whether only an inter prediction mode is used for prediction of all coding blocks belonging to the current node, and determining whether a quantity of samples of a luma block of the current node is 32; and when it is determined that only the inter prediction mode is used for prediction of all the coding blocks belonging to the current node, and it is determined that the quantity of samples of the luma block of the current node is 32, determining that binary tree split is the split mode that is not allowed for the current node.

In an embodiment, the determining, based on a size of a current node and a prediction mode of the current node, the split mode that is not allowed for the current node includes: determining whether only the inter prediction mode is used for prediction of all the coding blocks belonging to the current node, and determining whether the quantity of samples of the luma block of the current node is 64; and when it is determined that only the inter prediction mode is used for prediction of all the coding blocks belonging to the current node, and it is determined that the quantity of samples of the luma block of the current node is 64, determining that ternary tree split is the split mode that is not allowed for the current node.

An embodiment of this disclosure provides an image prediction apparatus. The apparatus includes:

an obtaining module, configured to obtain a split mode of a current node, where the current node is an image block in a coding tree unit in a current image;

a judging module, configured to determine, based on the split mode of the current node and a size of the current node, whether the current node satisfies a first condition; and an execution module, configured to: when it is determined that the current node satisfies the first condition, perform intra prediction on all coding blocks belonging to the current node, to obtain predictors of all the coding blocks belonging to the current node.

In an embodiment, the judging module is further configured to: when it is determined that the current node does not satisfy the first condition, determine, based on the split mode of the current node and the size of the current node, whether the current node satisfies a second condition; and the execution module is further configured to: when it is determined that the current node satisfies the second condition, perform, by using a same prediction mode, prediction on all the coding blocks belonging to the current node, to obtain predictors of all the coding blocks belonging to the current node, where the prediction mode is intra prediction or inter prediction.

The judging module may be configured to: determine, based on the split mode of the current node, the size of the current node, and a current chrome format, whether the current node satisfies the second condition.

In an embodiment, the execution module is configured to:
parse a prediction mode status flag of the current node; and
when a value of the prediction mode status flag is a first value, perform inter prediction on all the coding blocks belonging to the current node; or when a value of the prediction mode status flag is a second value, perform intra prediction on all the coding blocks belonging to the current node.

In an embodiment, the execution module is configured to:
split the current node in the split mode of the current node, to obtain a child node of the current node;
determine, based on a size of the child node of the current node, a split mode that is not allowed for the child node of the current node;
determine a block split policy of the child node of the current node based on the split mode that is not allowed for the child node of the current node; and
obtain, according to the block split policy of the child node of the current node, a coding block corresponding to the child node of the current node, and perform inter prediction on the corresponding coding block.

In an embodiment, the execution module is configured to:
split, in the split mode, a luma block included in the current node to obtain luma blocks obtained through splitting, and perform intra prediction on the luma blocks obtained through splitting; and use a chroma block included in the current node as a chroma coding block, and perform intra prediction on the chroma coding block.

An embodiment of this disclosure provides an image prediction apparatus. The apparatus includes: an obtaining module, configured to obtain a split mode of a current node, where the current node is an image block in a coding tree unit in a current image; a judging module, configured to determine, based on the split mode of the current node and a size of the current node, whether the current node satisfies a preset condition; and an execution module, configured to: when it is determined that the current node satisfies the preset condition, perform, by using a same prediction mode, prediction on all coding blocks belonging to the current node, to obtain predictors of all the coding blocks belonging to the current node, where the prediction mode is intra prediction or inter prediction.

The judging module may be configured to determine, based on the split mode of the current node, the size of the current node, and a current chrome format, whether the current node satisfies the preset condition.

In an embodiment, the execution module is configured to:
parse a prediction mode status flag of the current node; and
when a value of the prediction mode status flag is a first value, perform inter prediction on all the coding blocks belonging to the current node; or when a value of the prediction mode status flag is a second value, perform intra prediction on all the coding blocks belonging to the current node.

In an embodiment, the execution module is configured to:
split the current node in the split mode of the current node, to obtain a child node of the current node; determine, based on a size of the child node of the current node, a split mode that is not allowed for the child node of the current node; determine a block split policy of the child node of the current node based on the split mode that is not allowed for the child node of the current node; and obtain, according to the block split policy of the child node of the current node, a coding block corresponding to the child node of the current node, and perform inter prediction on the corresponding coding block.

An embodiment of this disclosure provides an image prediction apparatus. The apparatus includes: a determining unit, configured to determine, based on a size of a current node and a prediction mode of the current node, a split mode that is not allowed for the current node, where the current node is an image block in a coding tree unit in a current image, where the determining unit is further configured to: determine a block split policy of the current node based on the split mode that is not allowed for the current node; and a prediction unit, configured to obtain, according to the block split policy of the current node, a coding block corresponding to the current node, and perform inter prediction on the corresponding coding block.

In an embodiment, the determining unit is configured to:
determine whether only an inter prediction mode is used for prediction of all coding blocks belonging to the current node, and determine whether a quantity of samples of a luma block of the current node is 32; and
when it is determined that only the inter prediction mode is used for prediction of all the coding blocks belonging to the current node, and it is determined that the quantity of samples of the luma block of the current node is 32, determine that binary tree split is the split mode that is not allowed for the current node.

In an embodiment, the determining unit is configured to:
determine whether only the inter prediction mode is used for prediction of all the coding blocks belonging to the current node, and determine whether the quantity of samples of the luma block of the current node is 64; and
when it is determined that only the inter prediction mode is used for prediction of all the coding blocks belonging to the current node, and it is determined that the quantity of samples of the luma block of the current node is 64, determine that ternary tree split is the split mode that is not allowed for the current node.

Various embodiments of this disclosure may be performed by an apparatus. The apparatus may perform any of the various operations, methods, or functions described herein.

An embodiment of this disclosure provides a video stream decoding apparatus, including a processor and a memory. The memory stores an instruction, and the instruction enables the processor to perform any of the various operations, methods, or functions described herein.

An embodiment of this disclosure provides a video stream encoding apparatus, including a processor and a memory. The memory stores an instruction, and the instruction enables the processor to perform any of the various operations, methods, or functions described herein.

An embodiment of this disclosure provides a computer-readable storage medium. The computer-readable storage medium stores an instruction, and when the instruction is executed, one or more processors are enabled to encode video data. The instruction enables the one or more processors to perform any of the various operations, methods, or functions described herein.

An embodiment of this disclosure provides a computer program including program code. When the program code is run on a computer, the method in any of the embodiments described herein is performed.

An embodiment of this disclosure provides a computer-readable storage medium. The computer-readable storage medium stores a bitstream, and the bitstream carries a prediction mode status flag of a current node of a current coding tree. When a value of the prediction mode status flag is a first value, it indicates that an inter prediction mode is used for all coding blocks belonging to the current node; or when a value of the prediction mode status flag is a second value, it indicates that an intra prediction mode is used for all coding blocks belonging to the current node.

It should be understood that the technical solutions in an embodiment of this disclosure may consistent with the technical solution other embodiments of this disclosure, and beneficial effects achieved by the embodiments and corresponding feasible implementations are similar. Details are not described again.

Details of one or more embodiments are described in accompanying drawings and the following descriptions.

This disclosure provides the image prediction method, apparatus, and system, the device, and the storage medium. The method includes: obtaining the split mode of the current node, and determining whether the image block with the preset size is obtained by splitting the current node in the split mode of the current node, where the image block includes the luma block or the chroma block. When the image block with the preset size is obtained by splitting the current node in the split mode of the current node, intra prediction or inter prediction is performed on all the coding blocks covered by the current node. According to the foregoing method, intra prediction or inter prediction is performed on all the coding blocks of the current node, so that parallel processing for all the coding blocks of the current node can be implemented. This improves processing performance of image prediction, and increases a coding processing speed.

BRIEF DESCRIPTION OF DRAWINGS

FIG. 5 is a block diagram of another example of an encoding apparatus or a decoding apparatus for implementing an embodiment of this disclosure;

FIG. 6(a) to FIG. 6(g) are schematic block diagrams of block split modes for implementing an embodiment of this disclosure;

DESCRIPTION OF EMBODIMENTS

Figure 1A:
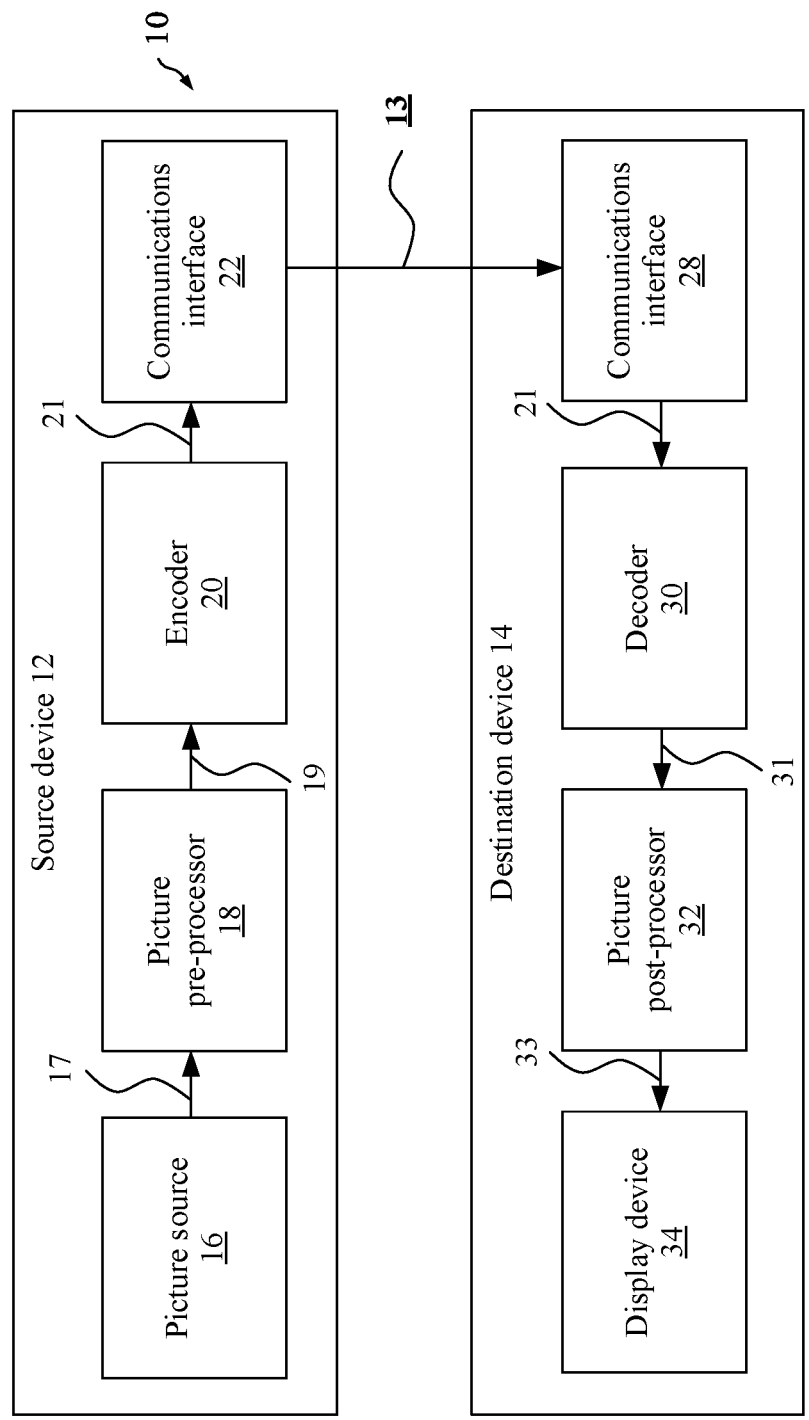
FIG. 1A is a block diagram of an example of a video coding system 10 for implementing an embodiment of this disclosure.

The following describes the embodiments of this disclosure with reference to the accompanying drawings in the embodiments of this disclosure. In the following descriptions, reference is made to the accompanying drawings that constitute a part of this disclosure and show, by way of illustration, specific embodiments of this disclosure or specific applications in which the embodiments of this disclosure may be used. It should be understood that the embodiments of this disclosure may be used in other applications, and may include structural or logical changes not depicted in the accompanying drawings. Therefore, the following detailed descriptions shall not be construed as limitative, and the scope of this disclosure is defined by the appended claims. For example, it should be understood that disclosed content with reference to a described method may also hold true for a corresponding device or system configured to perform the method, and vice versa. For example, if one or more specific method operations are described, a corresponding device may include one or more units such as functional units for performing the described one or more method operations (for example, one unit performs the one or more operations; or each of a plurality of units performs one or more of the plurality of operations), even if such one or more units are not explicitly described or illustrated in the accompanying drawings. In addition, for example, if a specific apparatus is described based on one or more units such as a functional unit, a corresponding method may include one operation used to perform a functionality or functionalities of one or more units (for example, a operation used to perform a functionality or functionalities of one or more units; or each of a plurality of operations is used to perform a functionality or functionalities of one or more units in a plurality of units), even if such one or a plurality of operations are not explicitly described or illustrated in the accompanying drawings. Further, it should be understood that features of the various example embodiments described in this specification may be combined with each other, unless otherwise specified.

Video coding typically refers to processing of a sequence of pictures, where the sequence of pictures forms a video or a video sequence. In the field of video coding, the terms "picture", "frame", and "image" may be used as synonyms. Video coding used in this specification refers to video encoding or video decoding. Video encoding is performed on a source side, and typically includes processing (for example, by compressing) an original video picture to reduce an amount of data for representing the video picture, for more efficient storage and/or transmission. Video decoding is performed on a destination side, and typically includes inverse processing in comparison with processing of the encoder, to reconstruct the video picture. "Coding" of a video picture in the embodiments should be understood as "encoding" or "decoding" of a video sequence. A combination of an encoding part and a decoding part is also referred to as CODEC (encoding and decoding).

A video sequence includes a series of images (picture), the image is further split into slices (slice), and the slice is further split into blocks (block). Video coding processing is performed by blocks. In some new video coding standards, the concept "block" is further extended. For example, a macroblock may be further split into a plurality of prediction blocks (partition) for prediction coding. Alternatively, basic concepts such as a coding unit (CU), a prediction unit (PU), and a transform unit (TU) are used, a plurality of block units are obtained through functional division, and a brand-new tree-based structure is used for description. For example, a CU may be split into smaller CUs through quadtree split, and the smaller CU may be further split to form a quadtree structure. A CU is a basic unit for splitting and coding of a coding image. For the PU and the TU, there may be also similar tree structures. The PU may correspond to a prediction block, and is a basic unit for prediction coding. The CU is further partitioned into a plurality of PUs in a partition mode. The TU may correspond to a transform block, and is a basic unit for transforming a prediction residual. However, all of the CU, the PU, and the TU are concepts of blocks (or image blocks) in essence.

A CTU is split into a plurality of CUs by using a quadtree structure represented as a coding tree. A decision on coding of a picture region through inter-picture (temporal) or intra-picture (spatial) prediction is made at a CU depth. Each CU may be further partitioned into one, two, or four PUs in a PU partitioning pattern. Inside one PU, a same prediction process is applied, and related information is transmitted to a decoder on a PU basis. After obtaining a residual block by applying the prediction process based on the PU partitioning pattern, the CU may be partitioned into transform units (TU) based on another quadtree structure similar to the coding tree used for the CU. In recent development of video compression technologies, a quadtree plus binary tree (QTBT) partition frame is used to partition a coding block. In a QTBT block structure, the CU may be square or rectangular.

In this specification, for ease of description and understanding, a to-be-coded image block in a current coding image may be referred to as a current block. For example, in encoding, the current block is a block that is currently being encoded; and in decoding, the current block is a block that is currently being decoded. A decoded image block, in a reference image, used to predict the current block is referred to as a reference block. In other words, the reference block is a block that provides a reference signal for the current block, and the reference signal represents a pixel value in the image block. A block that provides a prediction signal for the current block in the reference image may be referred to as a prediction block, and the prediction signal represents a pixel value, a sample value, or a sample signal in the prediction block. For example, an optimal reference block is found after a plurality of reference blocks are traversed, the optimal reference block provides prediction for the current block, and this block is referred to as a prediction block.

In a case of lossless video coding, an original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side. In other words, quality of a reconstructed video picture is lower or poorer than that of the original video picture.

Several H.261 video coding standards are used for "lossy hybrid video coding" (that is, spatial and temporal prediction in a sample domain is combined with 2D transform coding for applying quantization in a transform domain). Each picture of a video sequence is typically partitioned into a set of non-overlapping blocks, and coding is typically performed at a block level. In other words, on an encoder side, a video is typically processed, that is, encoded, at a block (video block) level, for example, by using spatial (intra-picture) prediction and/or temporal (inter-picture) prediction to generate a prediction block, subtracting the prediction block from a current block (a block that is currently being processed or to be processed) to obtain a residual block, and transforming the residual block and quantizing the residual block in the transform domain to reduce an amount of data to be transmitted (compressed), whereas on the decoder side, inverse processing in comparison with processing of the encoder is applied to the encoded or compressed block to reconstruct the current block for representation. Furthermore, the encoder duplicates a decoder processing loop, so that the encoder and the decoder generate identical prediction (for example, intra prediction and inter prediction) and/or reconstruction for processing, that is, coding, subsequent blocks.

The following describes a system architecture to which an embodiment of this disclosure is applied. FIG. 1A is a schematic block diagram of an example of a video coding system 10 to which an embodiment of this disclosure is applied. As shown in FIG. 1A, the video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. The source device 12, the destination device 14, or various implementation solutions of the source device 12 or the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set top box, a handheld telephone such as a "smartphone", a television set, a camera, a display apparatus, a digital media player, a video game console, an in-vehicle computer, a wireless communications device, or a similar apparatus.

Although FIG. 1A depicts the source device 12 and the destination device 14 as separate devices, embodiments of devices may also include both or both functionalities: the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communications media may include a wireless communications medium and/or a wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20, and optionally, the source device 12 may further include a picture source 16, a picture pre-processor 18, and a communications interface 22. In a specific implementation form, the encoder 20, the picture source 16, the picture pre-processor 18, and the communications interface 22 may be hardware components in the source device 12, or may be software programs on the source device 12. Separate descriptions are as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface for storing a previously captured or generated picture and/or for obtaining or receiving a picture. When the picture source 16 is a camera, the picture source 16 may be, for example, a local camera or an integrated camera integrated into the source device. When the picture source 16 is a memory, the picture source 16 may be, for example, a local memory or an integrated memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. A quantity of samples in horizontal and vertical directions (or axes) of the array or the picture defines a size and/or a resolution of the picture. For representation of a color, three color components are typically used. For example, the picture may be represented as or include three sample arrays. For example, in an RGB format or a color space, a picture includes corresponding red, green, and blue sample arrays. However, in video coding, each pixel is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, the two are identical in a gray-scale picture), while the two chrominance (chroma) components U and V represent chromaticity or color information components. Accordingly, the picture in the YUV format includes a luma sample array of luma sample values (Y) and two chroma sample arrays of chroma values (U and V). A picture in the RGB format may be converted or transformed into a picture in the YUV format and vice versa, and the process is also known as color transformation or conversion. If a picture is monochrome, the picture may include only a luma sample array. In this embodiment of this disclosure, a picture transmitted by the picture source 16 to a picture processor may also be referred to as raw picture data 17.

The picture pre-processor 18 is configured to receive the raw picture data 17 and pre-process the raw picture data 17, to obtain a pre-processed picture 19 or pre-processed picture data 19. For example, the pre-processing performed by the picture pre-processor 18 may include trimming, color format conversion (for example, from an RGB format to a YUV format), color correction, or de-noising.

The encoder 20 (also referred to as a video encoder 20) is configured to receive the pre-processed picture data 19, and process the pre-processed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform the embodiments described below, to implement application of the method on the encoder side described in this disclosure.

The communications interface 22 may be configured to receive the encoded picture data 21, and transmit the encoded picture data 21 to the destination device 14 or any other device (for example, a memory) through the link 13 for storage or direct reconstruction. The any other device may be any device used for decoding or storage. The communications interface 22 may be, for example, configured to package the encoded picture data 21 into an appropriate format, for example, a data packet, for transmission through the link 13.

The destination device 14 includes a decoder 30, and optionally, the destination device 14 may further include a communications interface 28, a picture post-processor 32, and a display device 34. Separate descriptions are as follows.

The communications interface 28 may be configured to receive the encoded picture data 21 from the source device 12 or any other source. The any other source is, for example, a storage device, and the storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, or any type of private or public network, or any combination thereof. The communications interface 28 may be, for example, configured to de-package the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform the embodiments described below, to implement application of the method on the decoder side described in this disclosure.

The picture post-processor 32 is configured to post-process the decoded picture data 31 (also referred to as reconstructed picture data), to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, may be an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any other type of display.

Although FIG. 1A depicts the source device 12 and the destination device 14 as separate devices, embodiments of devices may also include both or both functionalities: the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A person skilled in the art may be learned that based on the descriptions, existence and (exact) division into functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store a software instruction in an appropriate and non-transitory computer-readable storage medium and may execute an instruction by using hardware such as one or more processors, to perform the technologies of this disclosure. Any of the foregoing (including hardware, software, a combination of hardware and software, and the like) may be considered as one or more processors.

In some cases, the video coding system 10 shown in FIG. 1A is merely an example and the technologies in this disclosure are applicable to video coding settings (for example, video encoding or video decoding) that do not necessarily include any data communication between the encoding device and the decoding device. In other examples, data may be retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other but simply encode data to the memory and/or retrieve data from the memory and decode the data.

Figure 1B:
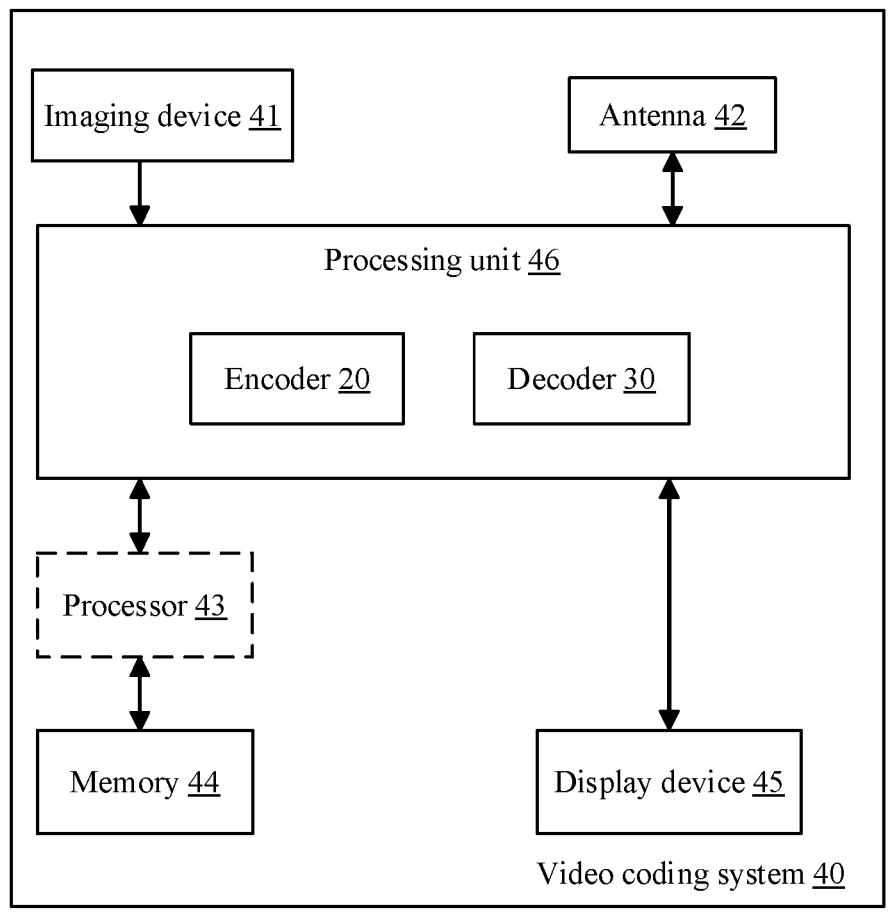
FIG. 1B is a block diagram of an example of a video coding system 40 for implementing an embodiment of this disclosure.
Figure 2:
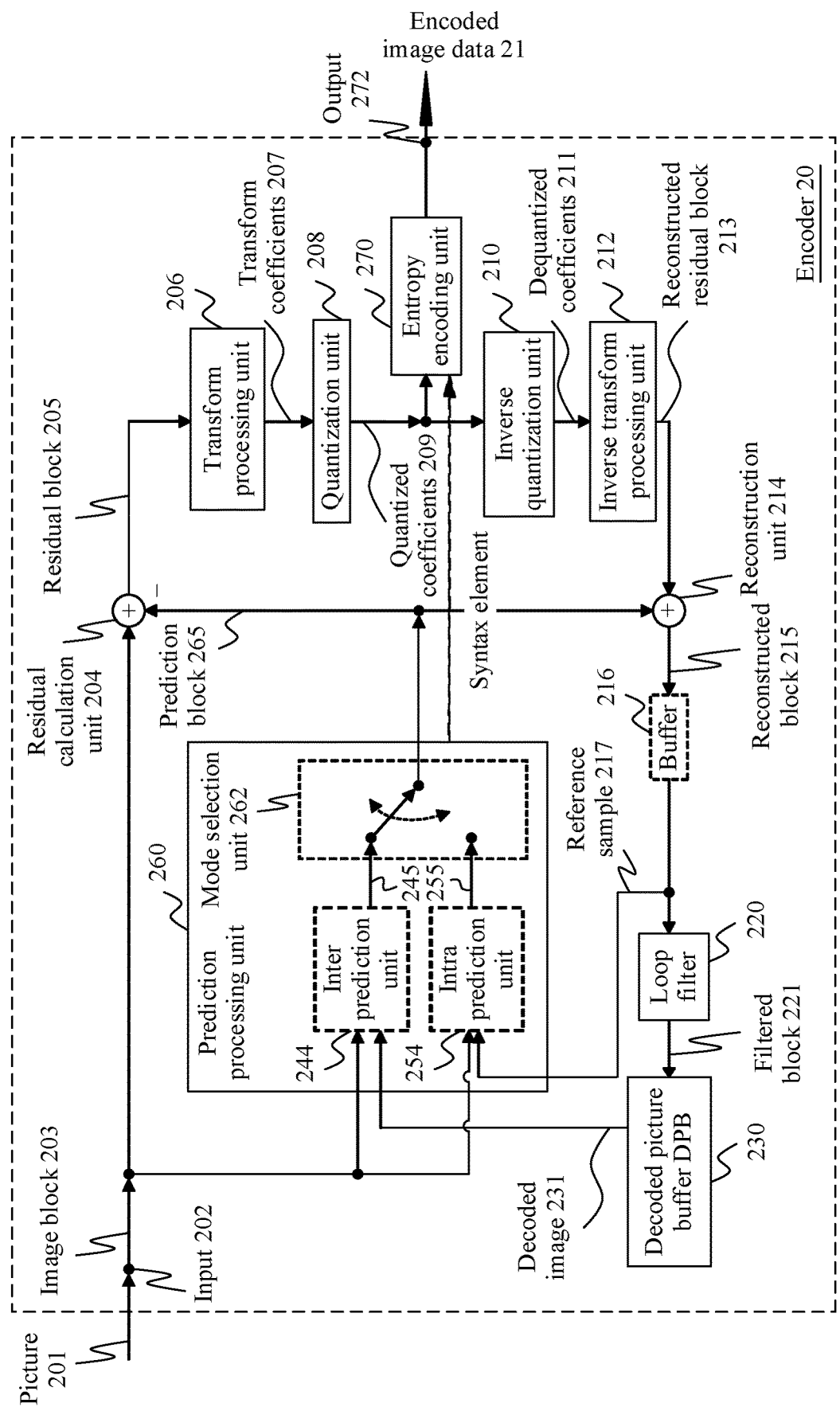
FIG. 2 is a block diagram of an example structure of an encoder 20 for implementing an embodiment of this disclosure.
Figure 3:
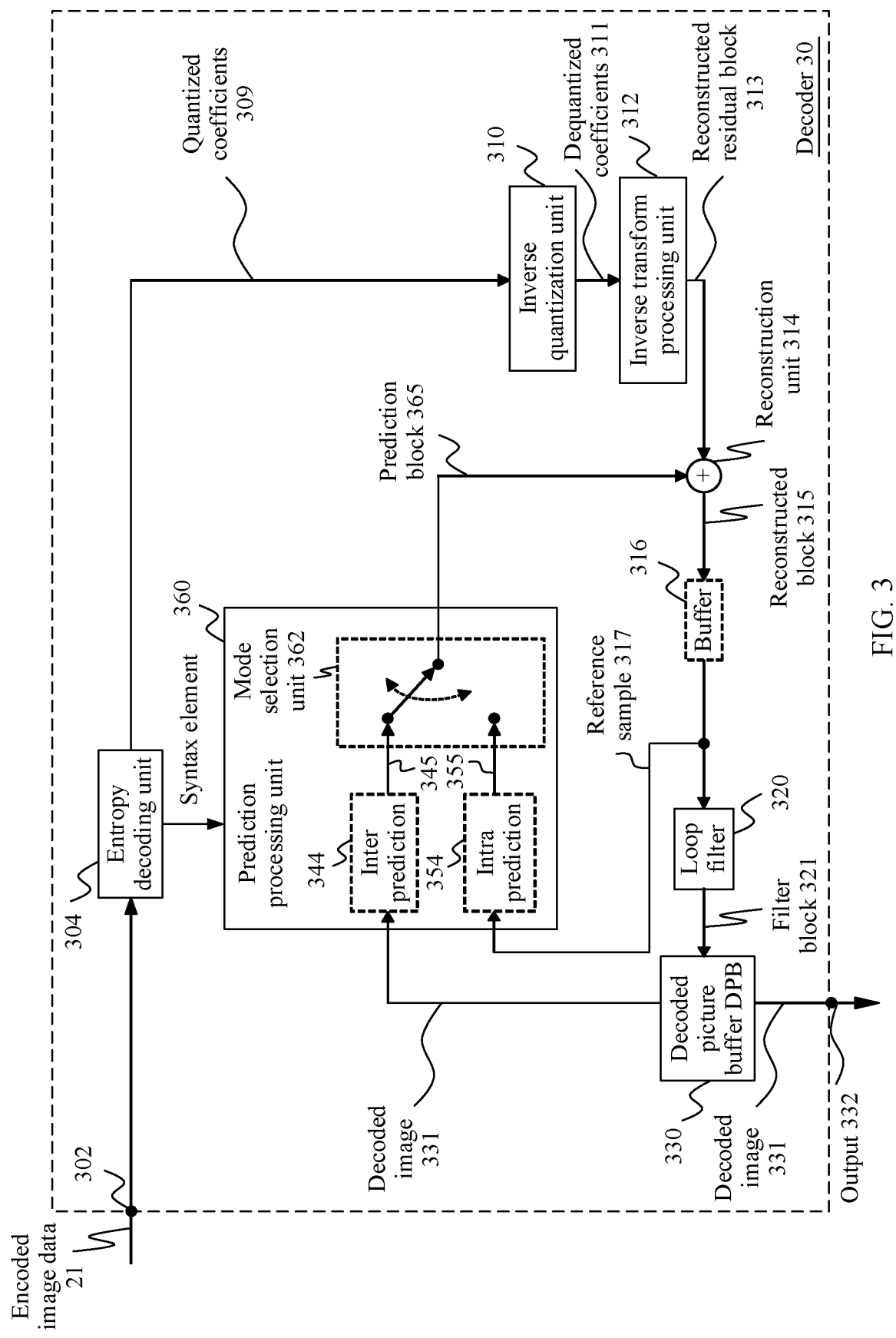
FIG. 3 is a block diagram of an example structure of a decoder 30 for implementing an embodiment of this disclosure.

FIG. 1B is an illustrative diagram of an example of a video coding system 40, including the encoder 20 in FIG. 2 and/or the decoder 30 in FIG. 3, according to an example embodiment. The video coding system 40 can implement a combination of various technologies in the embodiments of this disclosure. In an illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated by using the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (ASIC) logic, a graphics processor, a general-purpose processor, or the like. The video coding system 40 may alternatively include the optional processor 43. The optional processor 43 may similarly include application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-limiting example, the memory 44 may be implemented by a cache memory. In some examples, the logic circuit 47 may access the memory 44 (for example, for implementation of an image buffer). In other examples, the logic circuit 47 and/or the processing unit 46 may include a memory (for example, a cache) for implementation of an image buffer or the like.

In some examples, the encoder 20 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include an image buffer (for example, implemented by the processing unit 2820 or the memory 44) and a graphics processing unit (for example, implemented by the processing unit 46). The graphics processing unit may be communicatively coupled to the image buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that in this embodiment of this disclosure, for the example described with reference to the encoder 20, the decoder 30 may be configured to perform a reverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the decoding method described in this embodiment of this disclosure is mainly used in a decoding process. This process exists on both the encoder 20 and the decoder 30.

FIG. 2 is a schematic/conceptual block diagram of an example of an encoder 20 configured to implement an embodiment of this disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (decoded picture buffer, DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or an image block 203 of a picture 201, for example, a picture in a sequence of pictures forming a video or a video sequence. The image block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

An embodiment of the encoder 20 may include a partitioning unit (not shown in FIG. 2), configured to partition the picture 201 into a plurality of blocks such as the image block 203. The picture 201 is usually partitioned into a plurality of non-overlapping blocks. The partitioning unit may be configured to use a same block size for all pictures in a video sequence and a corresponding grid defining the block size, or change a block size between pictures or subsets or picture groups and partition each picture into corresponding blocks.

In an example, the prediction processing unit 260 of the encoder 20 may be configured to perform any combination of the partitioning techniques described above.

Like the picture 201, the image block 203 is also or may be considered as a two-dimensional array or matrix of samples with sample values, although a size of the image block 203 is smaller than that of the picture 201. In other words, the image block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the image block 203 defines the size of the image block 203.

The encoder 20 shown in FIG. 2 is configured to encode the picture 201 block by block, for example, encode and predict each image block 203.

The residual calculation unit 204 is configured to calculate a residual block 205 based on the image block 203 and a prediction block 265 (further details about the prediction block 265 are provided below), for example, obtain the residual block 205 in a sample domain by subtracting a sample value of the prediction block 265 from a sample value of the image block 203 sample by sample (pixel by pixel).

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in AVS, AVS2, or AVS3. In comparison with an orthogonal DCT transform, such an integer approximation is typically scaled by a specific factor. To preserve a norm of a residual block that is processed through forward and inverse transforms, applying an additional scale factor is a part of a transform process. The scale factor is typically chosen based on some constraints. For example, the scale factor is a power of two for a shift operation, a bit depth of the transform coefficient, a tradeoff between accuracy and implementation costs, and the like. A specific scaling factor is, for example, specified for an inverse transform, for example, by the inverse transform processing unit 212 on the decoder side 30 (and the corresponding inverse transform, for example, by the inverse transform processing unit 212 on the encoder side 20), and a corresponding scaling factor for the forward transform, for example, by the transform processing unit 206 on the encoder side 20 may be specified accordingly.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter ( ). For example, for scalar quantization, different scales may be applied to achieve finer or coarser quantization. A smaller quantization step corresponds to finer quantization, whereas a larger quantization step corresponds to coarser quantization. An appropriate quantization step size may be indicated by the quantization parameter (QP). The quantization parameter may be, for example, an index to a predefined set of appropriate quantization step sizes. For example, a smaller quantization parameter may correspond to finer quantization (a smaller quantization step size) and a larger quantization parameter may correspond to coarser quantization (a larger quantization step size) or vice versa. The quantization may include division by a quantization step size and corresponding quantization and/or inverse quantization, for example, performed by the inverse quantization unit 210, or may include multiplication by the quantization step size. In embodiments according to some standards such as AVS, AVS2, and AVS3, a quantization parameter may be used to determine the quantization step size. Generally, the quantization step size may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step size and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step size.

The inverse quantization unit 210 is configured to apply inverse quantization of the quantization unit 208 to the quantized coefficients to obtain dequantized coefficients 211, for example, apply, based on or by using a same quantization step size as the quantization unit 208, an inverse quantization scheme of a quantization scheme applied by the quantization unit 208. The dequantized coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, a reconstructed residual block 213) to the prediction block 265 to obtain a reconstructed block 215 in the sample domain, for example, by adding a sample value of the reconstructed residual block 213 and the sample value of the prediction block 265.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, an embodiment of the encoder 20 may be configured so that the buffer unit 216 is not only used for storing the reconstructed block 215 for the intra prediction unit 254 but also used for the loop filter unit 220 (not shown in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 (briefly referred to as a "loop filter" 220) is configured to filter the reconstructed block 215 to obtain the filtered block 221, to smooth pixel transition or improve video quality. The loop filter unit 220 is intended to represent one or more loop filters including, for example, a de-blocking filter, a sample-adaptive offset (SAO) filter, or another filter such as a bilateral filter, an adaptive loop filter (ALF), a sharpening or smoothing filter, or a collaborative filter. Although the loop filter unit 220 is shown in FIG. 2 as an in-loop filter, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 may receive the same loop filter parameter and apply the same loop filter parameter to decoding.

The decoded picture buffer (DPB) 230 may be a reference picture memory that stores reference picture data for encoding video data by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, the previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the image block 203 (a current image block 203 of the current picture 201) and reconstructed picture data, for example, reference samples of a same (current) picture from the buffer 216 and/or reference picture data 231 of one or more previously decoded pictures from the decoded picture buffer 230; and process such data for prediction, that is, provide the prediction block 265 that may be an inter prediction block 245 or an intra prediction block 255.

The mode selection unit 262 may be configured to select a prediction mode (for example, an intra prediction mode or an inter prediction mode) and/or the corresponding prediction block 245 or 255 to be used as the prediction block 265, to calculate the residual block 205 and reconstruct the reconstructed block 215.

In an embodiment, the mode selection unit 262 may be configured to select the prediction mode (for example, from prediction modes supported by the prediction processing unit 260), where the prediction mode provides an optimal match or a smaller residual (the smaller residual means better compression for transmission or storage), or provides smaller signaling overheads (the smaller signaling overheads mean better compression for transmission or storage), or considers or balances both. The mode selection unit 262 may be configured to determine the prediction mode based on rate-distortion optimization (RDO), that is, select a prediction mode that provides minimum rate-distortion or select a prediction mode for which related rate distortion at least satisfies a prediction mode selection criterion.

In the following, prediction processing performed (for example, by using the prediction processing unit 260) and mode selection performed (for example, by using the mode selection unit 262) according to an example of the encoder 20 are described in detail.

As described above, the encoder 20 is configured to determine or select an optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or mean) mode and a planar mode, or directional modes defined in H.265, or may include 67 different intra prediction modes, for example, non-directional modes such as a DC (or mean) mode and a planar mode, or directional modes defined in the developing H.266.

In a possible implementation, a set of inter prediction modes depends on available reference pictures (that is, at least some of decoded pictures stored in the DBP 230 as described above) and other inter prediction parameters, for example, depend on whether an entire reference picture is used or only a part of a reference picture is used, for example, an optimum matched reference block that is found in a search window region surrounding a region of a current block, and/or, for example, depend on whether pixel interpolation such as half-pixel and/or quarter-pixel interpolation is applied. The set of inter prediction modes may include, for example, an advanced motion vector prediction (AMVP) mode and a merge (merge) mode. In specific implementation, the set of inter prediction modes may include an improved control point-based AMVP mode and an improved control point-based merge mode in this embodiment of this disclosure. In an example, the intra prediction unit 254 may be configured to perform any combination of the following described inter prediction technologies.

In addition to the foregoing prediction modes, a skip mode and/or a direct mode may also be used in this embodiment of this disclosure.

The prediction processing unit 260 may be further configured to partition the image block 203 into smaller block partitions or subblocks, for example, by iteratively using quadtree (QT) partitioning, binary-tree (BT) partitioning, triple-tree (TT) partitioning, extended quadtree (EQT) partitioning, or any combination thereof, and to perform, for example, prediction on each of the block partitions or subblocks, where mode selection includes selection of a tree structure of the partitioned image block 203 and selection of a prediction mode applied to each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the image block 203 (the current image block 203 of the current picture 201) and a decoded picture 231, or at least one or more previously reconstructed blocks, for example, a reconstructed block of one or more other/different previously decoded pictures 231, for motion estimation. For example, a video sequence may include the current picture and a previously decoded picture 31. In other words, the current picture and the previously decoded picture 31 may be a part of or form a sequence of pictures forming a video sequence.

For example, the encoder 20 may be configured to select a reference block from a plurality of reference blocks of a same picture or different pictures of a plurality of other pictures and provide, to the motion estimation unit (not shown in FIG. 2), a reference picture and/or provide an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolations for sub-pixel precision). Interpolation filtering may generate an additional pixel sample from a known pixel sample, thereby potentially increasing a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate a syntax element associated with a block and a video slice, for decoding a picture block of the video slice by the decoder 30.

Specifically, the inter prediction unit 244 may transmit the syntax element to the entropy encoding unit 270, where the syntax element includes an inter prediction parameter (for example, indication information of an inter prediction mode that is selected for prediction for the current block after a plurality of inter prediction modes are traversed). In a possible application scenario, if there is only one inter prediction mode, the inter prediction parameter may not be carried in the syntax element. In this case, the decoder side 30 may directly use the default prediction mode for decoding. It may be understood that the inter prediction unit 244 may be configured to perform any combination of inter prediction technologies.

The intra prediction unit 254 is configured to obtain, for example, receive the picture block 203 (the current picture block) and one or more previously reconstructed blocks, for example, reconstructed neighboring blocks, of a same picture for intra estimation. For example, the encoder 20 may be configured to select an intra prediction mode from a plurality of (pre-determined) intra prediction modes.

In an embodiment, the encoder 20 may be configured to select an intra prediction mode according to an optimization criterion, for example, based on a smaller residual (for example, an intra prediction mode that provides a prediction block 255 most similar to the current picture block 203) or minimum bit rate distortion.

The intra prediction unit 254 is further configured to determine the intra prediction block 255 based on, for example, an intra prediction parameter of the selected intra prediction mode. In any case, after selecting an intra prediction mode for a block, the intra prediction unit 254 is further configured to provide an intra prediction parameter, that is, information indicating the selected intra prediction mode for the block, to the entropy encoding unit 270. In an example, the intra prediction unit 254 may be configured to perform any combination of the intra prediction technologies.

Specifically, the intra prediction unit 254 may transmit a syntax element to the entropy encoding unit 270, where the syntax element includes an intra prediction parameter (for example, indication information of an intra prediction mode that is selected for prediction for the current block after a plurality of intra prediction modes are traversed). In a possible application scenario, if there is only one intra prediction mode, the intra prediction parameter may not be carried in the syntax element. In this case, the decoder side 30 may directly use the default prediction mode for decoding.

The entropy encoding unit 270 is configured to apply (or bypass) an entropy encoding algorithm or a scheme (for example, a variable length coding (VLC) scheme, a context adaptive VLC (CAVLC) scheme, an arithmetic coding scheme, a context adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantized coefficients 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Other structural variations of the video encoder 20 may be configured to encode a video stream. For example, a non-transform based encoder 20 may quantize a residual signal directly without the transform processing unit 206 for some blocks or frames. In another implementation, the encoder 20 may have the quantization unit 208 and the inverse quantization unit 210 that are combined into a single unit.

Specifically, in this embodiment of this disclosure, the encoder 20 may be configured to implement a video encoding method described in the following embodiment.

It should be understood that other structural variations of the video encoder 20 may be configured to encode a video stream. For example, for some image blocks or image frames, the video encoder 20 may directly quantize the residual signal without processing by the transform processing unit 206, and accordingly, without processing by the inverse transform processing unit 212. Alternatively, for some image blocks or image frames, the video encoder 20 does not generate residual data, and accordingly, the transform processing unit 206, the quantization unit 208, the inverse quantization unit 210, and the inverse transform processing unit 212 do not need to perform processing. Alternatively, the video encoder 20 may directly store a reconstructed image block as a reference block, without processing by the filter 220. Alternatively, the quantization unit 208 and the inverse quantization unit 210 in the video encoder 20 may be combined together. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be selectively enabled.

FIG. 3 is a schematic/conceptual block diagram of an example of a decoder 30 configured to implement an embodiment of this disclosure. The video decoder 30 is configured to receive encoded picture data (for example, an encoded bitstream) 21, for example, obtained through encoding by an encoder 20, to obtain a decoded picture 231. During decoding, the video decoder 30 receives video data from the video encoder 20, for example, an encoded video bitstream that represents a picture block of an encoded video slice, and an associated syntax element.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with reference to the video encoder 20 in FIG. 2.

The entropy decoding unit 304 is configured to entropy decode the encoded picture data 21 to obtain, for example, quantized coefficients 309 and/or decoded coding parameters (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may be similar to the inter prediction unit 244 in functions, and the intra prediction unit 354 may be similar to the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists: a list 0 and a list 1, by using a default construction technique based on a reference picture stored in the DPB 330.

The prediction processing unit 360 is configured to determine the prediction block for the video block of the current video slice by parsing the motion vector and the another syntax element, and use the prediction block to generate a prediction block for a current video block that is being decoded. In an example of this disclosure, the prediction processing unit 360 uses some of received syntax elements to determine a prediction mode (for example, intra prediction or inter prediction) used to code the video block of the video slice, an inter prediction slice type (for example, a B slice, a P slice, or a GPB slice), construction information for one or more of the reference picture lists for the slice, a motion vector for each inter coded video block of the slice, an inter prediction status for each inter-coded video block of the slice, and other information to decode the video block of the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to inverse quantize (that is, dequantize) a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and likewise, determine an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a pixel domain.

The reconstruction unit 314 (for example, the summer 314) is configured to add an inverse transform block 313 (that is, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering techniques described below. The loop filter unit 320 is intended to represent one or more loop filters including, for example, a de-blocking filter, a sample-adaptive offset (SAO) filter, or another filter such as a bilateral filter, an adaptive loop filter (ALF), a sharpening or smoothing filter, or a collaborative filter. Although the loop filter unit 320 is shown in FIG. 3 as an in loop filter, in another configuration, the loop filter unit 320 may be implemented as a post loop filter.

The decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Other variations of the video decoder 30 may be configured to decode a compressed bitstream. For example, the decoder 30 may generate an output video stream without processing by the loop filter unit 320. For example, a non-transform based decoder 30 may inversely quantize a residual signal directly without the inverse transform processing unit 312 for some blocks or frames. In another implementation, the video decoder 30 may have the inverse quantization unit 310 and the inverse transform processing unit 312 that are combined into a single unit.

Specifically, in this embodiment of this disclosure, the decoder 30 is configured to implement a decoding method described in the following embodiment.

It should be understood that a block split operation may be performed by the prediction processing unit 360 or an independent unit (not shown in the figure). The prediction processing unit 360 may be configured to: partition the image block 203 into smaller block partitions or subblocks, for example, by iteratively using quadtree (QT) partitioning, binary-tree (BT) partitioning, triple-tree (TT) partitioning, extended quadtree (EQT) partitioning, or any combination thereof, and to perform, for example, prediction on each of the block partitions or subblocks, where a partitioning mode may be determined according to a preset rule or determined based on a parsed syntax element that is used to indicate the partitioning mode; and configured to, for example, predict each block partition or subblock. Mode selection includes selection of a tree structure of the partitioned image block 203 and selection of a prediction mode applied to each of the block partitions or subblocks.

It should be understood that other structural variations of the video decoder 30 may be configured to decode the encoded video bitstream. For example, the video decoder 30 may generate an output video stream without processing by the filter 320. Alternatively, for some image blocks or image frames, the entropy decoding unit 304 of the video decoder 30 does not obtain a quantized coefficient through decoding, and accordingly, the inverse quantization unit 310 and the inverse transform processing unit 312 do not need to perform processing. The loop filter 320 is optional. In a case of lossless compression, the inverse quantization unit 310 and the inverse transform processing unit 312 are optional. It should be understood that, according to different application scenarios, the inter prediction unit and the intra prediction unit may be selectively enabled.

It should be understood that, on the encoder 20 and the decoder 30 in this disclosure, a processing result for a stage may be output to a next stage after being further processed. For example, after a stage such as interpolation filtering, motion vector derivation, or loop filtering, an operation such as clip or shift is further performed on a processing result of the corresponding stage.

For example, a motion vector of a control point of a current image block or a motion vector of a subblock of a current image block derived from a motion vector of a neighboring affine coded block may be further processed. This is not limited in this disclosure. For example, a value of a motion vector is restricted to be within a specific bit width range. Assuming that an allowed bit width of a motion vector is bitDepth, a value of the motion vector ranges from $-2^{(bitDepth-1)}$ to $2^{(bitDepth-1)}-1$, where the symbol "^" represents exponentiation. If bitDepth is 16, the value range is from $-32768$ to $32767$. If bitDepth is 18, the value range is from $-131072$ to $131071$. For another example, values of motion vectors (for example, motion vectors MV of four 4×4 subblocks in an 8×8 image block) are restricted, so that a maximum difference between integer parts of the MVs of the four 4×4 subblocks does not exceed N pixels, for example, does not exceed one pixel.

The following two manners may be used to restrict the motion vector to be within a specific bit width.

Manner 1: An overflow most significant bit of the motion vector is removed:

$$ux=(vx+2^{bitDepth})\% \; 2^{bitDepth}$$

$$vx=(ux>=2^{bitDepth-1})?(ux-2^{bitDepth}):ux$$

$$uy=(vy+2^{bitDepth})\%2^{bitDepth}$$

$$vy=(uy>=2^{bitDepth-1})?(uy-2^{bitDepth}):uy$$

vx represents a horizontal component of the motion vector of the image block or the subblock of the image block, vy represents a vertical component of the motion vector of the image block or the subblock of the image block, ux and uy represent intermediate values, and bitDepth represents a bit width.

For example, a value of vx is −32769, and 32767 is derived according to the foregoing formulas. A value is stored in a computer in a two's complement representation, a two's complement representation of −32769 is 1,0111, 1111,1111,1111 (17 bits), and processing performed by a computer for overflowing is discarding a most significant bit. Therefore, a value of vx is 0111,1111,1111,1111, that is, 32767. This value is consistent with the result derived through processing according to the formulas.

Manner 2: Clipping is performed on the motion vector, as shown in the following formulas:

$$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

vx represents a horizontal component of the motion vector of the image block or the subblock of the image block; vy represents a vertical component of the motion vector of the image block or the subblock of the image block; x, y, and z correspond to three input values of an MV clamping process clip3; and clip3 is defined to indicate clipping a value of z to a range [x, y].

$$Clip3(x, y, z) = \begin{cases} x; & z < x \\ y; & z > y \\ z; & \text{otherwise} \end{cases}$$

Figure 4:
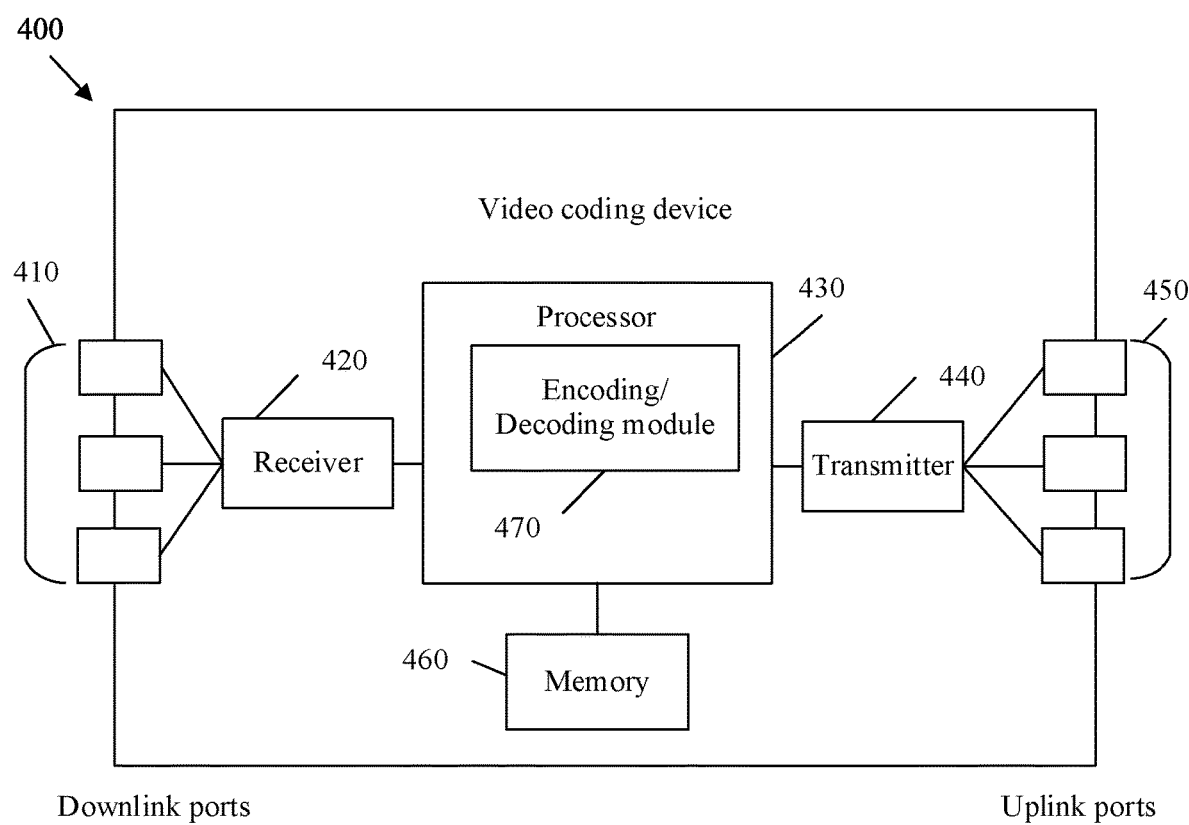
FIG. 4 is a block diagram of an example of a video coding device 400 for implementing an embodiment of this disclosure.

FIG. 4 is a schematic structural diagram of a video coding device 400 (for example, a video encoding device 400 or a video decoding device 400) according to an embodiment of this disclosure. The video coding device 400 is suitable for implementing an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that is configured to process data; a transmitter unit (Tx) 440 and egress ports 450 that are configured to transmit data; and a memory 460 configured to store data. The video coding device 400 may further include an optical-to-electrical component and an electrical-to-optical (EO) component that are coupled to the ingress ports 410, the receiver unit 420, the transmitter unit 440, and the egress ports 450, for egress or ingress of an optical signal or an electrical signal.

The processor 430 is implemented by hardware and software. The processor 430 may be implemented as one or more CPU chips, cores (for example, multi-core processors), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the method provided in the embodiments of this disclosure. For example, the encoding/decoding module 470 implements, processes, or provides various coding operations. Therefore, inclusion of the encoding/decoding module 470 provides a substantial improvement to functions of the video coding device 400 and affects switching of the video coding device 400 to a different status. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

FIG. 5 is simplified block diagram of an apparatus 500 that can be used as either or two of the source device 12 and the destination device 14 in FIG. 1A according to an example embodiment. The apparatus 500 can implement the technologies of this disclosure. In other words, FIG. 5 is a schematic block diagram of an implementation of an encoding device or a decoding device (a coding device 500 for short) according to an embodiment of this disclosure. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code, and the processor may invoke the program code stored in the memory to perform various video encoding or decoding methods described in this disclosure, and in particular, various new decoding methods. To avoid repetition, details are not described herein.

In this embodiment of this disclosure, the processor 510 may be a central processing unit (Central Processing Unit, "CPU" for short), or the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor or the like.

The memory 530 may include a read-only memory (ROM) device or a random access memory (RAM) device. Any other proper type of storage device may be alternatively used as the memory 530. The memory 530 may include code and data 531 accessed by the processor 510 through the bus 550. The memory 530 may further include an operating system 533 and application programs 535. The application programs 535 include at least one program that allows the processor 510 to perform the video encoding or decoding method (in particular, the decoding method) described in this disclosure. For example, the application programs 535 may include applications 1 to N, and further includes a video encoding or decoding application (a video coding application for short) that is used to perform the video encoding or decoding method described in this disclosure.

The bus system 550 may not only include a data bus, but also include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive element that operably senses touch input. The display 570 may be connected to the processor 510 through the bus 550.

The following describes in detail the solutions in the embodiments of this disclosure.

In a video coding standard, a frame of image is partitioned into coding tree units (CTU) that do not overlap each other. A size of a CTU may be set to 64×64 (the size of the CTU may be alternatively set to another value, for example, the size of the CTU is increased to 128×128 or 256×256). A 64×64 CTU is a rectangular pixel matrix with 64 rows of which each row includes 64 pixels, and each pixel includes a luma component or/and a chroma component. A CTU represents a coding tree unit. One image includes a plurality of CTUs, and one CTU generally corresponds to one square image region, and includes a luma pixel and a chroma pixel (or may include only a luma pixel, or may include only a chroma pixel) in the image region. The CTU further includes syntax elements. These syntax elements indicate how to split the CTU into at least one coding unit (CU), and a method for decoding each coding unit to obtain a reconstructed image.

A CU represents a coding unit. The CU generally corresponds to an A×B rectangular region, and includes A×B luma pixels and chroma pixels corresponding to the A×B luma pixels. A represents the width of the rectangle, B represents the height of the rectangle, and A and B may be the same or different. Values of A and B are generally 2 raised to the power of an integer, for example, 256, 128, 64, 32, 16, 8, and 4. Decoding processing may be performed on a coding unit to obtain a reconstructed image of the A×B rectangular region. The decoding processing generally includes processing such as prediction, dequantization, and inverse transform, to generate a prediction image and a residual. The prediction image and the residual are added to obtain a reconstructed image.

A quadtree (QT) is a tree structure. One node may be split into four child nodes. In a video coding standard, a quadtree-based CTU split mode is used. The CTU serves as a root node, and each node corresponds to a square region. To be specific, the square region is split into four square regions with a same size (the length and the width of the square region obtained through splitting are respectively half of the length and the width of the region before split). Each region corresponds to one node, as shown in FIG. 6(a). A node may not be further split (in this case, a region corresponding to the node is a CU), or the node is further split into lower-level nodes through QT, BT, TT, or EQT.

A binary tree (BT) is a tree structure. One node may be split into two child nodes. The splitting into two child nodes may be performed in one of the following two manners: (1) horizontal binary tree split: splitting a region corresponding to the node into two regions with a same size: an upper region and a lower region, where each region corresponds to one node, as shown in FIG. 6(b); or (2) vertical binary tree split: splitting a region corresponding to the node into two regions with a same size: a left region and a right region, where each region corresponds to one node, as shown in FIG. 6(c). In the binary tree split coding method, a node in the binary tree structure may not be split (in this case, a region corresponding to the node is a CU), or the node is further split into lower-level nodes through BT, TT, or EQT.

A ternary tree (TT) is a tree structure. One node may be split into three child nodes. In an existing ternary tree-based coding method, a node in the ternary tree structure may not be split, or the node is split into three lower-level nodes. The splitting into three nodes may be performed in one of the following two manners: (1) horizontal ternary tree split: splitting a region corresponding to the node into three regions: an upper region, a middle region, and a lower region, where each region corresponds to one node, and the heights of the three regions are respectively ¼, ½, and ¼ of the height of the node, as shown in FIG. 6(d); or (2) vertical ternary tree split: splitting a region corresponding to the node into three regions: a left region, a middle region, and a right region, where each region corresponds to one node, and the widths of the three regions are respectively ¼, ½, and ¼ of the height of the node, as shown in FIG. 6(e). In the ternary tree split coding method, a node in the ternary tree structure may not be split (in this case, a region corresponding to the node is a CU), or the node is further split into lower-level nodes through BT, TT, or EQT.

An extended quadtree (EQT) is an "I" shaped split structure. One node may be split into four child nodes. The splitting into three nodes may be performed in one of the following two manners: (1) horizontal quadtree split: splitting a region corresponding to the node into three regions: an upper region, a middle region, and a lower region, where each region corresponds to one node, the heights of the three regions of the upper region, the left middle region, the right middle region, and the lower region are respectively ¼, ½, ½, and ¼ of the height of the node, and the width of the left middle region and the width the right middle region are respectively ½ and ½ of the height of the node, as shown in FIG. 6(f); or (2) vertical quadtree split: splitting a region corresponding to the node into three regions: a left region, an upper middle region, a lower middle region, and a right region, where each region corresponds to one node, the widths of the three regions of the left region, the middle region, and the right region are respectively ¼, ½, ½, and ¼ of the height of the node, and the width of the upper middle region and the width of the lower middle region are respectively ½ and ½ of the height of the node, as shown in FIG. 6(g). In the extended quadtree coding method, a node in the extended quadtree structure may not be split, or the node is further split into lower-level nodes through BT, TT, or EQT.

Video decoding is a processing process of restoring a video bitstream to a reconstructed image according to a specific syntax rule and a processing method.

Video encoding is a processing process of compressing an image sequence into a bitstream.

Video coding is an umbrella term of video encoding and video decoding. A Chinese translation of video coding is the same as a Chinese translation of video encoding.

VTM is new codec reference software developed by the JVET.

In a video coding standard, a frame of image is partitioned into coding tree units (CTU) that do not overlap each other. A size of a CTU may be set to 64×64 (the size of the CTU may be alternatively set to another value, for example, the size of the CTU is increased to 128×128 or 256×256). A 64×64 CTU is a rectangular pixel matrix with 64 rows of which each row includes 64 pixels, and each pixel includes a luma component or/and a chroma component.

A quadtree (QT)-based CTU split method is used, the CTU serves as a root node of a quadtree, and the CTU is recursively split into several leaf nodes in the quadtree split mode. One node corresponds to one image region. If the node is not split, the node is referred to as a leaf node, and an image region corresponding to the node forms one CU. If the node is further split, an image region corresponding to the node is split into four regions with a same size (the lengths and the widths of the four regions are respectively half of the length and the width of the region before split), and each region corresponds to one node. Whether these nodes are further split should be separately determined. Whether a node is further split is indicated by a split flag split_cu_flag that is in a bitstream and that corresponds to the node. A quadtree depth (qtDepth) of a root node is 0, and a quadtree depth of a child node is a quadtree depth of a parent node plus 1. For brevity of description, in the following, a size and a shape of a node are a size and a shape of an image region corresponding to the node.

More specifically, for a 64×64 CTU node (the quadtree depth is 0), the 64×64 CTU node may not be split based on split_cu_flag corresponding to the 64×64 CTU node, and the CTU node forms one 64×64 CU; or the 64×64 CTU node is split into four 32×32 nodes (the quadtree depth is 1). Each of the four 32×32 nodes may be further split or not further split based on split_cu_flag corresponding to the node. If one 32×32 node is further split, four 16×16 nodes are generated (the quadtree depth is 2). By analogy, splitting ends until all the nodes are not further split, and such a CTU is split into a group of CUs. A minimum size (size) of a CU is identified in an SPS, for example, 8×8 represents the minimum size of the CU. In the foregoing recursive split process, if a size of a node is equal to the minimum CU size (minimum CU size), the node is not further split by default, and a split flag of the node does not need to be included in a bitstream.

After it is learned, through parsing, that a node is a leaf node, the leaf node is a CU, and coding information (including information such as a prediction mode and a transform coefficient of the CU, for example, a coding_unit( ) syntax structure) corresponding to the CU is further parsed. Then, decoding processing such as prediction, dequantization, inverse transform, and loop filtering are performed on the CU based on the coding information, to generate a reconstructed image corresponding to the CU. A CTU may be split into a group of CUs with appropriate sizes based on a local image feature by using the quadtree structure. For example, a smooth region is split into larger CUs, and a richly textured region is split into smaller CUs.

A split mode in which a CTU is split into a group of CUs corresponds to a coding tree. A specific coding tree that should be used for a CTU is usually determined based on a rate-distortion optimization (RDO) technology of an encoder. The encoder attempts to use a plurality of CTU split modes, where each split mode corresponds to one rate distortion cost (RD cost). The encoder compares RD costs of various split modes that have been attempted to use, and uses a split mode with a smallest RD cost as an optimal split mode of the CTU for actual coding of the CTU. The CTU split modes that the encoder has attempted to use should comply with a split rule specified by a decoder, so that the decoder can correctly identify the CTU split modes.

Figures 7, 8:
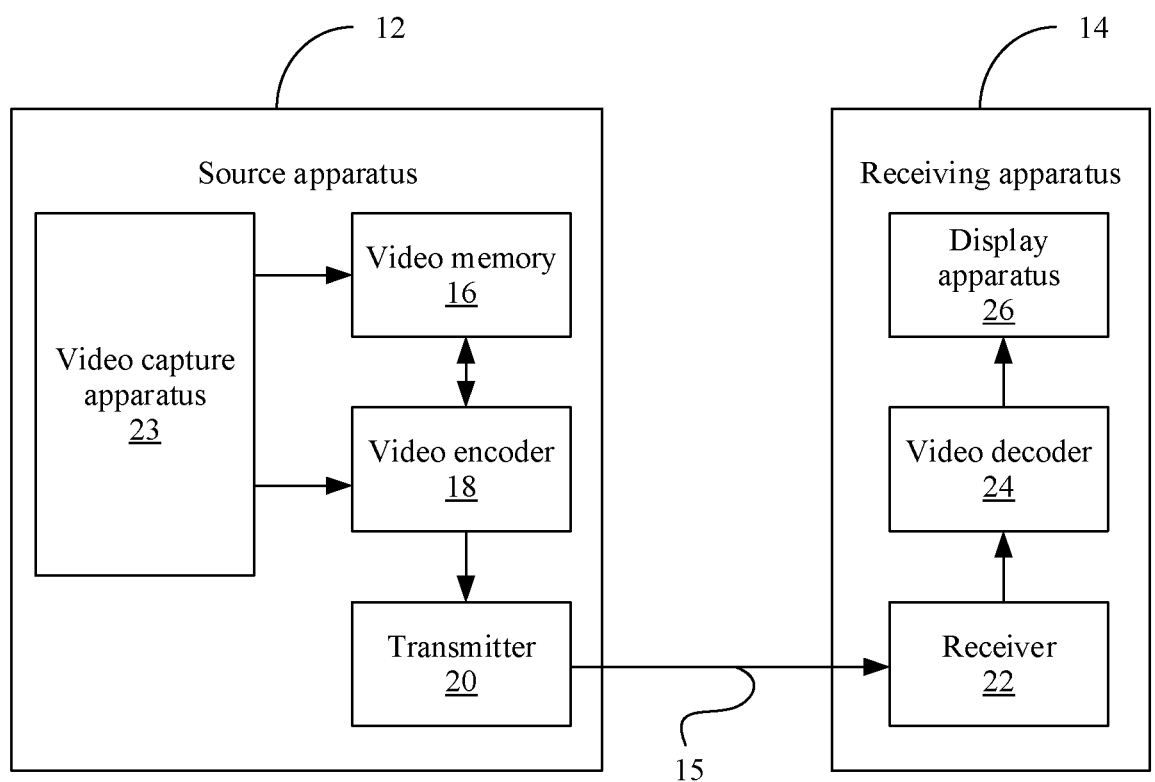
FIG. 7 is a schematic block diagram of intra prediction for implementing an embodiment of this disclosure.
FIG. 8 is a schematic block diagram of a video communications system for implementing an embodiment of this disclosure.

In a screen content video, an image usually includes same content. For example, in an image including digits or graphics, same digits or same graphics may be found around a current block, as shown in FIG. 7. Therefore, if a block that can be referenced can be found around the current block during coding of the current block, a reconstructed pixel of the block is directly referenced. In this way, a coding compression rate is greatly increased. An intra block copy ( ) technology is an intra prediction technology by using which a same block is searched in current screen content. For example, a syntax element pred_mode_ibc_flag in Table 2 may be used to indicate whether an IBC prediction mode is used for a current coding unit.

Based on quadtree split, the binary tree (BT) split mode and the extended quadtree (EQT) split mode may be further used.

One node is split into two child nodes through binary tree split. Specifically, there are two binary tree split modes:

(1) horizontal binary tree split: splitting a region corresponding to the node into two regions with a same size (that is, the width remains unchanged, and the heights become half of the height of the region before split), where each region corresponds to one node, as shown in FIG. 6(b); and (2) vertical binary tree split: splitting a region corresponding to the node into two regions with a same size: a left region and a right region (that is, the heights remains unchanged, and the widths become half of the width of the region before split), as shown in FIG. 6(c).

One node is split into four child nodes through extended quadtree split. Specifically, there are two extended quadtree split modes:

(1) horizontal quadtree split: splitting a region corresponding to the node into three regions: an upper region, a middle region, and a lower region, where each region corresponds to one node, the heights of the upper region, the left middle region, the right middle region, and the lower region are respectively ¼, ½, ½, and ¼ of the height of the node, and the width of the left middle region and the width of the right middle region are respectively ½ and ½ of the height of the node, as shown in FIG. 6(f); and (2) vertical quadtree split: splitting a region corresponding to the node into three regions: a left region, an upper middle region, a lower middle region, and a right region, where each region corresponds to one node, the widths of the left region, the middle region, and the right region are respectively ¼, ½, ½, and ¼ of the height of the node, and the width of the upper middle region and the width of the lower middle region are respectively ½ and ½ of the height of the node, as shown in FIG. 6(g).

A QT plus BT/EQT split mode means that a node in a first-level coding tree can be split into child nodes only through QT, that a leaf node in the first-level coding tree is a root node of a second-level coding tree, that a node in the second-level coding tree may be split into child nodes through BT or EQT, and that a leaf node in the second-level coding tree is a coding unit. It should be noted that when the BT or EQT split mode is used for a leaf node, only the BT or EQT split mode is used for the leaf node, but the QT split mode is not allowed to be used for the leaf node.

Alternatively, based on quadtree split, the binary tree (BT) split mode and the ternary tree (TT) split mode may be further used.

One node is split into two child nodes through binary tree split. Specifically, there are two binary tree split modes:

(1) horizontal binary tree split: splitting a region corresponding to the node into two regions with a same size (that is, the width remains unchanged, and the heights become half of the height of the region before split), where each region corresponds to one node, as shown in FIG. 6(b); and (2) vertical binary tree split: splitting a region corresponding to the node into two regions with a same size: a left region and a right region (that is, the heights remain unchanged, and the widths become half of the width of the region before split), as shown in FIG. 6(c).

One node is split into two child nodes through ternary tree split. Specifically, there are two binary tree split modes:

(1) horizontal ternary tree split: splitting a region corresponding to the node into three regions: an upper region, a middle region, and a lower region, where each region corresponds to one node, and the heights of the upper region, the middle region, and the lower region are respectively ¼, ½, and ¼ of the height of the node, as shown in FIG. 6(d); and (2) vertical ternary tree split: splitting a region corresponding to the node into three regions: a left region, a middle region, and a right region, where each region corresponds to one node, and the widths of the left region, the middle region, and the right region are respectively ¼, ½, and ¼ of the height of the node, as shown in FIG. 6(e).

A QT plus BT/TT split mode, briefly referred to as QT-BTT, means that a node in a first-level coding tree can be split into child nodes only through QT; that a leaf node in the first-level coding tree is a root node of a second-level coding tree; that a node in the second-level coding tree may be split into child nodes through one of the four split modes: horizontal binary tree split, vertical binary tree split, horizontal ternary tree split, and vertical ternary tree split; and that a leaf node in the second-level coding tree is a coding unit.

A part of a CU-level syntax structure may be shown in Table 1. If a current node is not further split into child nodes, the current node is a coding unit, and a prediction block of the coding unit is parsed based on the following syntax structure.

skip_flag represents a flag of a skip mode. When a value of skip_flag is 1, it indicates that the skip mode is used for a current CU, or when a value of skip_flag is 0, it indicates that the skip mode is not used for a current CU.

merge_flag represents a flag of a direct mode. When a value of merge_flag is 1, it indicates that the merge mode is used for the current CU, or when a value of merge_flag is 0, it indicates that the merge mode is not used for the current CU.

cu_pred_mode represents a coding unit prediction mode flag. When a value of cu_pred_mode is 1, it indicates that an intra prediction mode is used for a current prediction unit, or when a value of cu_pred_mode is 0, it indicates that a common inter prediction mode is used for a current prediction unit.

TABLE 1 coding_unit( x0, y0, uiDepth, uiWidth, uiHeight ) {
...
skip_flag
...

TABLE 1-continued

```
    if ( ! skipFlag ) {
      merge_flag
      ...
    }
    if ( ! mergeFlag )
      cu_pred_mode
      ...
    }
```

A part of a CU-level syntax structure may be alternatively shown in Table 2. Table 2 is merely an example. A meaning of cu_skip_flag in Table 2 is the same as the meaning of skip_flag in Table 1, and a meaning of pred_mode_flag in Table 2 is the same as the meaning of cu_pred_mode in Table 1.

cu_skip_flag represents a flag of a skip mode. When a value of cu_skip_flag is 1, it indicates that the skip mode is used for a current CU, or when a value of cu_skip_flag is 0, it indicates that the skip mode is not used for a current CU.

general_merge_flag represents a flag of a merge mode. When a value of general_merge_flag is 1, it indicates that the merge mode is used for the current CU, or when a value of general_merge_flag is 0, it indicates that the merge mode is not used for the current CU.

pred_mode_flag represents a coding unit prediction mode flag. When a value of pred_mode_flag is 1, it indicates that an intra prediction mode is used for the current coding unit, or when a value of pred_mode_flag is 0, it indicates that a common inter prediction mode is used for the current coding unit. If the value of pred_mode_flag is 1, CuPredMode[x0][y0] is MODE_INTRA. If the value of pred_mode_flag is 0, CuPredMode[x0][y0] is MODE_INTER.

When a value of pred_mode_ibc_flag is 1, it indicates that the IBC prediction mode is used for the current coding unit, or when a value of pred_mode_ibc_flag is 0, it indicates that the IBC prediction mode is not used for the current coding unit. If the value of pred_mode_ibc_flag is 1, CuPredMode[x0][y0] is MODE_IBC.

CuPredMode[x0] [y0] represents a prediction mode of the current coding unit, and (x0, y0) represents a location of the current coding unit in a current image.

Two child nodes each with a size of 4×M (or M×4) are generated by splitting a node with a size of 8×M (or M×8) through vertical binary tree split (or horizontal binary tree split). Similarly, four child nodes each with a size of 4×M (or M×4) and one child node with a size of 8×N (or N×8) are generated by splitting a node with a size of 16×M (or M×16) through vertical extended quadtree split (or horizontal extended quadtree split). Similarly, two child nodes each with a size of 4×M (or M×4) and one child node with a size of 8×M (or M×8) are generated by splitting a node with a size of 16×M (or M×16) through vertical ternary tree split (or horizontal ternary tree split). For a data format of YUV 4:2:0, a resolution of a chroma component is ½ of a resolution of a luma component. In other words, one 4×M node includes one 4×M luma block and two 2×(M/2) chroma blocks. For a hardware decoder, costs of processing a small block (especially a small block with a size of 2×2, 2×4, or 2×8) are relatively high. However, the small block with the size of 2×2 or 2×4 is generated in such a split mode. This is unfavorable to implementation of the hardware decoder. It is relatively complex for the hardware decoder to process the small block. The complexity is specifically reflected in the following three areas.

(1) Intra prediction: To increase a processing speed, hardware is designed to generally process 16 pixels at a time during intra prediction. However, a small block with a size such as 2×2, 2×4, or 4×2 includes fewer than 16 pixels. As a result, processing performance of intra prediction deteriorates.

(2) Coefficient coding: In HEVC, transform coefficient coding is performed based on a coefficient group (coefficient group, CG) including 16 coefficients. However, the small block with the size such as 2×2, 2×4, or 4×2 includes four or eight transform coefficients. As a result, a coefficient group including four coefficients or eight coefficients should be added to support coefficient coding for these small blocks. As a result, implementation complexity is increased.

(3) Inter prediction: Inter prediction for the small block has a relatively high requirement on data bandwidth. As a result, a decoding processing speed is affected.

TABLE 2

| coding_unit(x0,y0,cbWidth,cbHeight,treeType) { | Descriptor |
|---|---|
| if(slice_type != I \|\| sps_ibc_enabled_flag ) { | |
|   if( treeType != DUAL_TREE_CHROMA ) | |
|     cu_skip_flag[x0][y0] | ae(v) |
|   if( cu_skip_flag[x0][y0] == 0 && slice_type != I) | |
|     pred_mode_flag | ae(v) |
|     if( ( ( slice type == I && cu_skip_flag[x0][y0] ==0 ) \|\| | |
|     ( slice type != I && ( CuPredMode[x0][y0] != MODE_INTRA \|\| | |
|     ( cbWidth == 4 && cbHeight == 4 && cu_skip_flag[x0][y0] == | |
| 0 ) ) ) ) && | |
|     sps_ibc_enabled_flag && ( cbWidth != 128 \|\| cbHeight != | |
| 128 ) ) | |
|     pred_mode_ibc_flag | ae(v) |
|   ... | |
| } | |
| if( CuPredMode[x0][y0] == MODE_INTRA ) { | |
|   ... | |
| } else if( treeType != DUAL_TREE_CHROMA ) {/* MODE_INTER or MODE_IBC */ | |
|   if( cu_skip_flag[x0][y0] ==0 ) | |
|     general_merge_flag [x0][y0] | ae(v) |
|   ... | |
| } | |
| } | |

When a child node includes a chroma block with a side length of 2 in child nodes that are generated by further splitting a node in a split mode, a luma block included in the child node is further split in the split mode, and the chroma block included in the child node is not further split. In this way, a chroma block with the side length of 2 is not generated. This reduces a maximum throughput rate of the decoder, and is favorable to implementation of the decoder. In addition, a method for determining a chroma block prediction mode based on a luma block prediction mode is provided, so that coding efficiency is effectively improved.

An image prediction method provided in this disclosure may be used for a video encoder 18 or a video decoder 24 shown in FIG. 8. It should be noted that one or more operations in the following several embodiments are performed on only the video decoder 24, and are especially described in a corresponding part in the following.

The following describes the image prediction method in this disclosure in detail by using specific embodiments. It should be noted that the following several specific embodiments may be combined with each other, and same or similar content is not repeatedly described in different embodiments.

Figure 9:
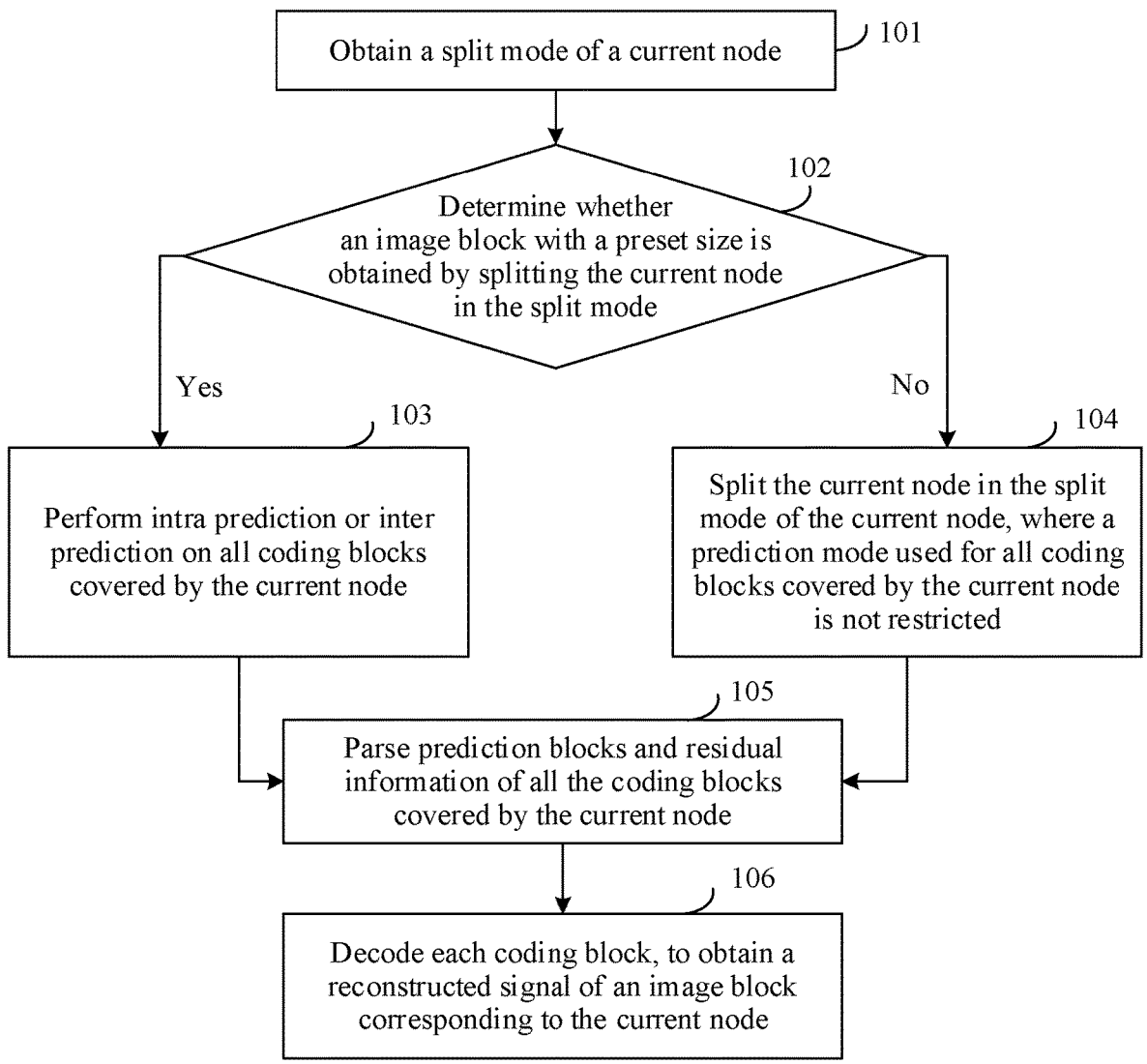
FIG. 9 is a schematic flowchart of a first image prediction method according to an embodiment of this disclosure.

FIG. 9 is a schematic flowchart of a first image prediction method according to an embodiment of this disclosure. Referring to FIG. 9, the image prediction method provided in this embodiment includes the following operations.

Operation 101: Obtain a split mode of a current node.

In this embodiment, split information of the current node is first parsed, where the split information is used to indicate to split or not to split the current node. If the split information indicates to split the current node, the split mode of the current node is obtained. The split mode of the current node includes at least one of quadtree split, vertical binary tree split, horizontal binary tree split, vertical ternary tree split, and horizontal ternary tree split. Certainly, there may be another split mode. This is not specifically limited in this embodiment.

The split information of the current node may be transmitted in a bitstream. The split information of the current node may be parsed from a corresponding syntax element in the bitstream, and the specific split mode may be determined. The split mode of the current node may be alternatively determined according to another preset rule. This is not specifically limited in this embodiment.

In this embodiment, if the split information that is of the current node and that is obtained through parsing is used to indicate to split the current node, the split information specifically includes a split mode of a luma block included in the current node, and/or a split mode of a chroma block included in the current node. The split mode of the luma block included in the current node may be the same as or different from the split mode of the chroma block included in the current node. This is not specifically limited in this embodiment. For example, the split information is used to indicate that quadtree split is used for both the luma block and the chroma block of the current node. Alternatively, the split information is used to indicate that quadtree split is used for the luma block of the current node and vertical binary tree split is used for the chroma block of the current node.

Operation 102: Determine whether an image block with a preset size is obtained by splitting the current node in the split mode.

The image block with the preset size may be a luma block with a size less than a threshold. The threshold may be a quantity of luma samples, such as 128, 64, or 32, or a quantity of chroma samples, such as 32, 16, or 8. A size of the current node may be greater than or equal to the threshold.

When it is determined that the image block with the preset size is obtained by splitting the current node in the split mode, operation 103 is performed. When it is determined that the image block with the preset size is not obtained by splitting the current node in the split mode, operation 104 is performed.

Operation 103: Perform intra prediction or inter prediction on all coding blocks covered by the current node.

It should be noted that the current node in this embodiment may be understood as an image region or image block corresponding to a to-be-processed node or to-be-split node. All the coding blocks covered by the current node may be understood as all coding blocks located in a region corresponding to the current node. All the coding blocks in this embodiment include a luma coding block and a chroma coding block that are obtained by splitting or not splitting the current node. The coding block may be alternatively a coding unit.

Optionally, the performed intra prediction may be a common intra prediction mode or an intra block copy (IBC) mode.

Optionally, when a type (slice type) of a slice in which the current node is located is an intra type, intra prediction, instead of inter prediction, is performed on all the coding blocks covered by the current node.

In an implementation, the performing intra prediction on all coding blocks covered by the current node may include:

splitting, in the split mode, the luma block included in the current node to obtain luma blocks obtained through splitting, and performing intra prediction on the luma blocks obtained through splitting; and using the chroma block included in the current node as a chroma coding block, and performing intra prediction on the chroma coding block.

In other words, if it is determined that intra prediction is performed on all the coding blocks of the current node, the luma block of the current node is split in the split mode of the luma block, to obtain N luma coding tree nodes; and the chroma block of the current node is not split, to obtain one chroma coding block (CB).

It may be restricted that the N luma coding tree nodes are not further split, or this is not restricted. If the luma coding tree node is further split, a split mode of the luma coding tree node is parsed for recursive split. When the luma coding tree node is not further split, the luma coding tree node corresponds to one luma coding block (luma CB). Intra prediction is performed on the luma CB to obtain a luma prediction block corresponding to the luma CB.

Intra prediction is performed on the chroma CB to obtain a chroma prediction block corresponding to the chroma CB. The chroma prediction block and the chroma CB have a same size.

In an implementation, the performing inter prediction on all coding blocks covered by the current node may include:

splitting, in the split mode, the luma block included in the current node to obtain luma blocks obtained through splitting, and performing inter prediction on the luma blocks obtained through splitting; and using the chroma block included in the current node as a chroma coding block, and performing inter prediction on the chroma coding block.

In other words, if it is determined that inter prediction is performed on all the coding blocks of the current node, the luma block of the current node is split in the split mode of the luma block, to obtain N luma coding tree nodes; and the chroma block of the current node is not split, to obtain one chroma coding block (chroma CB).

In this embodiment, when it is determined that intra prediction is performed on all the coding blocks of the current node, or when it is determined that inter prediction is performed on all the coding blocks of the current node, the luma block included in the current node is split in the split mode of the current node, and the chroma block of the current node is not further split. According to the foregoing method, a small chroma block on which intra prediction is performed is not generated, and therefore a case in which intra prediction is performed on the small chroma block is avoided.

In an implementation, the performing inter prediction on all coding blocks covered by the current node may include:

splitting, in the split mode, the luma block included in the current node to obtain luma blocks obtained through splitting, and performing inter prediction on the luma blocks obtained through splitting; and splitting, in the split mode, the chroma block included in the current node to obtain chroma blocks obtained through splitting, and performing inter prediction on the chroma blocks obtained through splitting.

In other words, if it is determined that inter prediction is performed on all the coding blocks of the current node, the luma block of the current node is split in the split mode of the luma block, to obtain N luma coding tree nodes; and the chroma block of the current node is split in the split mode of the chroma block, to obtain M chroma coding tree nodes. N and M are positive integers, and N and M may be the same or different. It may be restricted that the N luma coding tree nodes and the M chroma coding tree nodes are not further split, or this is not restricted. When no further splitting is performed, the N luma coding tree nodes correspond to N luma CBs of the current node and the M chroma coding tree nodes correspond to M chroma CBs of the current node. Inter prediction is performed on the N luma CBs to obtain corresponding luma prediction blocks, and inter prediction is performed on the M chroma CBs to obtain corresponding chroma prediction blocks.

Optionally, when inter prediction is performed on all the coding blocks covered by the current node, the performing inter prediction on all coding blocks covered by the current node may include:

obtaining a split sub-mode of a child node of the current node, where the child node includes a luma block and a chroma block; determining whether a luma block with a first preset size is obtained by splitting the child node of the current node in the split sub-mode; and when it is determined that the luma block with the first preset size is obtained by splitting the child node of the current node in the split sub-mode, splitting the child node of the current node in a split mode other than the split sub-mode, to obtain a corresponding coding block, and performing inter prediction on the corresponding coding block; or using the child node of the current node as a coding block, and performing inter prediction on the child node of the current node.

In other words, if the luma block with the first preset size (4×4) is generated by splitting the child node of the current node in the split sub-mode, the split sub-mode of the child node is not allowed, or the child node is not allowed to be further split, or the child node is split in the split mode other than the split sub-mode. For example, if the size of the current node is 8×8 and two 8×4 (or 4×8) nodes are generated through horizontal binary tree split (or vertical binary tree split), 4×4 blocks are generated if the 8×4 (or 4×8) node is further split. In this case, the 8×4 (or 4×8) node is not allowed to be further split.

Operation 104: Split the current node in the split mode of the current node, where a prediction mode used for all the coding blocks covered by the current node is not restricted.

Specifically, the luma block of the current node is split in the split mode of the luma block of the current node, and the chroma block of the current node is split in the split mode of the chroma block of the current node.

It should be noted that, that "a prediction mode used for all the coding blocks covered by the current node is not restricted" in operation 104 may be understood as: All the coding blocks covered by the current node may not be predicted in a same prediction mode, that is, a prediction mode of each coding block is parsed, and each coding block is predicted in the prediction mode obtained through parsing.

Optionally, after operation 103 or operation 104, the method further includes:

Operation 105: Parse prediction blocks and residual information of all the coding blocks covered by the current node.

Operation 106: Decode each coding block to obtain a reconstructed signal of an image block corresponding to the current node.

It should be noted that the foregoing two operations may be used for the video decoder 24 shown in FIG. 8.

The prediction block includes a prediction mode (indicating the intra prediction mode or a non-intra prediction mode), the intra prediction mode, the inter prediction mode, motion information, and the like. The motion information may include information such as a prediction direction (a forward, backward, or bidirectional direction), a reference frame index, and a motion vector.

The residual information includes: a coded block flag (coded block flag, cbf), a transform coefficient, a transform type (such as DCT-2, DST-7, or DCT-8), and the like. The transform type may be DCT-2 by default.

If it is restricted that only intra prediction is performed on all the coding blocks covered by the current node, parsing of a prediction block of the luma CB obtained by splitting the current node includes: respectively setting a value of skip_flag, a value of merge_flag, and a value of cu_pred_mode to 0, 0, and 1 by default (that is, skip_flag, merge_flag, and cu_pred_mode are all absent from the bitstream), or respectively setting a value of skip_flag and a value of cu_pred_mode to 0 and 1 by default (that is, skip_flag and cu_pred_mode are both absent from the bitstream); and parsing information about the intra prediction mode of the luma CB. Parsing of a prediction block of the chroma CB obtained by splitting the current node includes: parsing the intra prediction mode of the chroma CB. The intra prediction mode of the chroma CB may be parsed according to the following method: (1) parsing a syntax element in the bitstream to obtain the intra prediction mode; or (2) directly setting the intra prediction mode to one intra prediction mode in a set of chroma intra prediction modes such as a linear model mode, a DM mode (chroma derived mode, DM), an IBC mode, and the like.

If it is restricted that only inter prediction is performed on all the coding blocks covered by the current node, parsing of a prediction mode of a CU obtained by splitting the current node includes: parsing skip_flag or/and merge_flag, setting a value of cu_pred_mode to 0 by default, and parsing an inter prediction block such as a merge index (merge index), an inter direction (inter dir), a reference index (reference index), a motion vector predictor index (motion vector predictor index), and a motion vector difference (motion vector difference).

skip_flag is a flag of a skip mode. When the value of skip_flag is 1, it indicates that the skip mode is used for a current CU, or when the value of skip_flag is 0, it indicates that the skip mode is not used for a current CU. merge_flag is a flag of a merge mode. When the value of merge_flag is 1, it indicates that the merge mode is used for the current CU, or when the value of merge_flag is 0, it indicates that the merge mode is not used for the current CU. cu_pred_mode represents a coding unit prediction mode flag. When the value of cu_pred_mode is 1, it indicates that intra prediction is performed on a current prediction unit, or when the value of cu_pred_mode is 0, it indicates that common inter prediction (identifying information such as an inter direction, a reference index, a motion vector predictor index, and a motion vector difference in the bitstream) is performed on a current prediction unit.

Optionally, if it is restricted that only inter prediction is performed on all the coding blocks covered by the current node, parsing of a prediction block of the luma CB obtained by splitting the current node includes: parsing skip_flag or/and merge_flag, setting a value cu_pred_mode to 0 by default, and parsing an inter prediction block such as a merge index), an inter direction (inter dir), a reference index, a motion vector predictor index, and a motion vector difference. Motion information of each 4×4 subblock in the luma CB is derived based on the inter prediction block obtained through parsing. If it is restricted that only inter prediction is performed on all the coding blocks covered by the current node, a prediction block of the chroma CB obtained by splitting the current node does not need to be parsed. The chroma CB is split into 2×2 chroma subblocks (the split mode may be a split mode S). Motion information of each 2×2 chroma subblock is motion information of a 4×4 luma region corresponding to each 2×2 chroma subblock. In the foregoing split mode, a small chroma block on which intra prediction is performed is not generated, and a transform block with a size fewer than 16 pixels is not generated, either. Therefore, the foregoing described problem in inter prediction and problem in coefficient coding is overcome.

Optionally, if it is restricted that only inter prediction is performed on all the coding blocks covered by the current node, a prediction block of the chroma CB obtained by splitting the current node does not need to be parsed. The chroma prediction block and the chroma coding block have a same size. Motion information of the chroma CB is motion information of a preset location in a luma region (for example, the center, the lower-right corner, or the upper-left corner of the luma region) corresponding to the chroma CB. In the foregoing split mode, a small chroma block on which intra prediction is performed is not generated, a small transform block is not generated, and a small chroma block on which inter prediction is performed is not generated, either.

It should be noted that, in this embodiment, the intra prediction mode is a prediction mode in which a predictor of a coding block is generated by using a spatial domain reference pixel of an image in which the coding block is located. For example, the intra prediction mode is a direct current mode (DC mode), a planar mode, an angular mode, a template matching mode, or an IBC mode. The inter prediction mode is a prediction mode in which a predictor of a coding block is generated by using a temporal domain reference pixel in a reference image of the coding block. For example, the inter prediction mode is a skip mode, a merge mode, or an advanced motion vector prediction (AMVP) mode (which is also referred to as a common inter mode).

Inter prediction or intra prediction is performed on each coding block based on the prediction block of the coding block, to obtain an inter prediction image or an intra prediction image of the coding block. Then, based on residual information of each coding block, dequantization and inverse transform processing are performed on the transform coefficient to obtain a residual image, and the residual image is added to the prediction image of the corresponding region to generate a reconstructed image.

Optionally, in a possible implementation, the image block with the preset size includes the luma block with the first preset size, and accordingly, operation 102 includes:

determining whether the luma block with the first preset size is obtained by splitting the current node in the split mode of the luma block of the current node, where the luma block with the first preset size is a luma block with a pixel size of 4×4.

When the luma block with the first preset size is obtained by splitting the luma block of the current node in the split mode of the luma block of the current node, accordingly, operation 103 includes: performing intra prediction on all the coding blocks covered by the current node.

When the luma block with the first preset size is not obtained by splitting the luma block of the current node in the split mode of the luma block of the current node, accordingly, operation 104 includes: splitting the luma block of the current node in the split mode of the luma block of the current node, and splitting the chroma block of the current node in the split mode of the chroma block of the current node, where the prediction mode used for all the coding blocks covered by the current node is not restricted.

Optionally, in another possible implementation, the image block with the preset size includes a chroma block with a second preset size, and accordingly, operation 102 includes:

determining whether the chroma block with the second preset size is obtained by splitting the current node in the split mode of the chroma block of the current node, where the chroma block with the second preset size is a chroma block with a pixel size of 2×2, 2×4, or 4×2.

When the chroma block with the second preset size is obtained by splitting the chroma block of the current node in the split mode of the chroma block of the current node, accordingly, operation 103 includes: performing intra prediction or inter prediction for all the coding blocks covered by the current node.

When the chroma block with the second preset size is not obtained by splitting the chroma block of the current node in the split mode of the chroma block of the current node, accordingly, operation 104 includes: splitting the chroma block of the current node in the split mode of the chroma block of the current node, and splitting the luma block of the current node in the split mode of the luma block of the current node, where the prediction mode used for all the coding blocks covered by the current node is not restricted.

According to the image prediction method provided in this embodiment, the split mode of the current node is obtained, and it is determined whether the image block with the preset size is obtained by splitting the current node in the split mode of the current node, where the image block includes the luma block or the chroma block. When the image block with the preset size is obtained by splitting the current node in the split mode of the current node, intra prediction or inter prediction is performed on all the coding blocks covered by the current node. According to the foregoing method, intra prediction or inter prediction is performed on all the coding blocks of the current node, so that parallel processing for all the coding blocks of the current node can be implemented. This improves processing performance of image prediction, and increases a coding processing speed.

Based on the embodiment shown in FIG. 9, a process of determining, according to an image prediction method provided in the following embodiment, whether a luma block with a first preset size is obtained by splitting a current node in a split mode of the luma block of the current node is described in detail. A set of conditions for determining whether the luma block with the first preset size is obtained are specifically disclosed.

Figure 10:
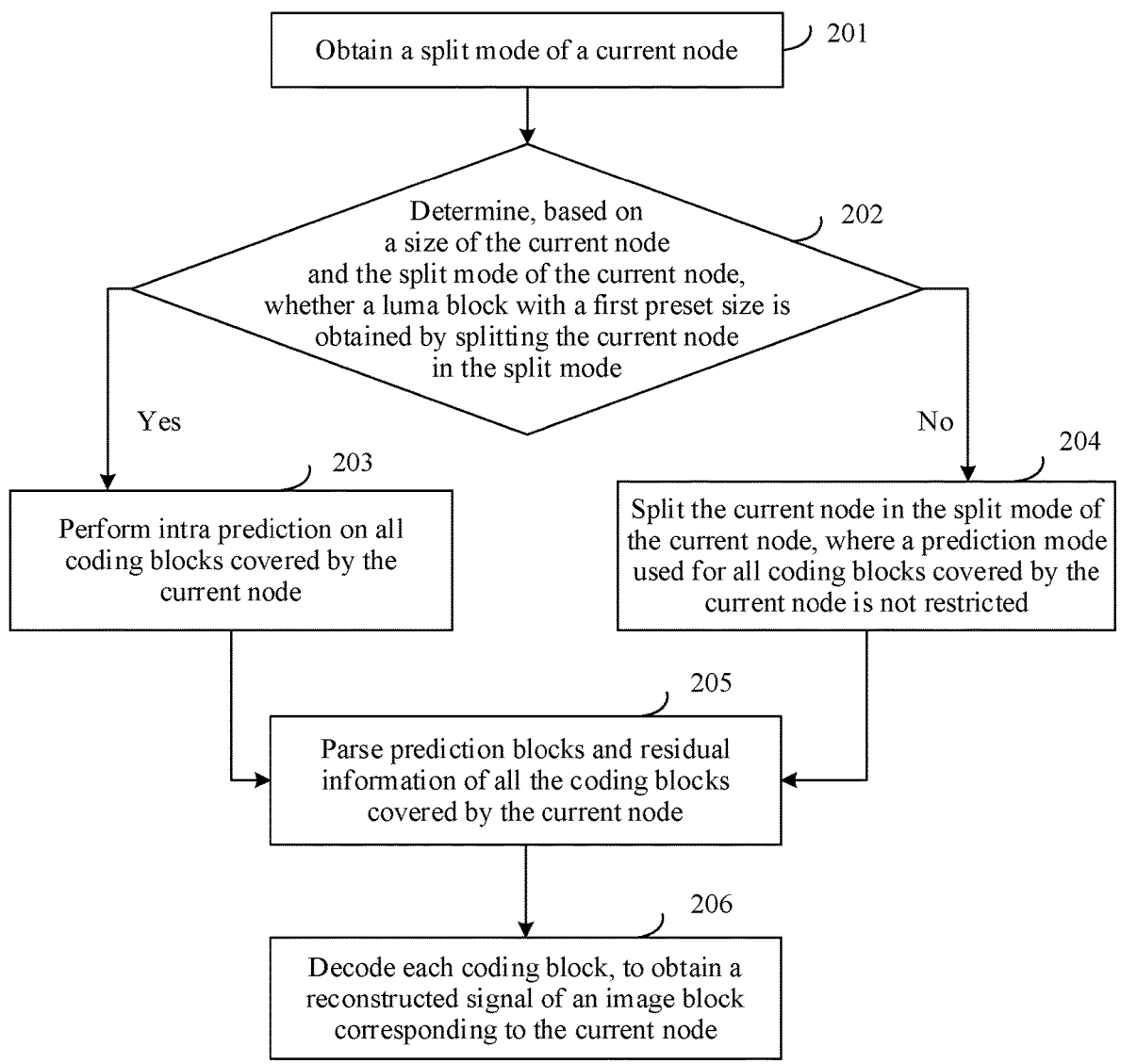
FIG. 10 is a schematic flowchart of a second image prediction method according to an embodiment of this disclosure.

FIG. 10 is a schematic flowchart of a second image prediction method according to an embodiment of this disclosure. As shown in FIG. 10, the image prediction method provided in this embodiment includes the following operations.

Operation 201: Obtain a split mode of a current node.

Specifically, split information of the current node is parsed. If the split information indicates to split a luma block of the current node, a split mode of the luma block of the current node is further determined. The split mode of the luma block includes at least one of quadtree split, vertical binary tree split, horizontal binary tree split, vertical ternary tree split, and horizontal ternary tree split. Certainly, there may be another split mode. This is not specifically limited in this embodiment.

Operation 202: Determine, based on a size of the current node and the split mode of the current node, whether a luma block with a first preset size is obtained by splitting the current node in the split mode.

The luma block with the first preset size may be a luma block with a pixel size of 4×4 or 8×8.

When it is determined that the luma block with the first preset size is obtained by splitting the current node in the split mode, operation 203 is performed. When it is determined that the luma block with the first preset size is not obtained by splitting the current node in the split mode, operation 204 is performed.

Specifically, it is determined, based on the size of the current node and the split mode of the luma block of the current node, whether the luma block with the first preset size is obtained by splitting the current node in the split mode of the luma block.

In this embodiment, the size of the current node may be understood as a pixel size of an image block corresponding to the current node. The size of the current node may be determined based on the width and the height of the image block corresponding to the current node, or may be determined based on an area of the image block corresponding to the current node, or may be determined based on a quantity of luma pixels of the image block corresponding to the current node. For example, that the current node includes 128 luma pixels may be described as that an area of the current node is 128, or may be described as that a product of the width and the height of the current node is 128.

The determining, based on the size of the current node and the split mode of the luma block of the current node, the luma block with the first preset size is obtained by splitting the current node in the split mode of the luma block is performed based on one or more conditions of the following first set:

(1) the current node includes M1 pixels, and the split mode of the current node is quadtree split, where for example, M1 is 64;

(2) the current node includes M2 pixels, and the split mode of the current node is ternary tree split, where for example, M2 is 64;

(3) the current node includes M3 pixels, and the split mode of the current node is binary tree split, where for example, M3 is 32;

(4) the current node includes 64 luma pixels, and ternary tree split (vertical ternary tree split or horizontal ternary tree split) or quadtree split is used for the current node; or the current node includes 32 luma pixels, and binary tree split (vertical binary tree split or horizontal binary tree split) is used for the current node;

(5) the width of the current node is four times a second threshold, the height of the current node is equal to the second threshold, and the split mode of the current node is vertical ternary tree split;

(6) the width of the current node is equal to a second threshold, the height of the current node is four times the second threshold, and the split mode of the current node is horizontal ternary tree split;

(7) the width of the current node is twice a second threshold, the height of the current node is equal to the second threshold, and the split mode of the current node is vertical binary tree split;

(8) the height of the current node is twice a second threshold, the width of the current node is equal to the second threshold, and the split mode of the current node is horizontal binary tree split; or (9) the width or/and the height of the current node is/are twice a second threshold, and the split mode of the current node is quadtree split.

In the foregoing first set, the width of the current node is the width of the luma block corresponding to the current node, and the height of the current node is the height of the luma block corresponding to the current node. In a specific implementation, for example, the second threshold may be 4.

The foregoing first set is applicable to a video data format of YUV 4:2:0 or YUV 4:2:2.

Optionally, when the luma block with the first preset size is the luma block with the pixel size of 4×4, the determining, based on a size of the current node and the split mode of the current node, whether a luma block with a first preset size is obtained by splitting the current node in the split mode may be performed based on one of the following conditions:

(1) a quantity of samples of the luma block of the current node is 64, and the split mode is quadtree split;

(2) a quantity of samples of the luma block of the current node is 64, and the split mode is ternary tree split; or (3) a quantity of samples of the luma block of the current node is 32, and the split mode is binary tree split.

The quantity of samples of the luma block of the current node is a quantity of luma pixels (pixel size) of the image block corresponding to the current node.

Operation 203: Perform intra prediction on all coding blocks covered by the current node.

In an alternative manner of operation 203, intra prediction may be performed only on a coding block of the luma block with the first preset size, and a prediction mode for another coding block covered by the current node is not restricted.

The performing intra prediction on all coding blocks covered by the current node may include:

splitting, in the split mode, the luma block included in the current node to obtain luma blocks obtained through splitting, and performing intra prediction on the luma blocks obtained through splitting; and using a chroma block included in the current node as a chroma coding block, and performing intra prediction on the chroma coding block.

In other words, if it is determined that intra prediction is performed on all the coding blocks of the current node, the luma block of the current node is split in the split mode of the luma block, to obtain N luma coding tree nodes; and the chroma block of the current node is not split, to obtain one chroma coding block (chroma CB).

It may be restricted that the N luma coding tree nodes are not further split, or this is not restricted. If the luma coding tree node is further split, a split mode of the luma coding tree node is parsed for recursive split. When the luma coding tree node is not further split, the luma coding tree node corresponds to one luma coding block (luma CB). Intra prediction is performed on the luma CB to obtain a luma prediction block corresponding to the luma CB.

Intra prediction is performed on the chroma CB to obtain a chroma prediction block corresponding to the chroma CB. The chroma prediction block and the chroma CB have a same size.

Optionally, the performing intra prediction on all coding blocks covered by the current node may include:

using the luma block included in the current node as a luma coding block, and performing intra prediction on the luma coding block; and using the chroma block included in the current node as a chroma coding block, and performing intra prediction on the chroma coding block. In other words, both the luma block and the chroma block of the current node may not be further split.

Operation 204: Split the current node in the split mode of the current node, where a prediction mode used for all the coding blocks covered by the current node is not restricted.

Operation 204 in this embodiment is the same as operation 104 in the embodiment shown in FIG. 9. For details, refer to the foregoing embodiment. Details are not described herein again.

Optionally, after operation 203 or operation 204, the method further includes:

Operation 205: Parse prediction blocks and residual information of all the coding blocks covered by the current node.

Operation 206: Decode each coding block to obtain a reconstructed signal of the image block corresponding to the current node.

Operation 205 and operation 206 in this embodiment are the same as operation 105 and operation 106 in the embodiment shown in FIG. 9. For details, refer to the foregoing embodiment. Details are not described herein again.

According to the image prediction method provided in this embodiment, the split mode of the current node is obtained; whether the luma block with the first preset size is obtained by splitting the current node in the split mode of the luma block is determined based on the size of the current node and the split mode of the luma block; and when it is determined that the luma block with the first preset size is obtained by splitting the current node in the split mode of the luma block, intra prediction is performed on all the coding blocks covered by the current node. According to the foregoing method, intra prediction is performed on all the coding blocks of the current node, so that parallel processing for all the coding blocks of the current node can be implemented. This improves processing performance of image prediction, and increases a coding processing speed.

Figure 11:
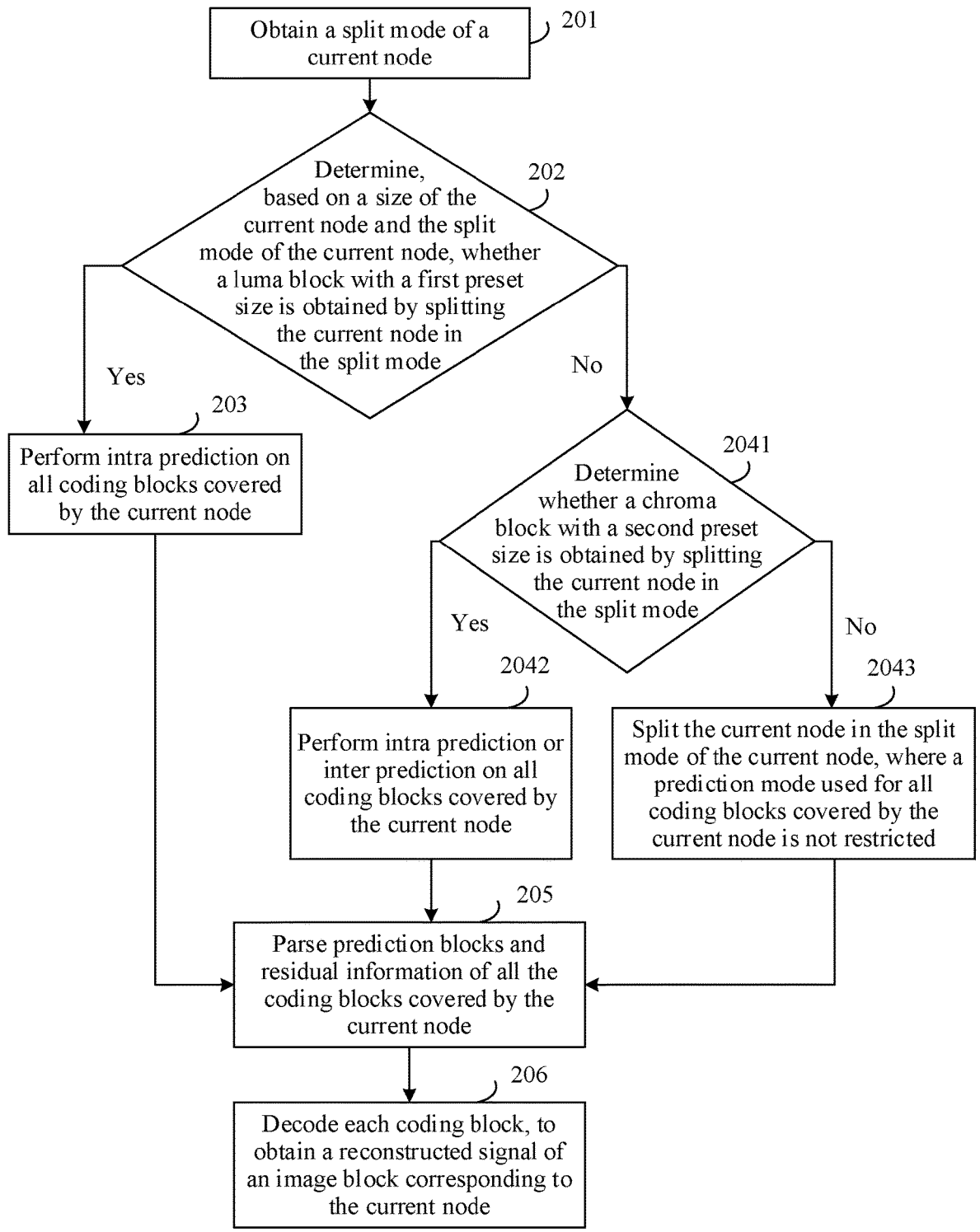
FIG. 11 is a schematic flowchart of a third image prediction method according to an embodiment of this disclosure.

FIG. 11 is a schematic flowchart of a third image prediction method according to an embodiment of this disclosure. Based on the embodiment shown in FIG. 10, as shown in FIG. 11, it should be noted that a solution shown in FIG. 11 may be a solution used in a case of a video data format of YUV 4:2:0 or YUV 4:2:2 or in a case of a video data format of only YUV 4:2:0. When it is determined that the luma block with the first preset size is not obtained by splitting the current node in the split mode, operation 204 may include the following operations.

Operation 2041: Determine whether a chroma block with a second preset size is obtained by splitting the current node in the split mode.

When it is determined that the chroma block with the second preset size is obtained by splitting the current node in the split mode, operation 2042 is performed. When it is determined that the chroma block with the second preset size is not obtained by splitting the current node in the split mode, operation 2043 is performed.

Specifically, operation 2041 includes: determining, based on the size of the current node and a split mode of the chroma block, whether the chroma block with the second preset size is obtained by splitting the current node in the split mode of the chroma block. The chroma block with the second preset size may be a chroma block with a pixel size of 2×2, 2×4, or 4×2.

The determining, based on the size of the current node and a split mode of the chroma block, the chroma block with the second preset size is obtained by splitting the current node in the split mode of the chroma block is performed based on one or more conditions of the following second set.

When the video data format is YUV 4:2:2, the second set includes:

(1) a size of a chroma block of at least one child node of the current node is 2×2, 2×4, or 4×2;

(2) the width or the height of a chroma block of at least one child node of the current node is 2;

(3) the current node includes 64 luma pixels, and the split mode of the current node is ternary tree split or quadtree split;

(4) the current node includes 32 luma pixels, and the split mode of the current node is binary tree split or ternary tree split; or (5) an area (or a product of the width and the height) of the current node is S, where S/2<th1, and the split mode of the current node is vertical binary tree split or horizontal binary tree split; or an area (or a product of the width and the height) of the current node is S, where S/4<th1, and the split mode of the current node is vertical ternary tree split, horizontal ternary tree split, or quadtree split. The threshold th1 is 32.

When the video data format is YUV 4:2:0, the second set includes:

(1) a size of a chroma block of at least one child node of the current node is 2×2, 2×4, or 4×2;

(2) the width or the height of a chroma block of at least one child node of the current node is 2;

(3) the current node includes 128 luma pixels, and ternary tree split is used for the current node; or the current node includes 64 luma pixels, and binary tree split, quadtree split, or ternary tree split is used for the current node;

(4) the current node includes 256 luma pixels, and ternary tree split or quadtree split is used for the node; or the current node includes 128 luma pixels, and binary tree split is used for the node;

(5) the current node includes N1 luma pixels, and ternary tree split is used for the current node, where N1 is 64, 128, or 256;

(6) the current node includes N2 luma pixels, and quadtree split is used for the current node, where N2 is 64 or 256;

(7) the current node includes N3 luma pixels, and binary tree split is used for the current node, where N3 is 64, 128, or 256; or (8) an area (or a product of the width and the height) of the current node is S, where S/2<th1, and the split mode of the current node is vertical binary tree split or horizontal binary tree split; or an area (or a product of the width and the height) of the current node is S, where S/4<th1, and the split mode of the current node is vertical ternary tree split, horizontal ternary tree split, or quadtree split. The threshold th1 is 64.

Optionally, the luma block with the first preset size may be a 4×4 luma block. When the luma block with the first preset size is the 4×4 luma block, the chroma block with the second preset size may be a pixel size of 2×4 chroma block or a pixel size of 4×2 chroma block, excluding a 2×2 chroma block.

Optionally, the luma block with the first preset size may be a 4×4 luma block. When the luma block with the first preset size is the 4×4 luma block, the chroma block with the second preset size may be a 4×8 luma block or an 8×4 luma block, excluding a 4×4 luma block.

Optionally, when the chroma block with the second preset size is a 2×4 chroma block, a 4×2 chroma block, a 4×8 luma block, or an 8×4 luma block, the determining whether a chroma block with a second preset size is obtained by splitting the current node in the split mode may be performed based on one of the following conditions:

(1) a quantity of samples of the luma block of the current node is 64, and the split mode is binary tree split; or (2) a quantity of samples of the luma block of the current node is 128, and the split mode is ternary tree split.

Operation 2042: Perform intra prediction or inter prediction on all the coding blocks covered by the current node.

Whether intra prediction or inter prediction is performed on all the coding blocks covered by the current node may be determined according to the following method.

Method 1: Parse a prediction mode status flag of the current node; and when a value of the prediction mode status flag is a first value, perform inter prediction on all the coding blocks covered by the current node; or when a value of the prediction mode status flag is a second value, perform intra prediction on all the coding blocks covered by the current node.

In this method, a prediction mode used for all the coding blocks covered by the current node is actually determined based on a flag in a syntax table. Specifically, a prediction mode status flag cons_pred_mode_flag is parsed from a bitstream. When the first value of cons_pred_mode_flag is set to 0, it indicates that inter prediction is performed on all the coding blocks that are obtained by splitting or not splitting the current node, and the second value of cons_pred_mode_flag is set to 1, it indicates that intra prediction is performed on all the coding blocks that are obtained by splitting or not splitting the current node. Optionally, when the first value of cons_pred_mode_flag is set to 1, it indicates that inter prediction is performed on all the coding blocks that are obtained by splitting or not splitting the current node, and when the second value of cons_pred_mode_flag is set to 0, it indicates that intra prediction is performed on all the coding blocks that are obtained by splitting or not splitting the current node. A meaning of cons_pred_mode_flag may be alternatively indicated by another flag (for example, mode_cons_flag). This is not limited in this embodiment.

cons_pred_mode_flag may be a syntax element that should be parsed during block splitting. When the syntax element is parsed, a coding unit prediction mode flag cu_pred_mode of a coding unit in a coverage region of the current node may not be further parsed, and a value of cu_pred_mode is a default value corresponding to the value of cons_pred_mode_flag.

The syntax element cons_pred_mode_flag is semantically described as: When the value of cons_pred_mode_flag is 0, it indicates that only inter prediction is performed on the coding units covered by the current node; or when the value of cons_pred_mode_flag is 1, it indicates that only intra prediction is performed on the coding blocks covered by the current node.

If the current node is located in an intra image region (that is, a type of an image or a slice (slice_type) in which the current node is located is an intra type or an I type), and an IBC mode is allowed to be used, the value of cu_pred_mode is derived as 1, and the value of cu_pred_mode is obtained with no need to parse the bitstream. If the current node is located in an intra image region but an IBC mode is not allowed to be used, the value of cu_pred_mode is derived as 1, a value of cu_skip_flag is 0, and the value of cu_pred_mode is obtained with no need to parse the bitstream.

If the current node is located in an inter image region (that is, a type of an image or a slice (slice_type) in which the current node is located is an inter type or a B type), a value of cu_pred_mode is derived as 0, and the value of cu_pred_mode is obtained with no need to parse the bitstream.

The IBC prediction mode may be considered as an intra prediction mode because a reference pixel of IBC prediction is a reconstructed pixel in a current image. Therefore, in this embodiment of this disclosure, intra prediction may include the IBC mode. In other words, in this embodiment of this disclosure, the IBC mode, a common intra prediction mode, or the IBC mode+the common intra prediction mode may be used for intra prediction. Therefore, in this embodiment of this disclosure, it may be conclusively understood that intra prediction is non-inter prediction.

Optionally, the type (slice type) of the slice in which the current node is located is not the intra type.

Method 2: When a prediction mode used for any coding block covered by the current node is inter prediction, inter prediction is performed on all the coding blocks covered by the current node; or when a prediction mode used for any coding block covered by the current node is intra prediction, intra prediction is performed on all the coding blocks covered by the current node.

In this method, the prediction mode used for all the coding blocks covered by the current node is actually determined based on the prediction mode used for any coding block covered by the current node.

Optionally, the any coding block is a $1^{st}$ coding block of all the coding blocks covered by the current node in a decoding order. Specifically, a prediction mode of a $1^{st}$ coding block B0 in the region of the current node is parsed, and the prediction mode of the $1^{st}$ coding block B0 is not limited in this embodiment. When it is learned, through parsing, that the prediction mode of the coding block B0 is intra prediction, intra prediction is performed on all the coding blocks covered by the current node. When it is learned, through parsing, that the prediction mode of the coding block B0 is inter prediction, inter prediction is performed on all the coding blocks covered by the current node.

It should be noted that operations performed according to the foregoing method 1 and method 2 may be used for the video decoder 24 shown in FIG. 8.

Operation 2043: Split the current node in the split mode of the current node, where the prediction mode used for all the coding blocks covered by the current node is not restricted.

Optionally, after operation 203 or operation 2042 or operation 2043, the method further includes the following operations.

Operation 205: Parse prediction blocks and residual information of all the coding blocks covered by the current node.

Operation 206: Decode each coding block to obtain a reconstructed signal of an image block corresponding to the current node.

Operation 205 and operation 206 in this embodiment are the same as operation 105 and operation 106 in the embodiment shown in FIG. 9. For details, refer to the foregoing embodiment. Details are not described herein again.

According to the image prediction method provided in this embodiment, the split mode of the current node is obtained; whether the luma block with the first preset size is obtained by splitting the current node in the split mode of the luma block is determined based on the size of the current node and the split mode of the luma block; when it is determined that the luma block with the first preset size is obtained by splitting the current node in the split mode of the luma block, whether the chroma block with the second preset size is obtained by splitting the current node in the split mode of the chroma block is further determined; and when it is determined that the chroma block with the second preset size is obtained by splitting the current node in the split mode of the chroma block, intra prediction or inter prediction is performed on all the coding blocks covered by the current node. According to the foregoing method, intra prediction or inter prediction is performed on all the coding blocks of the current node, so that parallel processing for all the coding blocks of the current node can be implemented. This improves processing performance of image prediction, and increases a coding processing speed.

The following describes, with reference to two specific examples, the image prediction method provided in the embodiment shown in FIG. 11.

The first example is applicable to the video data format of YUV 4:2:0 or YUV 4:2:2, or is applicable only to the video data format of YUV 4:2:0.

The image prediction method in this example includes the following operations.

Operation 1: Obtain a split mode of a current node.

Operation 2: Determine whether an area of the current node and the split mode of the current node satisfy at least one condition of the following conditions A:

(1) the area of the current node is equal to 32, and the split mode of the current node is vertical binary tree split or horizontal binary tree split; or (2) the area of the current node is equal to 64, and the split mode of the current node is vertical ternary tree split, horizontal ternary tree split, or quadtree split.

If the area of the current node and the split mode of the current node satisfy at least one condition of the conditions A, operation 3 is performed.

Operation 3: Restrict that intra prediction is performed on all coding blocks covered by the current node.

Optionally, a value of cons_pred_mode_flag is set to 1.

If the area of the current node and the split mode of the current node do not satisfy the conditions A, operation 4 is performed.

Operation 4: Determine whether the area of the current node and the split mode of the current node satisfy at least one condition of the following conditions B:

(1) the area S of the current node satisfies S/2<th1, and the split mode of the current node is vertical binary tree split or horizontal binary tree split; or (2) the area S of the current node satisfies S/4<th1, and the split mode of the current node is vertical ternary tree split, horizontal ternary tree split, or quadtree split.

The threshold th1 is related to a video data format. For example, when the video data format is YUV 4:2:0, the threshold th1 is 64; or when the video data format is YUV 4:2:2, the threshold th1 is 32.

If the area of the current node and the split mode of the current node satisfy at least one condition of the conditions B, operation 5 is performed.

Operation 5: Parse a flag cons_pred_mode_flag from a bitstream, and determine, based on a value of cons_pred_mode_flag, that inter prediction or intra prediction is performed on all coding units in a coverage region of the current node.

If the area of the current node and the split mode of the current node do not satisfy the condition B, operation 6 is performed.

Operation 6: Split the current node in the split mode of the current node, where a prediction mode used for all the coding blocks covered by the current node is not restricted.

Optionally, after operation 6, the method further includes the following operations.

Operation 7: Parse prediction blocks and residual information of all the coding blocks covered by the current node.

Operation 8: Decode each coding block to obtain a reconstructed signal of an image block corresponding to the current node.

The second example is applicable to the video data format of YUV 4:2:0.

The image prediction method in this example includes the following operations.

Operation 1: Obtain a split mode of a current node.

Operation 2: Determine whether an area of the current node and the split mode of the current node satisfy a condition C:

the area of the current node is equal to 64, and the split mode of the current node is horizontal ternary tree split, vertical ternary tree split, or quadtree split.

If the area of the current node and the split mode of the current node satisfy the condition C, operation 3 is performed.

Operation 3: Intra prediction is performed on all coding units in a coverage region of the current node.

Optionally, a value of cons_pred_mode_flag is set to 1.

If the area of the current node and the split mode of the current node do not satisfy the condition C, operation 4 is performed.

Operation 4: Determine whether the area of the current node and the split mode of the current node satisfy at least one condition of the following conditions D:

(1) the area of the current node is equal to 64, and the split mode of the current node is horizontal binary tree split or vertical binary tree split; or (2) the area of the current node is equal to 128, and the split mode of the current node is horizontal ternary tree split or vertical ternary tree split.

If the area of the current node and the split mode of the current node satisfy at least one condition of the conditions D, operation 5 is performed.

Operation 5: Parse the flag cons_pred_mode_flag from a bitstream, and determine, based on the value of the cons_pred_mode_flag, that inter prediction or intra prediction is performed on all coding units in the coverage region of the current node.

If the area of the current node and the split mode of the current node do not satisfy the condition D, operation 6 is performed.

Operation 6: Split the current node in the split mode of the current node, where a prediction mode used for all coding blocks covered by the current node is not restricted.

Optionally, after operation 6, the method further includes the following operations.

Operation 7: Parse prediction blocks and residual information of all the coding blocks covered by the current node.

Operation 8: Decode each coding block to obtain a reconstructed signal of an image block corresponding to the current node.

Figure 12:
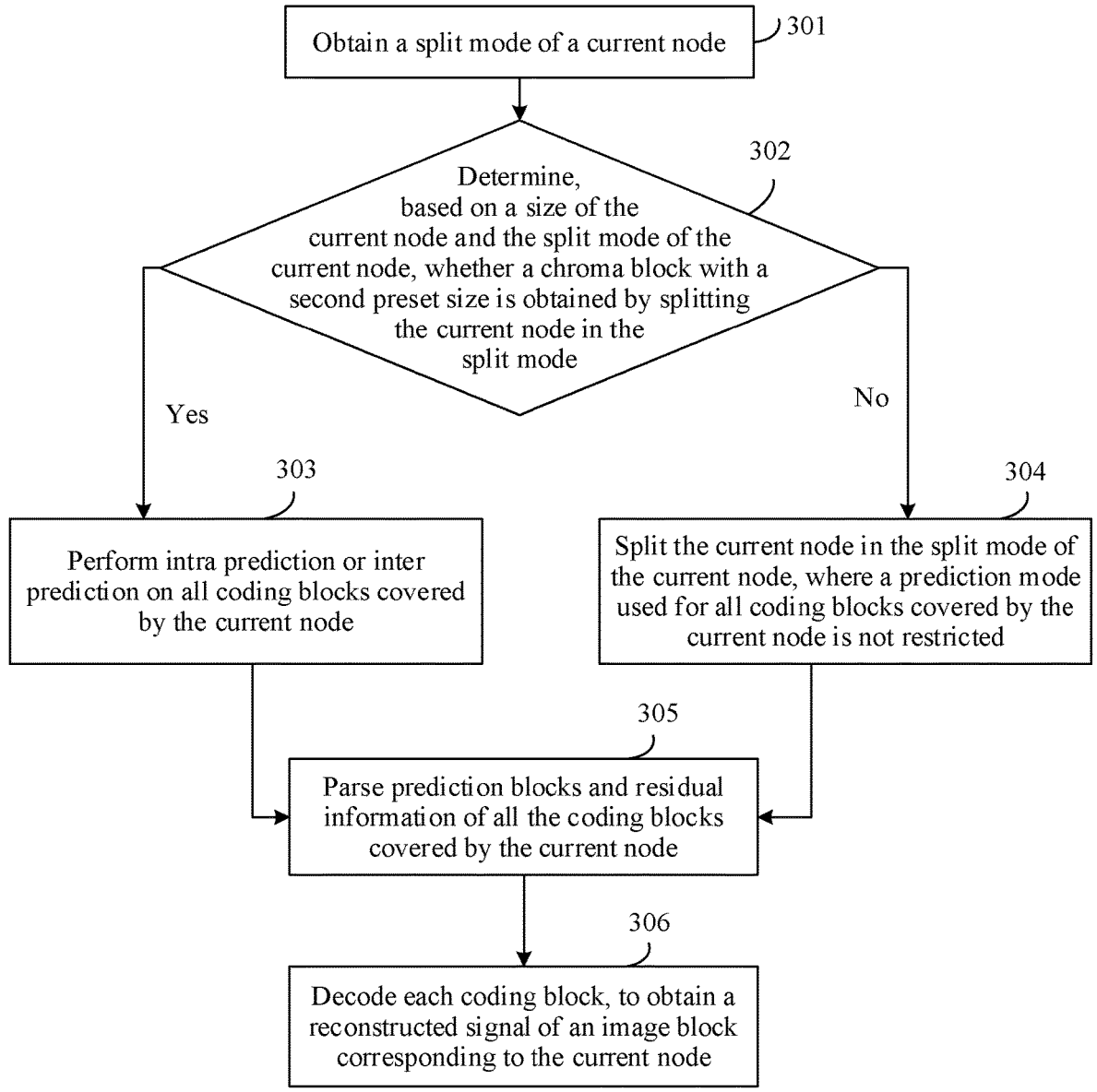
FIG. 12 is a schematic flowchart of a fourth image prediction method according to an embodiment of this disclosure.

FIG. 12 is a schematic flowchart of a fourth image prediction method according to an embodiment of this disclosure. As shown in FIG. 12, the image prediction method provided in this embodiment includes the following operations.

Operation 301: Obtain a split mode of a current node.

Specifically, split information of the current node is parsed. If the split information indicates to split a chroma block of the current node, a split mode of the chroma block of the current node is further determined. The split mode of the chroma block includes at least one of quadtree split, vertical binary tree split, horizontal binary tree split, vertical ternary tree split, and horizontal ternary tree split. Certainly, there may be another split mode. This is not specifically limited in this embodiment.

Operation 302: Determine, based on a size of the current node and the split mode of the current node, whether a chroma block with a second preset size is obtained by splitting the current node in the split mode.

When it is determined that the chroma block with the second preset size is obtained by splitting the current node in the split mode, operation 303 is performed. When it is determined that the chroma block with the second preset size is not obtained by splitting the current node in the split mode, operation 304 is performed.

Operation 302 in this embodiment is the same as operation 2041 in the embodiment shown in FIG. 11. For details, refer to the foregoing embodiment. Details are not described herein again.

Optionally, operation 302 may include: determining, based on the size of the current node and the split mode of the current node, whether a luma block with a third preset size is obtained by splitting the current node in the split mode.

Optionally, the luma block with the third preset size may be a 4×4, 4×8, or 8×4 luma block.

Optionally, the determining whether a chroma block with a second preset size is obtained by splitting the current node in the split mode may be performed based on one of the following conditions:

(1) a quantity of samples of a luma block of the current node is 64, and the split mode is quadtree split;

(2) a quantity of samples of a luma block of the current node is 64, and the split mode is ternary tree split;

(3) a quantity of samples of a luma block of the current node is 32, and the split mode is binary tree split;

(4) a quantity of samples of a luma block of the current node is 64, and the split mode is binary tree split; or (5) a quantity of samples of a luma block of the current node is 128, and the split mode is ternary tree split.

Optionally, the chroma block with the second preset size may be a chroma block with a pixel size of 2×4 or 4×2, excluding a chroma block with a pixel size of 2×2. Similarly, the luma block with the third preset size may be a luma block with a pixel size of 4×8 or 8×4, excluding a luma block with a pixel size of 4×4. Correspondingly, the determining whether a chroma block with a second preset size is obtained by splitting the current node in the split mode may be performed based on one of the following conditions:

(1) a quantity of samples of the luma block of the current node is 64, and the split mode is binary tree split; or (2) a quantity of samples of the luma block of the current node is 128, and the split mode is ternary tree split.

Operation 303: Perform intra prediction or inter prediction on all coding blocks covered by the current node.

Whether intra prediction or inter prediction is performed on all the coding blocks covered by the current node may be determined based on operation 2042 in the embodiment shown in FIG. 11. For details, refer to the foregoing embodiment. Details are not described herein again.

Operation 304: Split the current node in the split mode of the current node, where a prediction mode used for all the coding blocks covered by the current node is not restricted.

Operation 304 in this embodiment is the same as operation 104 in the embodiment shown in FIG. 9. For details, refer to the foregoing embodiment. Details are not described herein again.

Optionally, after operation 303 or operation 304, the method further includes the following operations.

Operation 305: Parse prediction blocks and residual information of all the coding blocks covered by the current node.

Operation 306: Decode each coding block to obtain a reconstructed signal of an image block corresponding to the current node.

Operation 305 and operation 306 in this embodiment are the same as operation 105 and operation 106 in the embodiment shown in FIG. 9. For details, refer to the foregoing embodiment. Details are not described herein again.

According to the image prediction method provided in this embodiment, the split mode of the current node is obtained, whether the chroma block with the second preset size is obtained by splitting the current node in the split mode is determined based on the size of the current node and the split mode of the current node; and when it is determined that the chroma block with the second preset size is obtained by splitting the current node in the split mode, intra prediction or inter prediction is performed on all the coding blocks covered by the current node. According to the foregoing method, intra prediction or inter prediction is performed on all the coding blocks of the current node, so that parallel processing for all the coding blocks of the current node can be implemented. This improves processing performance of image prediction, and increases a coding processing speed.

Figure 13:
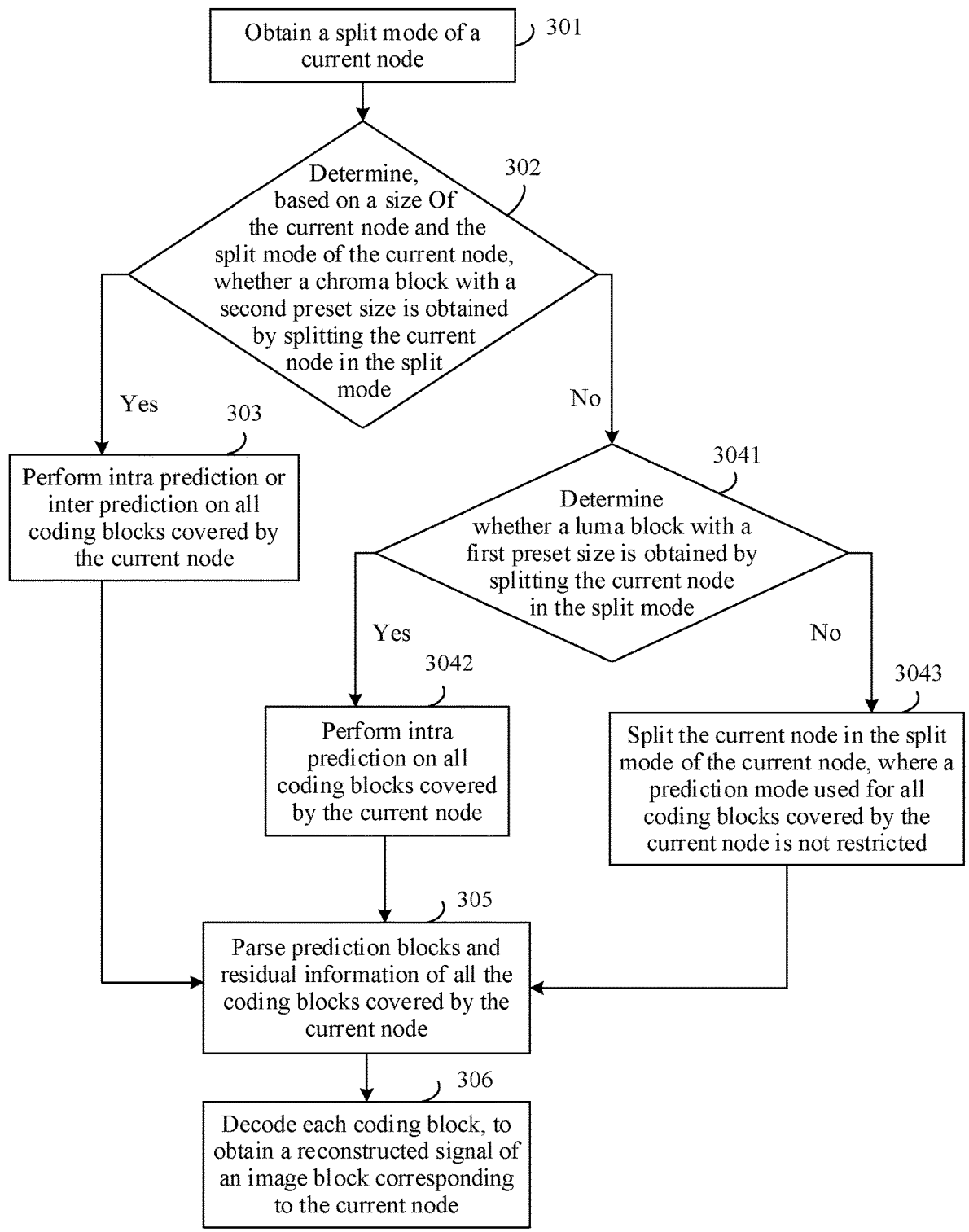
FIG. 13 is a schematic flowchart of a fifth image prediction method according to an embodiment of this disclosure.

FIG. 13 is a schematic flowchart of a fifth image prediction method according to an embodiment of this disclosure. Based on the embodiment shown in FIG. 12, as shown in FIG. 13, when it is determined that the chroma block with the second preset size is obtained by splitting the current node in the split mode, operation 304 may include the following operations.

Operation 3041: Determine whether a luma block with a first preset size is obtained by splitting the current node in the split mode.

When it is determined that the luma block with the first preset size is obtained by splitting the current node in the split mode, operation 3042 is performed. When it is determined that the luma block with the first preset size is not obtained by splitting the current node in the split mode, operation 3043 is performed.

Specifically, it is determined, based on the size of the current node and a split mode of the luma block, whether the luma block with the first preset size is obtained by splitting the current node in the split mode of the luma block. The luma block with the first preset size is a luma block with a pixel size of 4×4. A specific determining process is the same as that in operation 202 in the embodiment shown in FIG. 10, and reference may be made to the foregoing embodiment. Details are not described herein again.

Operation 3042: Perform intra prediction on all coding blocks covered by the current node.

Operation 3043: Split the current node in the split mode of the current node, where a prediction mode used for all coding blocks covered by the current node is not restricted.

Optionally, after operation 303 or operation 3042 or operation 3043, the method further includes the following operations.

Operation 305: Parse prediction blocks and residual information of all the coding blocks covered by the current node.

Operation 306: Decode each coding block to obtain a reconstructed signal of an image block corresponding to the current node.

Operation 305 and operation 306 in this embodiment are the same as operation 105 and operation 106 in the embodiment shown in FIG. 9. For details, refer to the foregoing embodiment. Details are not described herein again.

According to the image prediction method provided in this embodiment, the split mode of the current node is obtained; whether the chroma block with the second preset size is obtained by splitting the current node in the split mode is determined based on the size of the current node and the split mode of the current node; when it is determined that the chroma block with the second preset size is not obtained by splitting the current node in the split mode, whether the luma block with the first preset size is obtained by splitting the current node in the split mode is further determined; and when it is determined that luma block with the first preset size is obtained by splitting the current node in the split mode, intra prediction is performed on all the coding blocks covered by the current node. According to the foregoing method, intra prediction or inter prediction is performed on all the coding blocks of the current node, so that parallel processing for all the coding blocks of the current node can be implemented. This improves processing performance of image prediction, and increases a coding processing speed.

Figure 14:
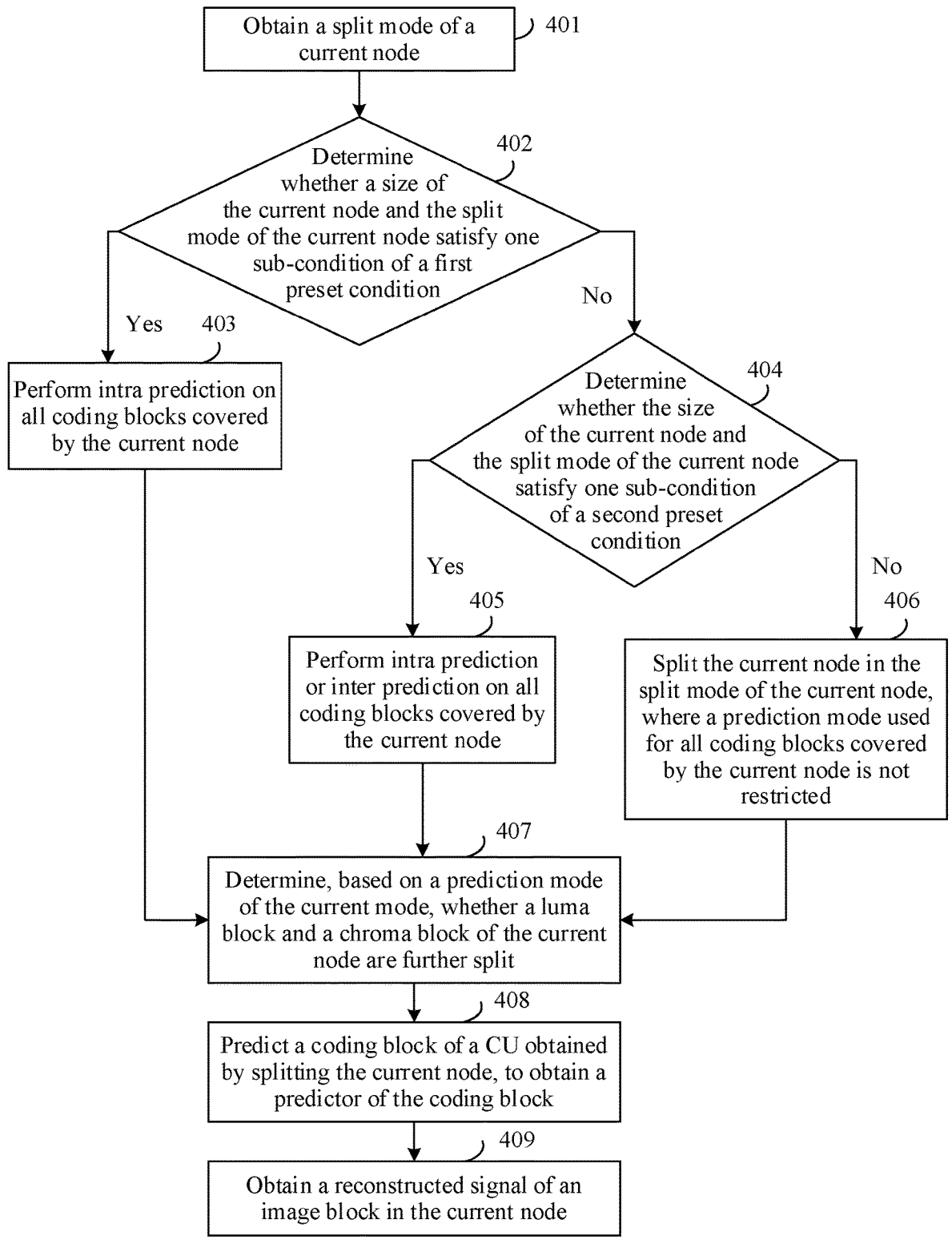
FIG. 14 is a schematic flowchart of a sixth image prediction method according to an embodiment of this disclosure.

FIG. 14 is a schematic flowchart of a sixth image prediction method according to an embodiment of this disclosure. The image prediction method provided in this embodiment is used for the video encoder 18 shown in FIG. 8. As shown in FIG. 14, the method in this embodiment includes the following operations.

Operation 401: Obtain a split mode of a current node.

A type of a slice in which the current node is located is a B type or a P type. It should be understood that when the type of the slice in which the current node is located is an I type, intra prediction should be performed, by default, on all coding blocks covered by the current node.

A decoder side may obtain the split mode of the current node by parsing a bitstream or based on an obtained parameter.

An encoder side generally first determines a split mode that is allowed for the current node, and then determines an optimal split mode as the split mode of the current node according to a rate-distortion optimization (RDO) method. This operation belongs to the conventional technology, and details are not described herein.

Operation 402: Determine whether a size of the current node and the split mode of the current node satisfy one condition of a first preset conditions.

The first preset condition may include:

(1) a quantity of samples of a luma block of the current node is 64, and the split mode of the current node is quadtree split;

(2) a quantity of samples of a luma block of the current node is 64, and the split mode of the current node is ternary tree split; or (3) a quantity of samples of a luma block of the current node is 32, and the split mode of the current node is binary tree split.

The quantity of samples of the luma block of the current node is a quantity of luma pixels (pixel size) of an image block corresponding to the current node. The quantity of samples may be obtained based on a product of the width and the height of the current node.

In another implementation, the first preset condition further includes the following condition (4):

(4) a luma block with a preset size is obtained by splitting the current node in the split mode, where the preset size is 4×4 or 8×8.

It should be noted that a luma block with a first preset size (4×4 or 8×8) and a chroma block with a second preset size (2×4 or 4×2) may be obtained when one condition of the first preset conditions is satisfied.

In this operation, if the size of the current node and the split mode of the current node satisfy one condition of the first preset conditions, operation 403 is performed. If the size of the current node and the split mode of the current node satisfies none of the first preset conditions, operation 404 is performed.

Operation 403: Perform intra prediction on all the coding blocks covered by the current node.

Optionally, when it is determined that intra prediction is performed on all the coding blocks covered by the current node, a value of mode_constraint_flag does not need to be written into a bitstream, and the value of mode_constraint_flag may be set to 1. Correspondingly, the decoder side may also derive, according to the same method, that the value of mode_constraint_flag is 1.

Operation 404: Determine whether the size of the current node and the split mode of the current node satisfy one condition of a second preset conditions.

The second preset condition includes:

(1) the quantity of samples of the luma block of the current node is 64, and the split mode of the current node is vertical binary tree split or horizontal binary tree split; or (2) the quantity of samples of the luma block of the current node is 128, and the split mode of the current node is vertical ternary tree split or horizontal ternary tree split.

In another implementation, the second preset conditions further include the following condition (3):

(3) a chroma block with a preset size is obtained by splitting the current node in the split mode, where the preset size is 2×4 or 4×2.

In this operation, if the size of the current node and the split mode of the current node satisfy one condition of the second preset conditions, operation 405 is performed. If the size of the current node and the split mode of the current node satisfies none of the second preset conditions, operation 406 is performed.

Operation 405: Perform intra prediction or inter prediction on all the coding blocks covered by the current node.

In this embodiment, a prediction mode used for all the coding blocks of the current node may be determined in the following several manners.

In an implementation, if a type of an image or the slice in which the current node is located is the I type, an encoder or the encoder side determines that only intra prediction (non-inter prediction) is applicable to all the coding blocks of the current node. Optionally, the encoder or the encoder side does not need to write mode_constraint_flag into the bitstream, and may set the value of mode_constraint_flag to 1.

If the type of the image or the slice in which the current node is located is not the I type, the encoder or the encoder side determines the value of mode_constraint_flag according to the rate-distortion optimization (RDO) method or another method.

The RDO method is specifically as follows: The encoder separately calculates rate-distortion costs (RD cost) generated in the cases of performing inter prediction and intra prediction on all the coding blocks covered by the current node, compares values of the rate-distortion costs generated in the cases of the two prediction modes, and determines a prediction mode with a smaller rate-distortion cost as a final prediction mode. If the prediction mode with the smaller rate-distortion cost is intra prediction, the encoder sets the value of mode_constraint_flag to 1. If the prediction mode with the smaller rate-distortion cost is inter prediction, the encoder sets the value of mode_constraint_flag to 0, and writes the value of mode_constraint_flag into the bitstream.

For example, the encoder first calculates the RD cost generated in the case of performing inter prediction on all the coding blocks covered by the current node, and then calculates the RD cost generated in the case of performing intra prediction. If there is no residual in the case of performing inter prediction on all the coding blocks covered by the current node (for example, a skip mode is used), the encoder determines that inter prediction is performed on all the coding blocks covered by the current node, sets the value of mode_constraint_flag to 0, and does not need to calculate the RD cost generated in the case of intra prediction. The encoder may alternatively first calculate the RD cost generated in the case of performing intra prediction on all the coding blocks covered by the current node, then calculate the RD cost generated in the case of performing inter prediction, and determine a prediction mode with a smaller RD cost as a final prediction mode.

It should be noted that, if the current node is located in an intra image region (that is, the type of the image or the slice (slice_type) in which the current node is located is an intra type or the I type), and an IBC mode is allowed to be used, a value of pred_mode_flag is 1 by default. If the current node is located in an intra image region, but an IBC mode is not allowed to be used, a value of pred_mode_flag is 1 by default, and a value of cu_skip_flag is 0 by default (indicating that the skip mode is not used for a current block). If the current node is located in an intra image region (that is, the type of the image or the slice (slice_type) in which the current node is located is an intra type or the I type), the value of mode_constraint_flag is 1 by default.

In an implementation, the decoder side or a decoder may parse a prediction mode status flag (mode_constraint_flag) of the current node; and when the value of the prediction mode status flag is a first value, perform inter prediction on all the coding blocks belonging to the current node; or when the value of the prediction mode status flag is a second value, perform intra prediction on all the coding blocks belonging to the current node.

Operation 406: Split the current node in the split mode of the current node, where the prediction mode used for all the coding blocks covered by the current node is not restricted.

Optionally, after operation 403, operation 405, or operation 406, the method may further include the following operations.

Operation 407: Determine, based on a prediction mode of the current node, whether the luma block and a chroma block of the current node are further split.

When it is determined that only intra prediction is performed on all the coding blocks of the current node, the luma block included in the current node is split in the split mode, to obtain luma blocks obtained through splitting, and intra prediction is performed on the luma blocks obtained through splitting; and the chroma block included in the current node is used as a chroma coding block, and intra prediction is performed on the chroma coding block. In other words, if it is determined that intra prediction is performed on all the coding blocks of the current node, the luma block of the current node is split in a split mode of the luma block, to obtain N luma coding tree nodes; and the chroma block of the current node is not split, to obtain one chroma coding block (chroma CB). It may be restricted that the N luma coding tree nodes are not further split, or this is not restricted. If the luma coding tree node is further split, a split mode of the luma coding tree node is parsed for recursive split. When the luma coding tree node is not further split, the luma coding tree node corresponds to one luma coding block (luma CB). Intra prediction is performed on the luma CB to obtain a luma prediction block corresponding to the luma CB. Intra prediction is performed on the chroma CB to obtain a chroma prediction block corresponding to the chroma CB. The chroma prediction block and the chroma CB have a same size.

When it is determined that only intra prediction is performed on all the coding blocks of the current node, in another implementation, the luma block and the chroma block that are included in the current node are split in the split mode, to obtain nodes obtained through splitting. When a coding tree node is not further split, the coding tree node corresponds to one coding unit and includes a luma coding unit and a chroma coding unit. Intra prediction is performed on luma coding units and chroma coding units, where the luma coding units and the chroma coding units are obtained through splitting.

When it is determined that only inter prediction is performed on all the coding blocks of the current node, in an implementation, the luma block included in the current node is split in the split mode to obtain luma blocks obtained through splitting, and inter prediction is performed on the luma blocks obtained through splitting; and the chroma block included in the current node is split in the split mode to obtain chroma blocks obtained through splitting, and inter prediction is performed on the chroma blocks obtained through splitting. In other words, if it is determined that inter prediction is performed on all the coding blocks of the current node, the luma block of the current node is split in the split mode of the luma block, to obtain N luma coding tree nodes; and the chroma block of the current node is split in a split mode of the chroma block, to obtain M chroma coding tree nodes. N and M are positive integers, and N and M may be the same or different. It may be restricted that the N luma coding tree nodes and the M chroma coding tree nodes are not further split, or this is not restricted. When no further splitting is performed, the N luma coding tree nodes correspond to N luma CBs of the current node and the M chroma coding tree nodes correspond to M chroma CBs of the current node. Inter prediction is performed on the N luma CBs to obtain corresponding luma prediction blocks, and inter prediction is performed on the M chroma CBs to obtain corresponding chroma prediction blocks.

When it is determined that only inter prediction is performed on all the coding blocks of the current node, in an implementation, the luma block included in the current node is split in the split mode to obtain luma blocks obtained through splitting, and inter prediction is performed on the luma blocks obtained through splitting; and the chroma block included in the current node is split in the split mode to obtain chroma blocks obtained through splitting, and inter prediction is performed on the chroma blocks obtained through splitting. In other words, if it is determined that inter prediction is performed on all the coding blocks of the current node, the luma block of the current node is split in the split mode of the luma block, to obtain N luma coding tree nodes; and the chroma block of the current node is split in a split mode of the chroma block, to obtain M chroma coding tree nodes. N and M are positive integers, and N and M may be the same or different. It may be restricted that the N luma coding tree nodes and the M chroma coding tree nodes are not further split, or this is not restricted. When no further splitting is performed, the N luma coding tree nodes correspond to N luma CBs of the current node and the M chroma coding tree nodes correspond to M chroma CBs of the current node. Inter prediction is performed on the N luma CBs to obtain corresponding luma prediction blocks, and inter prediction is performed on the M chroma CBs to obtain corresponding chroma prediction blocks.

Particularly, if only inter prediction is performed on all the coding blocks of the current node, child nodes are obtained by splitting the current node in the split mode, the child node should be further split, and a luma block with a preset size is obtained through splitting in a split mode of the child node, where for example, the preset size is 4×4 (that is, both the width and the height are 4), the split mode of the child node is not allowed or the child node is not allowed to be further split. Specifically, if it is restricted that only inter prediction is performed on a node, and a quantity of luma samples of the node is 32 (or a product of the width and the height of the node is 32), binary tree split (including horizontal binary tree split or vertical binary tree split) is not allowed for the node. If it is restricted that only inter prediction is performed on a node, and a quantity of luma samples of the node is 64 (or a product of the width and the height of the node is 64), ternary tree split (including horizontal ternary tree split or vertical ternary tree split) is not allowed for the node. Such a determining method is applicable to both video data formats of YUV 4:2:0 and YUV 4:2:2.

For example, if the size of the current node is 8×8 and two 8×4 (or 4×8) nodes are generated through horizontal binary tree split (or vertical binary tree split), 4×4 blocks are generated if the 8×4 (or 4×8) node is further split. In this case, vertical binary tree split (or horizontal binary tree split) is not allowed for the 8×4 (or 4×8) node or the 8×4 (or 4×8) node is not allowed to be further split. For another example, if the quantity of samples of the luma block of the current node is 128, and the split mode is horizontal ternary tree split or vertical ternary tree split, it may be obtained that the quantity of samples of the luma block is 64. However, if horizontal ternary tree split or vertical ternary tree split for a child node is used for the luma node with the quantity of samples of 64, 4×4 luma blocks are obtained. Therefore, when it is restricted that only inter prediction is performed, horizontal ternary tree split or vertical ternary tree split is not allowed for the node with the quantity of samples of 64 or the node with the quantity of samples of 64 is not allowed to be further split.

Operation 408: Predict a coding block of a CU obtained by splitting the current node, to obtain a predictor of the coding block.

If only intra prediction is performed on all the coding blocks of the current node, the encoder or the encoder side determines, according to the rate-distortion optimization (RDO) method or another method, an optimal intra prediction mode used for a current coding block; and predicts the current coding block by using the corresponding intra prediction mode, to obtain a predictor of the current block.

If only inter prediction is performed on all the coding blocks of the current node, the encoder or the encoder side determines, according to the rate-distortion optimization method or another method, an optimal inter prediction mode used for a current coding block; and predicts the current coding block by using the corresponding inter prediction mode, to obtain a predictor of the current block.

In addition, the encoder assigns values to CU depth-related syntax elements, and writes the value of each syntax element into a bitstream according to a criterion for a CU-level syntax definition. For example, if only intra prediction is performed on all the coding blocks of the current node, the value of pred_mode_flag is set to 1 and pred_mode_flag is not written into the bitstream, that is, pred_mode_flag is absent from the bitstream. If only intra prediction is performed on all the coding blocks of the current node and it is determined that the IBC mode is not used, the value of cu_skip_flag (or skip_flag) is 0, and cu_skip_flag is not written into the bitstream. Otherwise, cu_skip_flag should be written into the bitstream after the value of cu_skip_flag is determined, and is transmitted to the decoder side.

If only inter prediction is performed on all the coding blocks of the current node, the value of pred_mode_flag is set to 0, and pred_mode_flag is not written into the bitstream, that is, pred_mode_flag is absent from the bitstream. If a value of pred_mode_ibc_flag is set to 0, pred_mode_ibc_flag is not written into the bitstream, that is, pred_mode_ibc_flag is absent from the bitstream.

If only intra prediction is performed on all the coding blocks of the current node, the decoder or the decoder side may determine, by parsing the bitstream or based on an obtained parameter, an optimal intra prediction mode used for a current coding block; and predict the current coding block by using the corresponding intra prediction mode, to obtain a predictor of the current block.

If only inter prediction is performed on all the coding blocks of the current node, the decoder or the decoder side may determine, by parsing the bitstream or based on an obtained parameter, an optimal inter prediction mode used for a current coding block; and predict the current coding block by using the corresponding inter prediction mode, to obtain a predictor of the current block.

Operation 409: Obtain a reconstructed signal of an image block in the current node.

After obtaining prediction information through intra prediction or inter prediction, the encoder or the encoder side obtains residual information by subtracting the corresponding prediction information (or the predictor) from a pixel value of a pixel in the current coding block, transforms the residual information by using a method such as discrete cosine transform (DCT), obtains a bitstream through quantization and entropy encoding, and transmits the residual information to the decoder side. After adding a predicted signal and a reconstructed residual signal, the encoder side further should perform a filtering operation, to obtain a reconstructed signal, and uses the reconstructed signal as a reference signal for subsequent encoding. Particularly, if the skip mode is used for a coding block, there is no residual information, and the encoder side does not need to perform transform, where the predictor is a final reconstruction value.

After adding a predicted signal and a reconstructed residual signal, the decoder or the decoder side further should perform a filtering operation, to obtain a reconstructed signal. Further, the decoder side uses the obtained reconstructed signal as a reference signal for subsequent decoding. Particularly, if the skip mode is used for a coding block, there is no residual information, and the decoder or the decoder side does not need to perform transform, where the predictor is a final reconstruction value.

For example, inter prediction processing or intra prediction processing is performed on each CU based on a prediction block of the CU, to obtain an inter prediction image or an intra prediction image of the CU. Then, based on residual information of each CU, dequantization and inverse transform processing are performed on a transform coefficient to obtain a residual image, and the residual image is added to the prediction image of the corresponding region to generate a reconstructed image.

In this embodiment, the image prediction method is described from a perspective of the video decoder side. The video decoder determines, based on the size of the current node and the split mode of the current node, whether to perform intra prediction or inter prediction on all the coding blocks of the current node, so that parallel processing for all the coding blocks of the current node can be implemented. This improves processing performance of image prediction, and increases a decoding processing speed.

An image prediction method provided in an embodiment is used for the video encoder 18 and/or the video decoder 24 shown in FIG. 8. This embodiment includes the following operations.

Operation 501: Obtain a split mode of a current node.

Operation 501 in this embodiment is the same as operation 101 in the embodiment shown FIG. 9, and details are not described herein again.

Operation 502: Derive a value of a variable modeTypeCondition according to the following method.

If one or more conditions of the following first preset conditions are true, the value of modeTypeCondition is a first value, for example, 0:

(1) a type of an image or a slice in which the current node is located is an I type (slice_type==I), and a value of qtbtt_dual_tree_intra_flag is 1;

(2) a prediction mode type of the current node is only intra prediction or inter prediction, that is, it is restricted that only inter prediction or intra prediction (non-inter prediction) is performed; or (3) a chroma format is a monochrome format or a 4:4:4 format, where for example, a value of chroma_format_idc is 0 or 3.

In another implementation, the first preset conditions further include the following condition (4):

(4) a chroma format is a monochrome format, a 4:4:4 format, or a 4:2:2 format, where for example, a value of chroma_format_idc is 0, 3, or 2.

Otherwise, if one or more conditions of the following second preset conditions are true, the value of modeTypeCondition is a second value, for example, 1:

(1) a product of the width and the height of a luma block of the current node is 64, and the split mode of the current node is quadtree split;

(2) a product of the width and the height of a luma block of the current node is 64, and the split mode of the current node is horizontal ternary tree split or vertical ternary tree split; or (3) a product of the width and the height of a luma block of the current node is 32, and the split mode of the current node is horizontal binary tree split or vertical binary tree split.

Otherwise, if one or more conditions of the following preset third conditions are true, and the chroma format is a 4:2:0 format (the value of chroma_format_idc is 1), the value of modeTypeCondition is derived according to the following formula: 1+(slice_type !=I? 1:0):

(1) a product of the width and the height of a luma block of the current node is 64, and the split mode of the current node is horizontal binary tree split or vertical binary tree split; or (2) a product of the width and the height of a luma block of the current node is 128, and the split mode of the current node is horizontal ternary tree split or vertical ternary tree split.

It should be noted that Table 3 shows a correspondence between the chroma format and chroma_format_idc.

TABLE 3

| chroma_format_idc | separate_colour_plane_flag | Chroma format | Sub-WidthC | Sub-HeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling, there is no chroma component format, and there is only a sequence of luma components.

In 4:2:0 sampling, the widths of two chroma components are half of the widths of corresponding luma components, and the heights of the chroma components are half of the heights of the luma components.

In 4:2:2 sampling, the heights of two chroma components are the same as the heights of corresponding luma components, and the widths of the chroma components are half of the widths of the corresponding luma components.

In 4:4:4 sampling, the heights and the widths of two chroma components depend on a value of separate_colour_plane_flag. If the value of separate_colour_plane_flag is equal to 0, the widths and the heights of the two chroma components are respectively the same as the widths and the heights of corresponding luma components. Otherwise (the value of separate_colour_plane_flag is equal to 1), three components are separately coded as monochrome sampled images.

separate_colour_plane_flag equal to 1 specifies that the three color components of the 4:4:4 chroma format are coded separately. separate_colour_plane_flag equal to 0 specifies that the color components are not coded separately.

qtbtt_dual_tree_intra_flag equal to 1 specifies that for I slices, each CTU is split into coding units with 64×64 luma samples using an implicit quadtree split and that these coding units are the root of two separate coding_tree syntax structures for luma and chroma. qtbtt_dual_tree_intra_flag equal to 0 specifies separate coding tree syntax structure is not used for I slices. When qtbtt_dual_tree_intra_flag is not present, it is inferred to be equal to 0.

Operation 503: Determine a prediction mode type of all coding units of the current node based on the value of modeTypeCondition.

Specifically, if the value of modeTypeCondition is 1, it is restricted that intra prediction (MODE_INTRA) is performed on all the coding units of the current node. If the value of modeTypeCondition is 2, a value of a syntax element mode_constraint_flag is parsed from a bitstream. If the value of mode_constraint_flag is 0, inter prediction (MODE_INTER) is performed on all the coding units of the current node. If the value mode_constraint_flag is 1, intra prediction (non-inter prediction/MODE_INTRA) is performed on all the coding units of the current node.

Otherwise, the prediction mode type of all the coding units of the current node is not restricted, and is the same as a prediction mode type of the current node.

Operation 504: Determine whether a chroma block and the luma block that correspond to the current node are further split, to obtain a chroma coding unit and a luma coding unit.

(Operation 504 is same as operation 407).

When it is determined that only intra prediction is performed on all the coding blocks of the current node, the luma block included in the current node is split in the split mode, to obtain luma blocks obtained through splitting, and intra prediction is performed on the luma blocks obtained through splitting; and the chroma block included in the current node is used as a chroma coding block, and intra prediction is performed on the chroma coding block. In other words, if it is determined that intra prediction is performed on all the coding blocks of the current node, the luma block of the current node is split in a split mode of the luma block, to obtain N luma coding tree nodes; and the chroma block of the current node is not split, to obtain one chroma coding block (chroma CB). It may be restricted that the N luma coding tree nodes are not further split, or this is not restricted. If the luma coding tree node is further split, a split mode of the luma coding tree node is parsed for recursive split. When the luma coding tree node is not further split, the luma coding tree node corresponds to one luma coding block (luma CB). Intra prediction is performed on the luma CB to obtain a luma prediction block corresponding to the luma CB. Intra prediction is performed on the chroma CB to obtain a chroma prediction block corresponding to the chroma CB. The chroma prediction block and the chroma CB have a same size.

When it is determined that only intra prediction is performed on all the coding blocks of the current node, in another implementation, the luma block and the chroma block that are included in the current node are split in the split mode, to obtain nodes obtained through splitting. When a coding tree node is not further split, the coding tree node corresponds to one coding unit and includes a luma coding unit and a chroma coding unit. Intra prediction is performed on luma coding units and chroma coding units, where the luma coding units and the chroma coding units are obtained through splitting.

When it is determined that only inter prediction is performed on all the coding blocks of the current node, in an implementation, the luma block included in the current node is split in the split mode to obtain luma blocks obtained through splitting, and inter prediction is performed on the luma blocks obtained through splitting; and the chroma block included in the current node is split in the split mode to obtain chroma blocks obtained through splitting, and inter prediction is performed on the chroma blocks obtained through splitting. In other words, if it is determined that inter prediction is performed on all the coding blocks of the current node, the luma block of the current node is split in the split mode of the luma block, to obtain N luma coding tree nodes; and the chroma block of the current node is split in a split mode of the chroma block, to obtain M chroma coding tree nodes. N and M are positive integers, and N and M may be the same or different. It may be restricted that the N luma coding tree nodes and the M chroma coding tree nodes are not further split, or this is not restricted. When no further splitting is performed, the N luma coding tree nodes correspond to N luma CBs of the current node and the M chroma coding tree nodes correspond to M chroma CBs of the current node. Inter prediction is performed on the N luma CBs to obtain corresponding luma prediction blocks, and inter prediction is performed on the M chroma CBs to obtain corresponding chroma prediction blocks.

When it is determined that only inter prediction is performed on all the coding blocks of the current node, in an implementation, the luma block included in the current node is split in the split mode to obtain luma blocks obtained through splitting, and inter prediction is performed on the luma blocks obtained through splitting; and the chroma block included in the current node is split in the split mode to obtain chroma blocks obtained through splitting, and inter prediction is performed on the chroma blocks obtained through splitting. In other words, if it is determined that inter prediction is performed on all the coding blocks of the current node, the luma block of the current node is split in the split mode of the luma block, to obtain N luma coding tree nodes; and the chroma block of the current node is split in a split mode of the chroma block, to obtain M chroma coding tree nodes. N and M are positive integers, and N and M may be the same or different. It may be restricted that the N luma coding tree nodes and the M chroma coding tree nodes are not further split, or this is not restricted. When no further splitting is performed, the N luma coding tree nodes correspond to N luma CBs of the current node and the M chroma coding tree nodes correspond to M chroma CBs of the current node. Inter prediction is performed on the N luma CBs to obtain corresponding luma prediction blocks, and inter prediction is performed on the M chroma CBs to obtain corresponding chroma prediction blocks.

Particularly, if only inter prediction is performed on all the coding blocks of the current node, child nodes are obtained by splitting the current node in the split mode, the child node should be further split, and a luma block with a preset size is obtained through splitting in a split mode of the child node, where for example, the preset size is 4×4 (that is, both the width and the height are 4), the split mode of the child node is not allowed or the child node is not allowed to be further split. Specifically, if it is restricted that only inter prediction is performed on a node, and a quantity of luma samples of the node is 32 (or a product of the width and the height of the node is 32), binary tree split (including horizontal binary tree split or vertical binary tree split) is not allowed for the node. If it is restricted that only inter prediction is performed on a node, and a quantity of luma samples of the node is 64 (or a product of the width and the height of the node is 64), ternary tree split (including horizontal ternary tree split or vertical ternary tree split) is not allowed for the node. Such a determining method is applicable to both video data formats of YUV 4:2:0 and YUV 4:2:2.

For example, if the size of the current node is 8×8 and two 8×4 (or 4×8) nodes are generated through horizontal binary tree split (or vertical binary tree split), 4×4 blocks are generated if the 8×4 (or 4×8) node is further split. In this case, vertical binary tree split (or horizontal binary tree split) is not allowed for the 8×4 (or 4×8) node or the 8×4 (or 4×8) node is not allowed to be further split. For another example, if the quantity of samples of the luma block of the current node is 128, and the split mode is horizontal ternary tree split or vertical ternary tree split, it may be obtained that the quantity of samples of the luma block is 64. However, if horizontal ternary tree split or vertical ternary tree split for a child node is used for the luma node with the quantity of samples of 64, 4×4 luma blocks are obtained. Therefore, when it is restricted that only inter prediction is performed, horizontal ternary tree split or vertical ternary tree split is not allowed for the node with the quantity of samples of 64 or the node with the quantity of samples of 64 is not allowed to be further split.

Operation 505: Parse a coding unit to obtain prediction mode information.

A syntax element related to intra prediction or inter prediction is parsed based on a type of a prediction mode of the coding unit, to obtain a final prediction mode of the coding unit. Prediction is performed in the corresponding prediction mode, to obtain a predictor.

If the current node is located in an intra image region (that is, a type of an image or a slice (slice_type) in which the current node is located is an intra type or an I type) and an IBC mode is allowed to be used, a value of cu_pred_mode is derived as 1, and the value of cu_pred_mode is obtained with no need to parse the bitstream. If the current node is located in an intra image region but an IBC mode is not allowed to be used, a value of cu_pred_mode is derived as 1, a value of cu_skip_flag is 0, and the value of cu_pred_mode is obtained with no need to parse the bitstream.

If the current node is located in an inter image region (that is, a type of an image or a slice (slice_type) in which the current node is located is an inter type or a B type), a value of cu_pred_mode is derived as 0, and the value of cu_pred_mode is obtained with no need to parse the bitstream.

Operation 506: Decode each coding block to obtain a reconstructed signal of an image block corresponding to the current node.

For example, inter prediction processing or intra prediction processing is performed on each CU based on a prediction block of the CU, to obtain an inter prediction image or an intra prediction image of the CU. Then, based on residual information of each CU, dequantization and inverse transform processing are performed on a transform coefficient to obtain a residual image, and the residual image is added to the prediction image of the corresponding region to generate a reconstructed image.

A method corresponding to an encoder side:

An image prediction method provided in an embodiment is used for the video encoder 18 shown in FIG. 8. This embodiment includes the following operations.

Operation 601: Obtain a split mode of a current node.

Operation 601 in this embodiment is the same as operation 501, and details are not described herein again.

Operation 602: Derive a value of a variable modeTypeCondition according to the following method.

If one or more conditions of the following first preset conditions are true, the value of modeTypeCondition is a first value, for example, 0:

(1) a type of an image or a slice in which the current node is located is an I type (slice_type==I), and a value of qtbtt_dual_tree_intra_flag is 1;

(2) a prediction mode type of the current node is only intra prediction or inter prediction, that is, it is restricted that only inter prediction or intra prediction (non-inter prediction) is performed; or (3) a chroma format is a monochrome format or a 4:4:4 format, where for example, a value of chroma_format_idc is 0 or 3.

In another implementation, the first preset conditions further include the following condition (4):

(4) a chroma format is a monochrome format, a 4:4:4 format, or a 4:2:2 format, where for example, a value of chroma_format_idc is 0, 3, or 2.

Otherwise, if one or more conditions of the following second preset conditions are true, the value of modeTypeCondition is a second value, for example, 1:

(1) a product of the width and the height of a luma block of the current node is 64, and the split mode of the current node is quadtree split;

(2) a product of the width and the height of a luma block of the current node is 64, and the split mode of the current node is horizontal ternary tree split or vertical ternary tree split; or (3) a product of the width and the height of a luma block of the current node is 32, and the split mode of the current node is horizontal binary tree split or vertical binary tree split.

Otherwise, if one or more conditions of the following preset third conditions are true, and the chroma format is a 4:2:0 format (the value of chroma_format_idc is 1), the value of modeTypeCondition is derived according to the following formula: 1+(slice_type !=I? 1: 0):

(1) a product of the width and the height of a luma block of the current node is 64, and the split mode of the current node is horizontal binary tree split or vertical binary tree split; or (2) a product of the width and the height of a luma block of the current node is 128, and the split mode of the current node is horizontal ternary tree split or vertical ternary tree split.

Operation 603: Determine a prediction mode type of all coding units of the current node based on the value of modeTypeCondition.

Specifically, if the value of modeTypeCondition is 1, it is restricted that intra prediction (MODE_INTRA) is performed on all the coding units of the current node. Optionally, a value of mode_constraint_flag is set to 1.

If the value of modeTypeCondition is 2, the value of the syntax element mode_constraint_flag is determined by using an RDO method. For example, an RD cost generated in a case of performing inter prediction on all the coding units of the current node is first calculated; then, an RD cost generated in a case of performing intra prediction is calculated; and if there is no residual in the case of performing inter prediction on all the coding units of the current node (for example, a skip mode is used), it is determined that inter prediction is performed on all the coding units of the current node, the value of mode_constraint_flag is set to 0, and the RD cost generated in the case of intra prediction does not need to be calculated. Alternatively, an RD cost generated in a case of performing intra prediction on all the coding units of the current node may be first calculated; then, an RD cost generated in a case of performing inter prediction is calculated; and a prediction mode with a smaller RD cost is determined as a final prediction mode.

Otherwise, the prediction mode type of all the coding units of the current node is not restricted, and is the same as a prediction mode type of the current node.

Particularly, if the current node is located in an intra image region (that is, a type of an image or a slice (slice_type) in which the current node is an intra type or an I type), and an IBC mode is allowed to be used, a value of pred_mode_flag is 1 by default. If the current node is located in an intra image region but an IBC mode is not allowed to be used, a value of pred_mode_flag is 1 by default, and a value of cu_skip_flag is 0.

Operation 604: Determine a split mode of a chroma block and a split mode of a luma block that correspond to the current node, to obtain a chroma coding unit and a luma coding unit.

(Operation 604 is same as operation 504).

Operation 605: Predict a coding block of a CU obtained by splitting the current node, to obtain a predictor of the coding block.

If only intra prediction is performed on all the coding blocks of the current node, an encoder side determines, according to the rate-distortion optimization (RDO) method or another method, an optimal intra prediction mode used for a current coding block; and predicts the current coding block by using the corresponding intra prediction mode, to obtain a predictor of the current block.

If only inter prediction is performed on all the coding blocks of the current node, the encoder side determines, according to the rate-distortion optimization method or another method, an optimal inter prediction mode used for a current coding block; and predicts the current coding block by using the corresponding inter prediction mode, to obtain a predictor of the current block.

In addition, the encoder assigns values to CU depth-related syntax elements, and writes the value of each syntax element into a bitstream according to a criterion for a CU-level syntax definition. For example, if only intra prediction is performed on all the coding blocks of the current node, the value of pred_mode_flag is set to 1 and pred_mode_flag is not written into the bitstream, that is, pred_mode_flag is absent from the bitstream. If only intra prediction is performed on all the coding blocks of the current node and it is determined that the IBC mode is not used, the value of cu_skip_flag (or skip_flag) is 0, and cu_skip_flag is not written into the bitstream. Otherwise, cu_skip_flag should be written into the bitstream after the value of cu_skip_flag is determined, and is transmitted to a decoder side.

If only inter prediction is performed on all the coding blocks of the current node, the value of pred_mode_flag is set to 0, and pred_mode_flag is not written into the bitstream, that is, pred_mode_flag is absent from the bitstream. If a value of pred_mode_ibc_flag is set to 0, pred_mode_ibc_flag is not written into the bitstream, that is, pred_mode_ibc_flag is absent from the bitstream.

Operation 606: Obtain a reconstructed signal of an image block in the current node.

After obtaining prediction information through intra prediction or inter prediction, the encoder side obtains residual information by subtracting the corresponding prediction information (or the predictor) from a pixel value of a pixel in the current coding block, transforms the residual information by using a method such as discrete cosine transform (DCT), obtains a bitstream through quantization and entropy encoding, and transmits the residual information to the decoder side. After adding a predicted signal and a reconstructed residual signal, the encoder side further should perform a filtering operation, to obtain a reconstructed signal, and uses the reconstructed signal as a reference signal for subsequent encoding. Particularly, if the skip mode is used for a coding block, there is no residual information, and the encoder side does not need to perform transform, where the predictor is a final reconstruction value.

Figure 15:
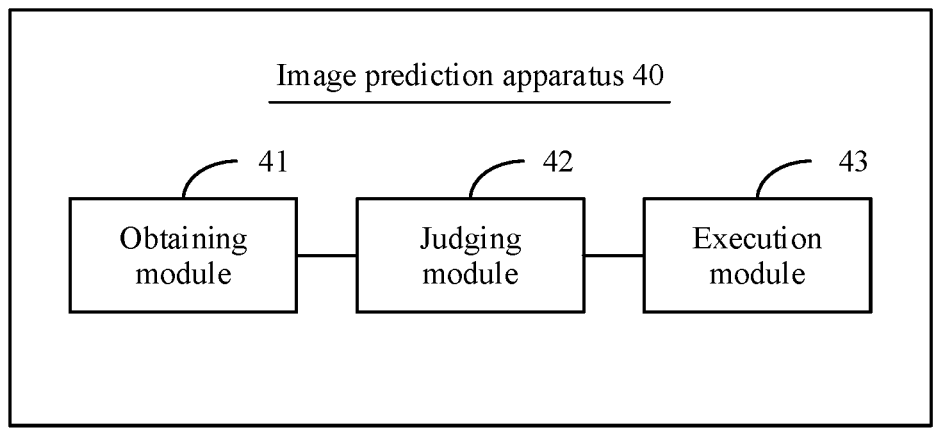
FIG. 15 is a schematic structural diagram of functions of an image prediction apparatus according to an embodiment of this disclosure.

FIG. 15 is a schematic structural diagram of functions of an image prediction apparatus according to an embodiment of this disclosure. As shown in FIG. 15, an image prediction apparatus 40 provided in this embodiment includes:

an obtaining module 41, configured to obtain a split mode of a current node;

a judging module 42, configured to determine whether an image block with a preset size is obtained by splitting the current node in the split mode, where the image block includes a luma block or a chroma block; and an execution module 43, configured to: when it is determined that the image block with the preset size is obtained by splitting the current node in the split mode, perform intra prediction or inter prediction on all coding blocks covered by the current node.

Optionally, the image block with the preset size includes a luma block with a first preset size, and the judging module 42 is specifically configured to: determine, based on a size of the current node and the split mode of the current node, whether the luma block with the first preset size is obtained by splitting the current node in the split mode.

Optionally, when it is determined that the luma block with the first preset size is obtained by splitting the current node in the split mode, the execution module 43 is specifically configured to:

perform intra prediction on all the coding blocks covered by the current node.

Optionally, when the luma block with the first preset size is not obtained by splitting the current node in the split mode, the judging module 42 is further configured to: determine whether a chroma block with a second preset size is obtained by splitting the current node in the split mode; and when it is determined that the chroma block with the second preset size is obtained by splitting the current node in the split mode, the execution module 43 is specifically configured to: perform intra prediction or inter prediction on all the coding blocks covered by the current node.

Optionally, the image block with the preset size includes the chroma block with the second preset size, and the judging module 42 is specifically configured to: determine, based on the size of the current node and the split mode of the current node, whether the chroma block with the second preset size is obtained by splitting the current node in the split mode.

Optionally, when it is determined that the chroma block with the second preset size is obtained by splitting the current node in the split mode, the execution module 43 is specifically configured to:

parse a prediction mode status flag of the current node; and when a value of the prediction mode status flag is a first value, perform inter prediction on all the coding blocks covered by the current node; or when a value of the prediction mode status flag is a second value, perform intra prediction on all the coding blocks covered by the current node.

Optionally, when it is determined that the chroma block with the second preset size is obtained by splitting the current node in the split mode, the execution module 43 is specifically configured to: when a prediction mode used for any coding block covered by the current node is inter prediction, perform inter prediction on all the coding blocks covered by the current node; or when a prediction mode used for any coding block covered by the current node is intra prediction, perform intra prediction on all the coding blocks covered by the current node.

Optionally, the any coding block is a 1$^{st}$ coding block of all the coding blocks covered by the current node in a decoding order.

Optionally, when it is determined that the chroma block with the second preset size is obtained by splitting the current node in the split mode, the execution module 43 is specifically configured to:

determine whether the luma block with the first preset size is obtained by splitting the current node in the split mode; and when it is determined that the luma block with the first preset size is obtained by splitting the current node in the split mode, perform intra prediction on all the coding blocks covered by the current node.

Optionally, when it is determined that the luma block with the first preset size is not obtained by splitting the current node in the split mode, the execution module 43 is specifically configured to:

parse a prediction mode status flag of the current node; and when a value of the prediction mode status flag is a first value, perform inter prediction on all the coding blocks covered by the current node; or when a value of the prediction mode status flag is a second value, perform intra prediction on all the coding blocks covered by the current node.

Optionally, when it is determined that the luma block with the first preset size is not obtained by splitting the current node in the split mode, the execution module 43 is specifically configured to: when a prediction mode used for any coding block covered by the current node is inter prediction, perform inter prediction on all the coding blocks covered by the current node; or when a prediction mode used for any coding block covered by the current node is intra prediction, perform intra prediction on all the coding blocks covered by the current node.

Optionally, the execution module 43 is specifically configured to:

split, in the split mode, the luma block included in the current node to obtain luma blocks obtained through splitting, and perform intra prediction on the luma blocks obtained through splitting; and use the chroma block included in the current node as a chroma coding block, and perform intra prediction on the chroma coding block; or split, in the split mode, the luma block included in the current node to obtain luma blocks obtained through splitting, and perform inter prediction on the luma blocks obtained through splitting; and split, in the split mode, the chroma block included in the current node to obtain chroma blocks obtained through splitting, and perform inter prediction on the chroma blocks obtained through splitting.

Optionally, the execution module 43 is specifically configured to:

split, in the split mode, the luma block included in the current node to obtain luma blocks obtained through splitting, and perform intra prediction on the luma blocks obtained through splitting; and use the chroma block included in the current node as a chroma coding block, and perform intra prediction on the chroma coding block; or split, in the split mode, the luma block included in the current node to obtain luma blocks obtained through splitting, and perform inter prediction on the luma blocks obtained through splitting; and use the chroma block included in the current node as a chroma coding block, and perform inter prediction on the chroma coding block.

Optionally, when inter prediction is performed on all the coding blocks covered by the current node, the obtaining module 41 is further configured to obtain a split sub-mode of a child node of the current node, where the child node includes a luma block and a chroma block; and the judging module 42 is further configured to determine whether the luma block with the first preset size is obtained by splitting the child node of the current node in the split sub-mode; and when it is determined that the luma block with the first preset size is obtained by splitting the child node of the current node in the split sub-mode, the execution module 43 is specifically configured to: split the child node of the current node in a split mode other than the split sub-mode, to obtain a corresponding coding block, and perform inter prediction on the corresponding coding block; or use the child node of the current node as a coding block, and perform inter prediction on the coding block.

The image prediction apparatus provided in this embodiment of this disclosure can perform the technical solutions in the foregoing method embodiments. Implementation principles and technical effects thereof are similar, and details are not described herein again.

Figure 16:
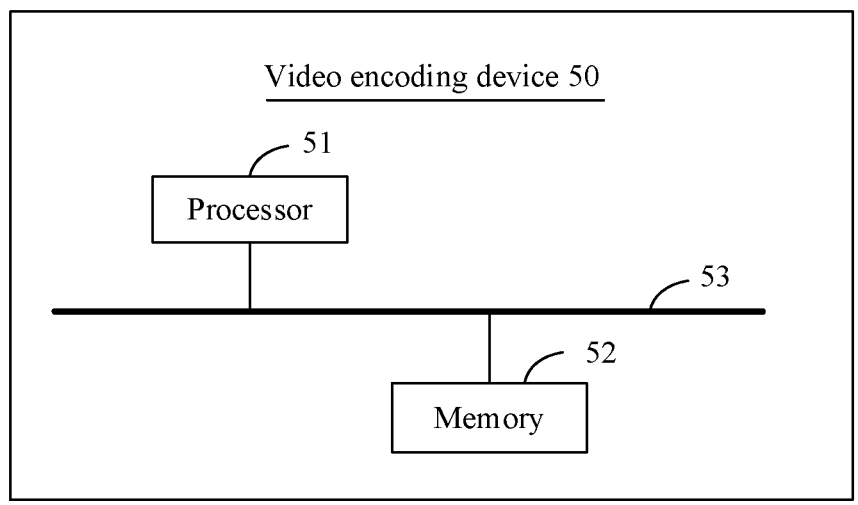
FIG. 16 is a schematic structural diagram of hardware of a video encoding device according to an embodiment of this disclosure.

FIG. 16 is a schematic structural diagram of hardware of a video encoding device according to an embodiment of this disclosure. As shown in FIG. 16, a video encoding device 50 provided in this embodiment includes a processor 51 and a memory 52 that is configured to store an executable instruction of the processor 51. The processor 51 may perform the image prediction method corresponding to the video encoding device in the foregoing method embodiments. Implementation principles and technical effects thereof are similar, and details are not described herein again.

Optionally, the memory 52 may be independent, or may be integrated with the processor 51.

When the memory 52 is a component independent of the processor 51, the video encoding device 50 further includes a bus 53, configured to connect the memory 52 and the processor 51.

Figure 17:
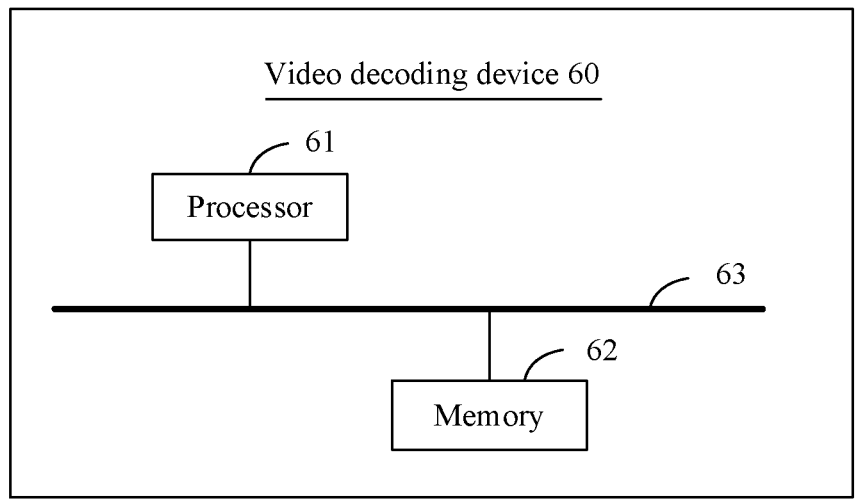
FIG. 17 is a schematic structural diagram of hardware of a video decoding device according to an embodiment of this disclosure.

FIG. 17 is a schematic structural diagram of hardware of a video decoding device according to an embodiment of this disclosure. As shown in FIG. 17, a video decoding device 60 provided in this embodiment includes a processor 61 and a memory 62 that is configured to store an executable instruction of the processor 61. The processor 61 may perform the image prediction method corresponding to the video decoding device in the foregoing method embodiments. Implementation principles and technical effects thereof are similar, and details are not described herein again.

Optionally, the memory 62 may be independent, or may be integrated with the processor 61.

When the memory 62 is a component independent of the processor 61, the video decoding device 60 further includes a bus 63, configured to connect the memory 62 and the processor 61.

Figure 18:
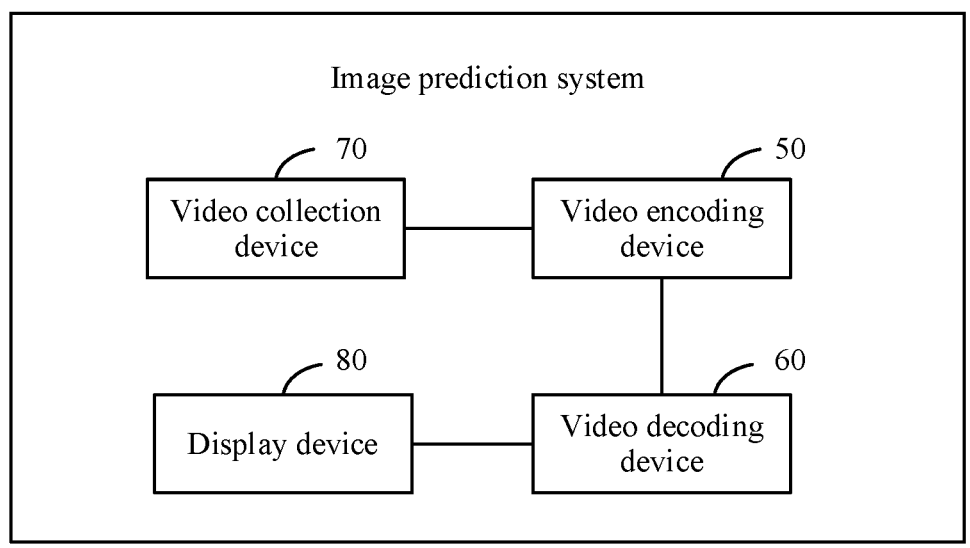
FIG. 18 is a schematic structural diagram of an image prediction system according to an embodiment of this disclosure.

FIG. 18 is a schematic structural diagram of an image prediction system according to an embodiment of this disclosure. As shown in FIG. 18, the image prediction system provided in this embodiment includes a video collection device 70, the video encoding device 50 in the embodiment shown in FIG. 16, the video decoding device 60 in the embodiment shown in FIG. 17, and a display device 80.

The video encoding device 50 is connected to both the video collection device 70 and the video decoding device 60, and the video decoding device 60 is connected to the display device 80.

Specifically, the video encoding device 50 receives video or image information sent by the video collection device 70. The video encoding device 50 may perform the image prediction method corresponding to the video encoding device 50 in the foregoing method embodiments. The video encoding device 50 sends encoded video or image information to the video decoding device 60. The video decoding device 60 may perform the image prediction method corresponding to the video decoding device 60 in the foregoing method embodiments. The video decoding device 60 sends decoded video or image information to the display device 80 for displaying.

The image prediction system provided in this embodiment of this disclosure includes the video encoding device that can perform the foregoing method embodiments and the video decoding device that can perform the foregoing method embodiments. Implementation principles and technical effects thereof are similar, and details are not described herein again.

An embodiment of this disclosure further provides a computer-readable storage medium. The computer-readable storage medium stores a computer program, and the computer program is executed by a processor to implement the operations in the foregoing method embodiments.

An embodiment of this disclosure further provides a video decoding method, where the method includes:

obtaining a split mode of a current node, where the current node includes a luma block and a chroma block;

determining whether a small chroma block is obtained by further splitting the current node in the split mode of the current node, where the small chroma block is a chroma block with a pixel quantity less than or equal to a first preset value or the small chroma block is a chroma block, in blocks, with a pixel quantity less than or equal to a second preset value; and if the small chroma block is obtained by further splitting the current node in the split mode of the current node, performing inter prediction or intra prediction on a coding block obtained by splitting the current node serving as a root node, to obtain prediction information of the coding block obtained through splitting.

Optionally, the performing inter prediction on a coding block obtained by splitting the current node serving as a root node includes: performing inter prediction on all coding blocks obtained by splitting the current node serving as a root node; or the performing intra prediction on a coding block obtained by splitting the current node serving as a root node includes: performing intra prediction on all coding blocks (coding block) obtained by splitting the current node serving as a root node.

Optionally, the performing inter prediction on a coding block obtained by splitting the current node serving as a root node includes: performing inter prediction on all small chroma blocks obtained by splitting the current node serving as a root node; or the performing intra prediction on a coding block obtained by splitting the current node serving as a root node includes: performing intra prediction on all small chroma blocks obtained by splitting the current node serving as a root node.

Optionally, the performing inter prediction on a coding block obtained by splitting the current node serving as a root node includes: performing inter prediction on a coding unit obtained by splitting the current node serving as a root node; or the performing intra prediction on a coding block obtained by splitting the current node serving as a root node includes: performing intra prediction on a coding unit obtained by splitting the current node serving as a root node.

Optionally, the performing inter prediction or intra prediction on a coding block obtained by splitting the current node serving as a root node includes:

parsing a node prediction mode flag (cons_pred_mode_flag) of the current node; and when a value of the node prediction mode flag is a first value, performing inter prediction on the coding block obtained by splitting the current node serving as a root node; or when a value of the node prediction mode flag is a second value, performing intra prediction on the coding block obtained by splitting the current node serving as a root node.

Optionally, the performing inter prediction or intra prediction on a coding block obtained by splitting the current node serving as a root node includes:

when a prediction mode used for any coding block obtained by splitting the current node serving as a root node is inter prediction, performing inter prediction on the coding block obtained by splitting the current node serving as a root node; or when a prediction mode used for any coding block obtained by splitting the current node serving as a root node is intra prediction, performing intra prediction on the coding block obtained by splitting the current node serving as a root node.

Optionally, the first preset value is 2 or 4, or the second preset value is 16, 8, or 32.

Optionally, the performing intra prediction on a coding block obtained by splitting the current node serving as a root node includes:

splitting, in the split mode of the node, the luma block included in the current node, to obtain a luma coding block;

performing intra prediction on the luma coding block; and using the chroma block included in the current node as a chroma coding block, and performing intra prediction on the chroma coding block.

Optionally, the performing inter prediction or intra prediction on a coding block obtained by splitting the current node serving as a root node includes:

splitting, in the split mode of the node, the luma block included in the current node, to obtain a luma coding block;

performing inter prediction or intra prediction on the luma coding block; and using the chroma block included in the current node as a chroma coding block, and performing inter prediction or intra prediction on the chroma coding block.

Optionally, the using the chroma block included in the current node as a chroma coding block, and performing inter prediction or intra prediction on the chroma coding block includes:

using the chroma coding block as a chroma prediction block, and performing intra prediction on the chroma prediction block; or splitting the chroma coding block to obtain a chroma prediction block, and performing inter prediction on the chroma prediction block obtained through splitting.

An embodiment of this disclosure further provides a video decoding method, where the method includes:

obtaining a split mode of a current node, where the current node includes a luma block and a chroma block;

determining whether a luma block with a preset size is obtained by further splitting the current node in the split mode of the current node; and if the luma block with the preset size is obtained by further splitting the current node in the split mode of the current node, performing intra prediction on all coding blocks obtained by splitting the current node serving as a root node, to obtain prediction blocks of the coding blocks obtained through splitting.

Optionally, the method further includes:

if the luma block with the preset size is not obtained by further splitting the current node in the split mode of the current node, determining whether a small chroma block is obtained by further splitting the current node in the split mode of the current node, where the small chroma block is a chroma block with a pixel quantity less than or equal to a first preset value or the small chroma block is a chroma block, in blocks, with a pixel quantity less than or equal to a second preset value; and if the small chroma block is obtained by further splitting the current node in the split mode of the current node, performing inter prediction or intra prediction on a coding block (coding block) obtained by splitting the current node serving as a root node, to obtain a prediction block of the coding block obtained through splitting.

Optionally, the performing inter prediction on a coding block obtained by splitting the current node serving as a root node includes: performing inter prediction on all coding blocks (coding block) obtained by splitting the current node serving as a root node; or the performing intra prediction on a coding block obtained by splitting the current node serving as a root node includes: performing intra prediction on all coding blocks (coding block) obtained by splitting the current node serving as a root node.

Optionally, the performing inter prediction on a coding block obtained by splitting the current node serving as a root node includes: performing inter prediction on all small chroma blocks obtained by splitting the current node serving as a root node; or the performing intra prediction on a coding block obtained by splitting the current node serving as a root node includes: performing intra prediction on all small chroma blocks obtained by splitting the current node serving as a root node.

Optionally, the performing inter prediction on a coding block obtained by splitting the current node serving as a root node includes: performing inter prediction on a coding unit obtained by splitting the current node serving as a root node; or the performing intra prediction on a coding block obtained by splitting the current node serving as a root node includes: performing intra prediction on a coding unit obtained by splitting the current node serving as a root node.

Optionally, the performing inter prediction or intra prediction on a coding block obtained by splitting the current node serving as a root node includes:

parsing a node prediction mode flag (cons_pred_mode_flag) of the current node; and when a value of the node prediction mode flag is a first value, performing inter prediction on the coding block obtained by splitting the current node serving as a root node; and when a value of the node prediction mode flag is a second value, performing intra prediction on the coding block obtained by splitting the current node serving as a root node.

Optionally, the performing inter prediction or intra prediction on a coding block obtained by splitting the current node serving as a root node includes:

when a prediction mode used for any coding block obtained by splitting the current node serving as a root node is inter prediction, performing inter prediction on the coding block obtained by splitting the current node serving as a root node; and when a prediction mode used for any coding block obtained by splitting the current node serving as a root node is intra prediction, performing intra prediction on the coding block obtained by splitting the current node serving as a root node.

Optionally, the first preset value is 2 or 4, or the second preset value is 16, 8, or 32.

Optionally, the performing intra prediction on a coding block obtained by splitting the current node serving as a root node includes:

splitting, in the split mode of the node, the luma block included in the current node, to obtain a luma coding block;

performing intra prediction on the luma coding block; and using the chroma block included in the current node as a chroma coding block, and performing intra prediction on the chroma coding block.

Optionally, the performing inter prediction or intra prediction on a coding block obtained by splitting the current node serving as a root node includes:

splitting, in the split mode of the node, the luma block included in the current node, to obtain a luma coding block;

performing inter prediction or intra prediction on the luma coding block; and using the chroma block included in the current node as a chroma coding block, and performing inter prediction or intra prediction on the chroma coding block.

Optionally, the using the chroma block included in the current node as a chroma coding block, and performing inter prediction or intra prediction on the chroma coding block includes:

using the chroma coding block as a chroma prediction block, and performing intra prediction on the chroma prediction block; or splitting the chroma coding block to obtain a chroma prediction block, and performing inter prediction on the chroma prediction block obtained through splitting.

Optionally, the performing inter prediction on a coding block obtained by splitting the current node serving as a root node includes:

splitting the current node in the split mode of the current node, to obtain a child node of the current node;

obtaining a split sub-mode of the child node of the current node, where the child node includes a luma block and a chroma block;

determining whether a luma block with a preset size is obtained by further splitting the child node of the current node in the split sub-mode; and if the luma block with the preset size is obtained by further splitting the child node of the current node in the split sub-mode, splitting the child node of the current node in a split mode other than the split sub-mode, to obtain a corresponding coding unit, and performing inter prediction on the corresponding coding unit; or using the child node of the current node as a coding unit, and performing inter prediction on the coding unit.

Optionally, the preset size may be 4×4, 4×8, 8×4, 2×4, or 4×2.

An embodiment of this disclosure further provides a video decoding method, where the method includes:

obtaining a split mode of a current node, where the current node includes a luma block and a chroma block;

when a prediction mode used for all coding blocks (coding block) obtained by splitting the current node serving as a root node is an inter prediction mode, splitting the current node in the split mode of the current node, to obtain a child node of the current node;

obtaining a split sub-mode of the child node of the current node, where the child node includes a luma block and a chroma block;

determining whether a luma block with a preset size is obtained by further splitting the child node of the current node in the split sub-mode; and if the luma block with the preset size is obtained by further splitting the child node of the current node in the split sub-mode, splitting the child node of the current node in a split mode other than the split sub-mode, to obtain a corresponding coding unit, and performing inter prediction on the corresponding coding unit; or using the child node of the current node as a coding unit, and performing inter prediction on the coding unit.

The first video decoding method provided in this embodiment of this disclosure relates to a block split mode in video decoding. A video data format in this embodiment is a YUV 4:2:0 format. A similar manner may be used for data in a YUV 4:2:2 format.

Operation 1: Parse a split mode S of a node A. If the node A is further split, operation 2 is performed. If the current node is not further split into child nodes, the current node corresponds to one coding unit, and information about the coding unit is parsed.

The split mode of the node A may be at least one of quadtree split, vertical binary tree split, horizontal binary tree split, vertical ternary tree split, and horizontal ternary tree split. The split mode may be another split mode. This is not limited in this disclosure. Information about the split mode of the current node may be transmitted in a bitstream. The split mode of the current node may be obtained by parsing a corresponding syntax element in the bitstream. The split mode of the current node may be alternatively determined according to a preset rule. This is not limited in this disclosure.

Operation 2: Determine whether a chroma block of at least one child node B in child nodes obtained by splitting the node A in the split mode S is a small block (by determining whether the width and the height of the node A, and/or the split mode of the node A, and/or the width and the height of the node B satisfy/satisfies at least one condition of the following conditions). If the chroma block of the at least one child node B in the child nodes obtained by splitting the node A is a small block, operation 3 to operation 6 are performed.

Specifically, whether the chroma block of the at least one child node B of the node A is a small block may be determined according to one of the following methods:

(1) if a size of the chroma block of the at least one child node B of the node A is 2×2, 2×4, or 4×2, the chroma block of the at least one child node B of the node A is a small block;

(2) if the width or the height of the chroma block of the at least one child node B of the node A is 2, the chroma block of the at least one child node B of the node A is a small block;

(3) if the node A includes 128 luma pixels and ternary tree split is used for the node A, or if the node A includes 64 luma pixels and binary tree split, quadtree split, or ternary tree split is used for the node A, the chroma block of the at least one child node B of the node A is a small block;

(4) if the node A includes 256 luma pixels and ternary tree split or quadtree split is used for the node A, or if the node A includes 128 luma pixels and binary tree split is used for the node A, the chroma block of the at least one child node B of the node A is a small block;

(5) if the node A includes N1 luma pixels and ternary tree split is used for the node A, where N1 is 64, 128, or 256, the chroma block of the at least one child node B of the node A is a small block;

(6) if the node A includes N2 luma pixels and quadtree split is used for the node A, where N2 is 64 or 256, the chroma block of the at least one child node B of the node A is a small block; or (7) if the node A includes N3 luma pixels and binary tree split is used for the node A, where N3 is 64, 128, or 256, the chroma block of the at least one child node B of the node A is a small block.

It should be noted that, that the node A includes 128 luma pixels may also be described as that an area of the current node is 128, or a product of the width and the height of the node A is 128. Details are not described herein.

Operation 3: Restrict that intra prediction is performed on all coding units in a coverage region of the node A, or restrict that inter prediction is performed on all coding units in a coverage region of the node A. Intra prediction or inter prediction is performed on all the coding unit in the coverage region of the node A, so that parallel processing of small blocks by hardware can be implemented, thereby improving coding performance.

Whether intra prediction or inter prediction is performed on all the coding units in the coverage region of the node A may be determined according to one of the following methods.

Method 1: Determine whether intra prediction or inter prediction is performed based on a flag in a syntax table.

If the chroma block of the at least one child node B obtained by splitting the node A in the split mode S is a small block (and a chroma block of the node A is not a small block), a flag cons_pred_mode_flag is parsed from the bitstream. When a value of cons_pred_mode_flag is 0, it indicates that inter prediction is performed on all the coding units in the coverage region of the node A, or when a value of cons_pred_mode_flag is 1, it indicates that intra prediction is performed on all the coding units in the coverage region of the node A. cons_pred_mode_flag may be a syntax element that should be parsed during block splitting. When the syntax element is parsed, cu_pred_mode of the coding unit in the coverage region of the node A may not be parsed, and a value of cu_pred_mode is a default value corresponding to the value of cons_pred_mode_flag.

It should be noted that, if only the intra prediction mode is used for the child node of the node A, for example, if the node A is located in an intra image (that is, a type of the image in which the node A is located is an intra type or an I type), or if the node A is located in an intra image and an IBC technology is not used for a sequence, the value of cons_pred_mode_flag is 1 by default, that is, cons_pred_mode_flag is absent from the bitstream. The IBC technology may belong to inter prediction or intra prediction.

Method 2: Determine, based on a prediction mode of a $1^{st}$ node in a region of the node A, whether intra prediction or inter prediction is performed.

A prediction mode of a $1^{st}$ coding unit B0 in the region of the node A (the prediction mode of the $1^{st}$ coding unit B0 is not restricted) is parsed. If the prediction mode of the $1^{st}$ coding unit B0 is intra prediction, intra prediction is performed on all the coding units in the coverage region of the node A. If the prediction mode of the $1^{st}$ coding unit B0 is inter prediction, inter prediction is performed on all the coding units in the coverage region of the node A.

Operation 4: Determine a split mode of a chroma block and a split mode of a luma block of the node A based on the prediction mode used for the coding unit in the coverage region of the node A.

If the intra prediction mode is used for all the coding units in the coverage region of the node A, the luma block of the node A is split in the split mode S to obtain N luma coding tree nodes. The chroma block of the node A is not further split, and corresponds to one chroma coding block (chroma CB for short). It may be restricted that the N luma coding tree nodes are not further split, or this is not restricted. If the luma child node is further split, a split mode of the luma child node is parsed for recursive split. When the luma coding tree node is not further split, the luma coding tree node corresponds to one luma coding block (luma CB for short). A chroma transform block corresponding to the chroma CB and the chroma coding block have a same size, and a chroma prediction block and the chroma coding block have a same size.

If the inter prediction mode is used for all the coding units in the coverage region of the node A, the luma block and the chroma block of the node A are further split, in the split mode S, into N coding tree nodes that include luma blocks and chroma blocks. The N coding tree nodes may be or may not be further split. In the case of no further splitting, the N coding tree nodes correspond to coding units that include luma blocks and chroma blocks.

Operation 5: Parse prediction information and residual information of a CU obtained by splitting the node A.

The prediction information includes a prediction mode (indicating the intra prediction mode or a non-intra prediction mode), the intra prediction mode, the inter prediction mode, motion information, and the like. The motion information may include information such as a prediction direction (forward, backward, or bidirectional direction), a reference index (reference index), and a motion vector (motion vector).

The residual information includes: a coded block flag (coded block flag, cbf), a transform coefficient, a transform type (such as DCT-2, DST-7, or DCT-8), and the like. The transform type may be DCT-2 by default.

If it is restricted that only intra prediction is performed on all CUs obtained by splitting the node A, parsing of prediction information of the luma CB obtained by splitting the node A includes: respectively setting a value of skip_flag, a value of merge_flag, and a value of cu_pred_mode to 0, 0, and 1 by default (that is, skip_flag, merge_flag, and cu_pred_ mode are all absent from the bitstream), or respectively setting a value of skip_flag and a value of cu_pred_ mode to 0 and 1 by default (that is, skip_flag and cu_pred_ mode are both absent from the bitstream); and parsing information about the intra prediction mode of the luma CB. Parsing of prediction information of the chroma CB obtained by splitting the node A includes: parsing the intra prediction mode of the chroma CB. The intra prediction mode of the chroma CB may be parsed according to the following method: (1) parsing a syntax element in the bitstream to obtain the intra prediction mode; or (2) directly setting the intra prediction mode to one intra prediction mode in a set of chroma intra prediction modes such as a linear model mode, a DM mode (chroma derived mode, DM), an IBC mode, and the like.

If it is restricted that only inter prediction is performed on all CUs obtained by splitting the node A, parsing of a prediction mode of the CU obtained by splitting the node A includes: parsing skip_flag or/and merge_flag, setting a value of cu_pred_mode to 0 by default, and parsing inter prediction information such as a merge index (merge index), an inter direction (inter dir), a reference index (reference index), a motion vector predictor index (motion vector predictor index), and a motion vector difference (motion vector difference).

skip_flag represents a flag of a skip mode. When the value of skip_flag is 1, it indicates that the skip mode is used for a current CU, or when the value of skip_flag is 0, it indicates that the skip mode is not used for a current CU. merge_flag is a flag of a merge mode. When the value of merge_flag is 1, it indicates that the merge mode is used for the current CU, or when the value of merge_flag is 0, it indicates that the merge mode is not used for the current CU. cu_pred_ mode represents a coding unit prediction mode flag. When the value of cu_pred_mode is 1, it indicates that intra prediction is performed on a current prediction unit, or when the value of cu_pred_mode is 0, it indicates that common inter prediction (identifying information such as an inter direction, a reference index, a motion vector predictor index, and a motion vector difference in the bitstream) is performed on a current prediction unit.

It should be noted that, in this embodiment, the intra prediction mode is a prediction mode in which a predictor of a coding block is generated by using a spatial domain reference pixel of an image in which the coding block is located. For example, the intra prediction mode is a direct current mode (direct current mode, DC mode), a planar mode (Planar mode), an angular mode (angular mode), a template matching mode (template matching mode), or an IBC mode.

The inter prediction mode is a prediction mode in which a predictor of a coding block is generated by using a temporal domain reference pixel in a reference image of the coding block. For example, the inter prediction mode is a skip mode (Skip mode), a merge mode (Merge mode), an AMVP (advanced motion vector prediction) mode (which is also referred to as a common inter mode), or an IBC mode.

Operation 6: Decode each CU to obtain a reconstructed signal of an image block corresponding to the node A.

For example, inter prediction processing or intra prediction processing is performed on each CU based on the prediction information of the CU, to obtain an inter prediction image or an intra prediction image of the CU. Then, based on the residual information of each CU, dequantization and inverse transform processing are performed on a transform coefficient to obtain a residual image, and the residual image is added to the prediction image of the corresponding region to generate a reconstructed image.

In the split mode in this embodiment, a small chroma block on which intra prediction is performed is not generated, and therefore a case in which intra prediction is performed on the small chroma block is avoided.

In a second video decoding method provided in an embodiment of this disclosure, operation 1, operation 2, operation 3, and operation 6 are respectively the same as operation 1, operation 2, operation 3, and operation 6 in the first decoding method. Differences are as follows:

Operation 4: Determine a split mode of a chroma block and a split mode of a luma block of the node A.

The luma block of the node A is further split in the split mode S, to generate N luma coding tree nodes. The chroma block of the node A is not further split, and corresponds to one chroma coding block (chroma CB). A chroma transform block corresponding to the chroma CB and the chroma coding block have a same size. [Note: In comparison with the first embodiment, in this embodiment, regardless of whether it is restricted that the inter prediction mode or the intra prediction mode is used, the chroma block is not further split, the luma block is always split in the split mode S. This is irrelevant to a prediction mode of a coverage region of the node A.]

Operation 5: Parse prediction information and residual information of a CU obtained by splitting the node A.

If it is restricted that only intra prediction is performed on all CUs obtained by splitting the node A, processing is the same as processing in the first embodiment.

If it is restricted that only inter prediction is performed on all CUs obtained by splitting the node A, parsing of prediction information of a luma CB obtained by splitting the node A includes: parsing skip_flag or/and merge_flag, setting a value of cu_pred_mode to 0 by default, and parsing inter prediction information such as a merge index (merge index), an inter direction (inter dir), a reference index (reference index), a motion vector predictor index (motion vector predictor index), and a motion vector difference (motion vector difference). Motion information of each 4×4 subblock in the luma CB is derived based on the inter prediction information obtained through parsing.

If it is restricted that only inter prediction is performed on all CUs obtained by splitting the node A, prediction information of a chroma CB obtained by splitting the node A does not need to be parsed. The chroma CB is split into 2×2 chroma subblocks (the split mode may be the split mode S). Motion information of each 2×2 chroma subblock is motion information of a 4×4 luma region corresponding to the 2×2 chroma subblock.

In the split mode in this embodiment, a small chroma block on which intra prediction is performed is not generated, and a transform block with a size fewer than 16 pixels is not generated, either. Therefore, the foregoing described processing complexity in intra prediction and coefficient coding is avoided.

In a third video decoding method provided in an embodiment of this disclosure, operation 1, operation 2, operation 3, operation 4, and operation 6 are the same as operation 1, operation 2, operation 3, operation 4, and operation 6 in the second decoding method. A difference is as follows.

Operation 5: Parse prediction information and residual information of a CU obtained by splitting the node A.

If it is restricted that only intra prediction is performed on all CUs obtained by splitting the node A, processing is the same as processing in the second embodiment.

If it is restricted that only inter prediction is performed on all CUs obtained by splitting the node A, parsing of prediction information of a luma CB obtained by splitting the node A is the same as the parsing in the second embodiment.

If it is restricted that only inter prediction is performed on all CUs obtained by splitting the node A, prediction information of a chroma CB obtained by splitting the node A does not need to be parsed. A chroma prediction block and a chroma coding block have a same size. Motion information of the chroma CB is motion information of a preset location in a luma region (for example, the center, the bottom-right corner, or the top-left corner of the luma region) corresponding to the chroma CB.

In the split mode in this embodiment, a small chroma block on which intra prediction is performed is not generated, a small transform block is not generated, and a small chroma block on which inter prediction is performed is not generated, either.

An embodiment of this disclosure provides a fourth video decoding method, where the method includes the following operations.

Operation 1: This operation is the same as operation 1 in the foregoing first video decoding method.

Operation 2: Determine whether there is a 4×4 luma block of at least one child node B in child nodes obtained by splitting the node A in the split mode S (by determining whether the width and the height of the node A, and/or the split mode of the node A, and/or the width and the height of the node B satisfy/satisfies at least one condition in Case 1).

If a size (the width and the height) and/or the split mode S that are/is of the node A satisfy/satisfies the at least one condition in Case 1, it is restricted that intra prediction is performed on all coding units in a coverage region of the node A. Otherwise, if it is determined whether a chroma block of the at least one child node B in the child nodes obtained by splitting the node A in the split mode S is a small block (by determining whether the size of the node A, and/or the split mode S of the node A, and/or the width and the height of the node B satisfy/satisfies at least one condition in Case 2), operation 3 to operation 6 are performed.

Specifically, there are the following two cases for a method for determining a chroma block of the at least one child node B of the node A is a small block.

Case 1:

If one or more conditions of the following first preset conditions are true, 4×4 luma blocks are obtained by splitting the node A in the split mode S:

(1) the node A includes M1 pixels and the split mode of the node A is quadtree split, where for example, M1 is 64;

(2) the node A includes M2 pixels and the split mode of the node A is ternary tree split, where for example, M2 is 64;

(3) the node A includes M3 pixels and the split mode of the node A is binary tree split, where for example, M3 is 32;

(4) the width of the node A is four times a second threshold, the height of the node A is equal to the second threshold, and the split mode of the node A is vertical ternary tree split;

(5) the width of the node A is equal to a second threshold, the height of the node A is four times the second threshold, and the split mode of the node A is horizontal ternary tree split;

(6) the width of the node A is twice a second threshold, the height of the node A is equal to the second threshold, and the split mode of the current node is vertical binary tree split;

(7) the height of the node A is twice a second threshold, the width of the node A is equal to the second threshold, and the split mode of the current node is horizontal binary tree split; or (8) the width or/and the height of the node A is/are twice a second threshold, and the split mode of the node A is quadtree split.

The size may be the width and the height of an image region corresponding to the node A, a quantity of luma pixels included in an image region corresponding to the node A, or an area of an image region corresponding to the node A.

Generally, the width of the current node is the width of the luma block corresponding to the current node, and the height of the current node is the height of the luma block corresponding to the current node. In a specific implementation, for example, the second threshold may be 4.

Case 2:

(1) a size of the chroma block of the at least one child node B of the node A is 2×4 or 4×2;

(2) the width or the height of the chroma block of the at least one child node B of the node A is 2;

(3) the node A includes 128 luma pixels and ternary tree split is used for the node A; or the node A includes 64 luma pixels and binary tree split, quadtree split, or ternary tree split is used for the node A;

(4) the node A includes 256 luma pixels and ternary tree split or quadtree split is used for the node A, or the node A includes 128 luma pixels and binary tree split is used for the node A;

(5) the node A includes N1 luma pixels and ternary tree split is used for the node A, where N1 is 64, 128, or 256;

(6) the node A includes N2 luma pixels and quadtree split is used for the node A, where N2 is 64 or 256; or (7) the node A includes N3 luma pixels and binary tree split is used for the node A, where N3 is 64, 128, or 256.

It should be noted that, that the node A includes 128 luma pixels may also be described as that an area of the current node is 128, or a product of the width and the height of the node A is 128. Details are not described herein.

Operation 3: This operation is the same as operation 3 in the foregoing first video decoding method.

Operation 4: Determine a split mode of a chroma block and a split mode of a luma block of the node A based on the prediction mode used for the coding unit in the coverage region of the node A.

If the inter prediction mode is used for all the coding units in the coverage region of the node A, the luma block and the chroma block of the node A are split in the split mode S, to obtain a child node of the node A or/and in the coverage region of the node A. If a 4×4 luma block is generated in a split mode of the child node of the node A or/and in the coverage region of the node A, the split mode of the child node is not allowed or the child node is not allowed to be further split. For example, if the size of the node A is 8×8 and two 8×4 (or 4×8) nodes are generated through horizontal binary tree split (or vertical binary tree split), 4×4 blocks are generated if the 8×4 (or 4×8) node is further split. In this case, the 8×4 (or 4×8) node is not allowed to be further split.

If the intra prediction mode is used for all the coding units in the coverage region of the node A, the foregoing first, second, or third video decoding method may be used for implementation. Details are not described herein again. For example, the luma block of the node A is split, and the chroma block of the node A is not split.

Operation 5: Parse a prediction block and residual information of a CU obtained by splitting the node A.

This operation is the same as operation 5 in the foregoing first video decoding method, and details are not described herein again.

Operation 6: Decode each CU to obtain a reconstructed signal of an image block corresponding to the node A.

This operation may be performed in the manner of operation 6 in the foregoing first video decoding method, and details are not described herein again.

An embodiment of this disclosure provides a fifth video decoding method, where the method includes the following operations.

Operation 1: This operation is the same as operation 1 in the foregoing first video decoding method.

Operation 2: Determine whether there is a 4×4 luma block of at least one child node B in child nodes obtained by splitting the node A in the split mode S (by determining whether the width and the height of the node A, and/or the split mode of the node A, and/or the width and the height of the node B satisfy/satisfies at least one condition in Case 1). If a size (the width and the height) and/or the split mode S that are/is of the node A satisfy/satisfies the at least one condition in Case 1, it is restricted that intra prediction is performed on all coding units in a coverage region of the node A.

Alternatively, if it is determined whether a chroma block of the at least one child node B in the child nodes obtained by splitting the node A in the split mode S is a small block (by determining whether the size of the node A, and/or the split mode S of the node A, and/or the width and the height of the node B satisfy/satisfies at least one condition in Case 2), operation 3 to operation 6 are performed.

Specifically, there are the following two cases for a method for determining a chroma block of the at least one child node B of the node A is a small block.

Case 1:

If one or more conditions of the following first preset conditions are true, 4×4 luma blocks are obtained by splitting the node A in the split mode S:

(1) the node A includes M1 pixels and the split mode of the node A is quadtree split, where for example, M1 is 64;

(2) the node A includes M2 pixels and the split mode of the node A is ternary tree split, where for example, M2 is 64;

(3) the node A includes M3 pixels and the split mode of the node A is binary tree split, where for example, M3 is 32;

(4) the width of the node A is four times a second threshold, the height of the node A is equal to the second threshold, and the split mode of the node A is vertical ternary tree split;

(5) the width of the node A is equal to a second threshold, the height of the node A is four times the second threshold, and the split mode of the node A is horizontal ternary tree split;

(6) the width of the node A is twice a second threshold, the height of the node A is equal to the second threshold, and the split mode of the current node is vertical binary tree split;

(7) the height of the node A is twice a second threshold, the width of the node A is equal to the second threshold, and the split mode of the current node is horizontal binary tree split; or (8) the width or/and the height of the node A is/are twice a second threshold, and the split mode of the node A is quadtree split.

The size may be the width and the height of an image region corresponding to the node A, a quantity of luma pixels included in an image region corresponding to the node A, or an area of an image region corresponding to the node A.

Generally, the width of the current node is the width of the luma block corresponding to the current node, and the height of the current node is the height of the luma block corresponding to the current node. In a specific implementation, for example, the second threshold may be 4.

Case 2:

(1) a size of the chroma block of the at least one child node B of the node A is 2×4 or 4×2;

(2) the width or the height of the chroma block of the at least one child node B of the node A is 2;

(3) the node A includes 128 luma pixels and ternary tree split is used for the node A, or the node A includes 64 luma pixels and binary tree split, quadtree split, or ternary tree split is used for the node A;

(4) the node A includes 256 luma pixels and ternary tree split or quadtree split is used for the node A, or the node A includes 128 luma pixels and binary tree split is used for the node A;

(5) the node A includes N1 luma pixels and ternary tree split is used for the node A, where N1 is 64, 128, or 256;

(6) the node A includes N2 luma pixels and quadtree split is used for the node A, where N2 is 64 or 256; or (7) the node A includes N3 luma pixels and binary tree split is used for the node A, where N3 is 64, 128, or 256.

It should be noted that, that the node A includes 128 luma pixels may also be described as that an area of the current node is 128, or a product of the width and the height of the node A is 128. Details are not described herein.

Operation 3: This operation is the same as operation 3 in the foregoing first video decoding method.

Operation 4: Determine a split mode of a chroma block and a split mode of a luma block of the node A based on the prediction mode used for the coding unit in the coverage region of the node A.

If the inter prediction mode is used for all the coding units in the coverage region of the node A, the luma block and the chroma block of the node A are split in the split mode S, to obtain a child node of the node A or/and in the coverage region of the node A. If a 4×4 luma block is generated in a split mode of the child node of the node A or/and in the coverage region of the node A, the split mode of the child node is not allowed or the child node is not allowed to be further split. For example, if the size of the node A is 8×8 and two 8×4 (or 4×8) nodes are generated through horizontal binary tree split (or vertical binary tree split), 4×4 blocks are generated if the 8×4 (or 4×8) node is further split. In this case, the 8×4 (or 4×8) node is not allowed to be further split.

If the intra prediction mode is used for all the coding units in the coverage region of the node A, the foregoing first, second, or third video decoding method may be used for implementation. Details are not described herein again. For example, the luma block of the node A is split, and the chroma block of the node A is not split.

Operation 5: Parse a prediction block and residual information of a CU obtained by splitting the node A.

This operation is the same as operation 5 in the foregoing first video decoding method, and details are not described herein again.

Operation 6: Decode each CU to obtain a reconstructed signal of an image block corresponding to the node A.

This operation may be performed in the manner of operation 6 in the foregoing first video decoding method, and details are not described herein again.

In some embodiments, if a current region is split once, a 4×4 luma block is generated (for example, QT split is used for a region with 64 luma pixels, or TT split is used for a region with 128 luma pixels), it is restricted that only the intra prediction mode is allowed to be used for the current region by default.

Otherwise, a flag is transmitted to indicate that only the inter prediction mode or the intra prediction mode is allowed to be used for the current region.

If it is restricted that only the inter prediction mode is allowed to be used for the current region, both the luma block and the chroma block are split. If a node in the current region is split to generate a 4×4 luma block, such splitting is not allowed. For example, if the current node is an 8×8 node and two 8×4 nodes are generated through HBT (or VBT) split, 4×4 CUs are generated if these nodes are further split. In this case, these 8×4 nodes are not allowed to be further split.

If it is restricted that only the intra prediction mode is allowed to be used for the region, an implementation in this case is the same as the implementation (that is, the luma block is split and the chroma block is not split) in the first embodiment.

Beneficial effects of the technical solutions of this disclosure are as follows: A block split method is provided in the embodiments of this disclosure, and therefore a case in which the intra prediction mode used for a chroma block with a relatively small area is avoided. This is conductive to pipeline processing of hardware and implementation of a decoder. In addition, in inter prediction, a process of parsing syntax elements of some prediction modes may be skipped, thereby reducing coding complexity. The foregoing described processing complexity in coefficient coding is avoided, thereby reducing coding complexity.

The block split method may be as follows:

parsing a split mode of a node A;

determining whether a chroma block of at least one child node B obtained by splitting the node A in the split mode S is a small block (by determining whether the width and the height of the node A, and/or the split mode of the node A, and/or the width and the height of the node B satisfy/satisfies at least one condition of the foregoing conditions);

if yes, it is restricted that only an intra prediction mode or only an inter prediction mode is used for all coding units in a coverage region of the node A; and determining whether a chroma block and a luma block of the node A are further split.

If intra prediction is performed on all the coding units in the coverage region of the node A, the luma block of the node A is further split in the split mode S, and the chroma block of the node A is not further split. If inter prediction is performed on all the coding units in the coverage region of the node A, the luma block and the chroma block of the node A are further split, in the split mode S, into N coding tree nodes that include luma blocks and chroma blocks.

The luma block of the node A is further split in the split mode S, and the chroma block of the node A is not further split. A chroma transform block and a chroma coding block have a same size.

When intra prediction is performed on all the coding units in the coverage region of the node A, a chroma prediction block and the chroma coding block have a same size. When inter prediction is performed on all the coding units in the coverage region of the node A, the chroma prediction block is split into subblocks (a size of the subblock is less than a size of the chroma coding block), and a motion vector of each subblock is a motion vector in a luma region corresponding to the subblock.

The luma block of the node A is further split in the split mode S, and the chroma block of the node A is not further split. A chroma transform block corresponding to the chroma coding block and the chroma coding block have a same size, the chroma prediction block and the chroma coding block have a same size, and motion information of the chroma CB is motion information of a preset location in a luma region corresponding to the chroma CB.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this disclosure. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed as a computer-readable medium. For example, if an instruction is transmitted from a website, a server, or another remote source through a coaxial cable, an optical fiber, a twisted pair, a digital subscriber line (DSL), or wireless technologies such as infrared, radio, and microwave, the coaxial cable, the fiber optic cable, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

An instruction may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some embodiments, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this disclosure may be implemented in various apparatuses or devices, including a wireless handset, an integrated circuit (IC), or a set of ICs (for example, a chip set). Various components, modules, or units are described in this disclosure to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in the embodiments have respective focuses. For a part that is not described in detail in an embodiment, refer to related descriptions in other embodiments.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An image prediction method, wherein the method comprises:
   determining, based on a size of a current node and a prediction mode of the current node, a split mode that is not allowed for the current node, wherein the current node belongs to a coding tree unit in a current image;
   when only an inter prediction mode is used for prediction of coding blocks belonging to the current node, and a quantity of luma samples of the current node is 32, determining that binary tree split is the split mode that is not allowed for the current node;
   determining a block split policy of the current node based on the split mode that is not allowed for the current node; and
   obtaining, based on the block split policy of the current node, a coding block corresponding to the current node, and performing prediction on the corresponding coding block.

2. The method according to claim 1, wherein the size of the current node is determined based on a size of a coding tree node corresponding to the current node and a split mode that is used to obtain the current node.

3. The method according to claim 1, wherein the quantity of luma samples of the current node is equal to a multiplication between a width of the current node in the luma samples and a height of the current node in the luma samples.

4. The method according to claim 1, wherein performing the prediction on the corresponding coding block comprises:
   parsing a prediction mode status flag of the current node; and
   when a value of the prediction mode status flag is a first value, performing inter prediction on the corresponding coding block; or
   when the value of the prediction mode status flag is a second value, performing intra prediction on the corresponding coding block.

5. An image prediction method, wherein the method comprises:
   determining, based on a size of a current node and a prediction mode of the current node, a split mode that is not allowed for the current node, wherein the current node belongs to a coding tree unit in a current image;
   when only an inter prediction mode is used for prediction of coding blocks belonging to the current node, and a quantity of luma samples of the current node is 64, determining that ternary tree split is the split mode that is not allowed for the current node;

determining a block split policy of the current node based on the split mode that is not allowed for the current node; and obtaining, based on the block split policy of the current node, a coding block corresponding to the current node, and performing prediction on the corresponding coding block.

6. The method according to claim 5, wherein the size of the current node is determined based on a size of a coding tree node corresponding to the current node and a split mode that is used to obtain the current node.

7. The method according to claim 5, wherein the quantity of luma samples of the current node is equal to a multiplication between a width of the current node in the luma samples and a height of the current node in the luma samples.

8. The method according to claim 5, wherein performing the prediction on the corresponding coding block comprises:

parsing a prediction mode status flag of the current node; and when a value of the prediction mode status flag is a first value, performing inter prediction on the corresponding coding block; or when the value of the prediction mode status flag is a second value, performing intra prediction on the corresponding coding block.

9. A video coding device, comprising:

one or more processors; and a memory configured to store executable instructions, which when executed by the one or more processors, cause the one or more processors to:

determine, based on a size of a current node and a prediction mode of the current node, a split mode that is not allowed for the current node, wherein the current node belongs to a coding tree unit in a current image;

when only an inter prediction mode is used for prediction of coding blocks belonging to the current node, and a quantity of luma samples of the current node is 32, determine that binary tree split is the split mode that is not allowed for the current node;

determine a block split policy of the current node based on the split mode that is not allowed for the current node;

obtain, based on the block split policy of the current node, a coding block corresponding to the current node; and perform prediction on the corresponding coding block.

\* \* \* \* \*